United States Patent
Kataoka et al.

(10) Patent No.: US 9,916,314 B2
(45) Date of Patent: Mar. 13, 2018

(54) FILE EXTRACTION METHOD, COMPUTER PRODUCT, FILE EXTRACTING APPARATUS, AND FILE EXTRACTING SYSTEM

(71) Applicant: FUJITSU LIMITED, Kawasaki-shi, Kanagawa (JP)

(72) Inventors: Masahiro Kataoka, Tama (JP); Ryo Matsumura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 681 days.

(21) Appl. No.: 14/202,429

(22) Filed: Mar. 10, 2014

(65) Prior Publication Data

US 2014/0229484 A1 Aug. 14, 2014

Related U.S. Application Data

(63) Continuation of application No. PCT/JP2011/071028, filed on Sep. 14, 2011.

(51) Int. Cl.
    *G06F 17/30* (2006.01)
(52) U.S. Cl.
    CPC .. *G06F 17/30106* (2013.01); *G06F 17/30613* (2013.01); *G06F 17/30321* (2013.01); *G06F 17/30598* (2013.01)
(58) Field of Classification Search
    CPC ......... G06F 17/30106; G06F 17/30613; G06F 17/30321; G06F 17/30598
    See application file for complete search history.

(56) References Cited

U.S. PATENT DOCUMENTS 5,469,354 A * 11/1995 Hatakeyama ..... G06F 17/30011
5,745,745 A *  4/1998 Tada ................. G06F 17/30911
(Continued)

FOREIGN PATENT DOCUMENTS

EP  0 437 615 A1  7/1991
JP  3-174652       7/1991
(Continued)

OTHER PUBLICATIONS

International Preliminary Report on Patentability for corresponding International Patent Application PCT/JP2011/071028, dated Mar. 27, 2014, 11 pages.

(Continued)

*Primary Examiner* — Leslie Wong
(74) *Attorney, Agent, or Firm* — Staas & Halsey LLP

(57) ABSTRACT

An AND operation is performed for an integrated appearance map of a compression code of character data "人", an integrated appearance map of a compression code of character data "飛", and an integrated deletion map for a segment. The AND result is "1100" and it is found that the character data "人" and "飛" are likely to be present in the segments (sg1(1)) and (sg1(2)). Since the segments are specified from the AND result, the AND operations are performed. As a result, the segments are specified and the AND operations are performed. As a result, a file number 3 is specified from the segment (sg0(1)) and a file number 19 is specified from the segment (sg0(5)). Therefore, it is found that both of the character data "人" and "飛" are present in compression files (f3) and (f19).

13 Claims, 67 Drawing Sheets

(56) References Cited

U.S. PATENT DOCUMENTS

| | | | | |
|---|---|---|---|---|
| 5,748,953 | A | * | 5/1998 | Mizutani ............ G06F 17/30613 |
| 5,778,361 | A | * | 7/1998 | Nanjo ............... G06F 17/30622 |
| 7,149,748 | B1 | * | 12/2006 | Stephan ............ G06F 17/30622 |
| | | | | 707/742 |
| 7,724,158 | B2 | * | 5/2010 | Wu ....................... G06F 9/4428 |
| | | | | 341/50 |
| 8,266,179 | B2 | * | 9/2012 | Forman ................. G06F 17/277 |
| | | | | 707/791 |
| 2002/0129012 | A1 | * | 9/2002 | Green ............... G06F 17/30616 |
| 2008/0098024 | A1 | * | 4/2008 | Kataoka ............ G06F 17/30979 |
| 2010/0005072 | A1 | * | 1/2010 | Pitts ................. G06F 17/30106 |
| | | | | 707/E17.01 |
| 2010/0281030 | A1 | * | 11/2010 | Kusumura ........ G06F 17/30616 |
| | | | | 707/741 |
| 2011/0109485 | A1 | | 5/2011 | Kataoka et al. |
| 2011/0161357 | A1 | | 6/2011 | Kataoka et al. |

FOREIGN PATENT DOCUMENTS

| | | |
|---|---|---|
| JP | 5-174064 | 7/1993 |
| JP | 2986865 B2 | 12/1999 |
| JP | 2009-48352 | 3/2009 |
| JP | 2011-100320 | 5/2011 |
| JP | 2011-138230 | 7/2011 |

OTHER PUBLICATIONS

Office Action issued by the State Intellectual Property Office of the P.R. of China dated Dec. 29, 2016 in corresponding Chinese patent application No. 201180073519.7.

Office Action issued by the State Intellectual Property Office of People's Republic of China dated May 3, 2017 in corresponding Chinese patent application No. 201180073519.7.

International Search Report dated Oct. 25, 2011 in corresponding International Patent Application No. PCT/JP2011/071028.

Extended European Search Report dated Mar. 19, 2015 in corresponding European Patent Application No. 11872214.9.

Manning et al., "An Introduction to Information Retrieval", Online edition (c)2009 Cambridge UP, Apr. 1, 2009, pp. 1-569.

* cited by examiner

| COM-PRESSION CODE | FILE NUMBER OF sg0(2) | | | | | FILE NUMBER OF sg0(1) | | | | |
|---|---|---|---|---|---|---|---|---|---|---|
| | 2n | ... | n+3 | n+2 | n+1 | n | ... | 3 | 2 | 1 |
| P(LT1) | 1 | ... | 1 | 0 | 0 | 1 | ... | 0 | 0 | 0 |
| P(LT2) | 0 | ... | 0 | 0 | 0 | 0 | ... | 0 | 0 | 1 |
| : | : | ... | : | : | : | : | ... | : | : | : |
| P(LTz) | 0 | ... | 1 | 0 | 0 | 0 | ... | 1 | 1 | 0 |

COMPRESSION (B)

| COM-PRESSION CODE | FILE NUMBER OF sg0(2) | | | | | FILE NUMBER OF sg0(1) | | | | |
|---|---|---|---|---|---|---|---|---|---|---|
| | 2n | ... | n+3 | n+2 | n+1 | n | ... | 3 | 2 | 1 |
| P(LT1) | 0001...0110 | | | | | | | | | |
| P(LT2) | 0000...0001 | | | | | | | | | |
| : | : | | | | | | | | | |
| P(LTz) | | | | | | 0100...0011 | | | | |

FILE ADDITION

FILE NUMBER OF sg0(3)

(C)

| COM-PRESSION CODE | | FILE NUMBER OF sg0(2) | | | | | FILE NUMBER OF sg0(1) | | | | |
|---|---|---|---|---|---|---|---|---|---|---|---|
| | 2n+1 | 2n | ... | n+3 | n+2 | n+1 | n | ... | 3 | 2 | 1 |
| P(LT1) | 1 | 0001...0110 | | | | | | | | | |
| P(LT2) | 1 | 0000...0001 | | | | | | | | | |
| : | : | : | | | | | | | | | |
| P(LTz) | 0 | | | | | | 0100...0011 | | | | |

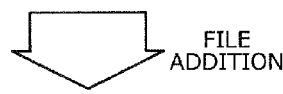
FILE ADDITION (D)

| COM-PRESSION CODE | FILE NUMBER OF sg0(3) | | | | | FILE NUMBER OF sg0(2) | | | | | FILE NUMBER OF sg0(1) | | | | |
|---|---|---|---|---|---|---|---|---|---|---|---|---|---|---|---|
| | 3n | ... | 2n+3 | 2n+2 | 2n+1 | 2n | ... | n+3 | n+2 | n+1 | n | ... | 3 | 2 | 1 |
| P(LT1) | 0 | ... | 0 | 0 | 1 | 0001...0110 | | | | | | | | | |
| P(LT2) | 0 | ... | 1 | 0 | 1 | 0000...0001 | | | | | | | | | |
| : | : | ... | : | : | : | : | | | | | | | | | |
| P(LTz) | 1 | ... | 0 | 0 | 0 | | | | | | 0100...0011 | | | | |

COMPRESSION (E)

| COM-PRESSION CODE | FILE NUMBER OF sg0(3) | | | | | FILE NUMBER OF sg0(2) | | | | | FILE NUMBER OF sg0(1) | | | | |
|---|---|---|---|---|---|---|---|---|---|---|---|---|---|---|---|
| | 3n | ... | 2n+3 | 2n+2 | 2n+1 | 2n | ... | n+3 | n+2 | n+1 | n | ... | 3 | 2 | 1 |
| P(LT1) | 0001...0110 | | | | | | | | | | | | | | |
| P(LT2) | 0000...0001 | | | | | | | | | | | | | | |
| : | : | | | | | | | | | | | | | | |
| P(LTz) | | | | | | | | | | | 0100...0011 | | | | |

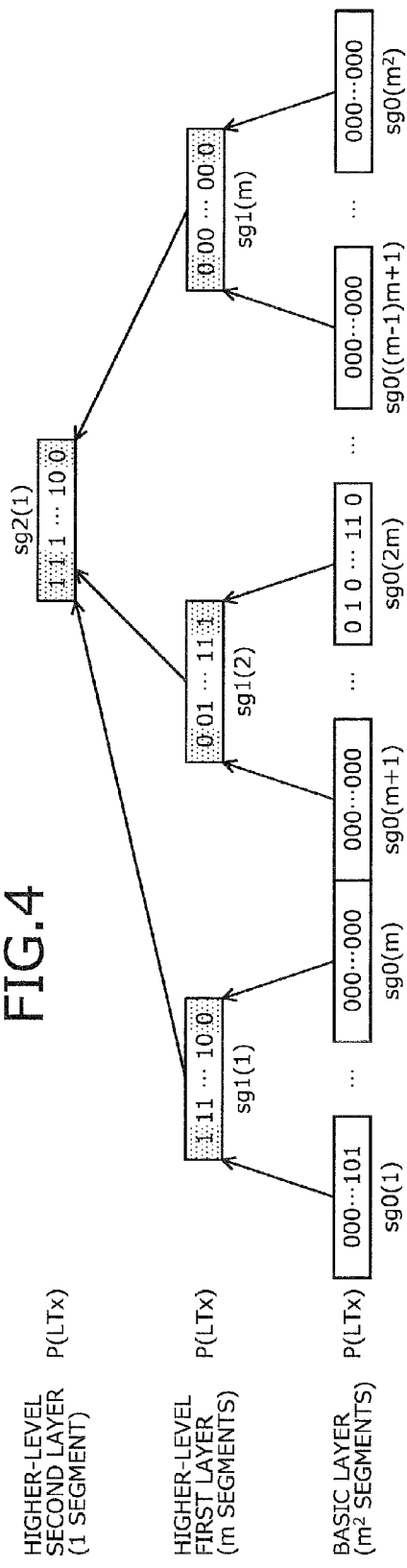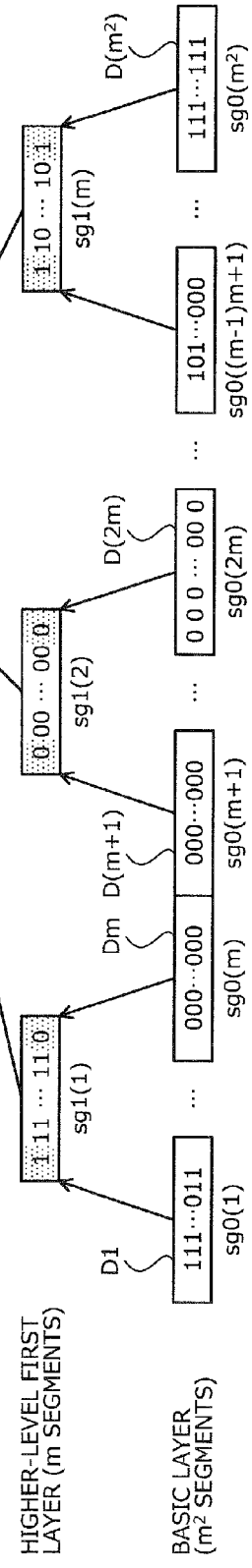

FIG.15

| RANK | CHARACTER DATA | | | APPEARANCE COUNT | TOTAL NUMBER | APPEARANCE RATE | BEFORE CORRECTION | |
|---|---|---|---|---|---|---|---|---|
| | TYPE | CODE | CHARACTER (STRING) | | | | OCCURRENCE PROBABILITY | COMPRESSION CODE LENGTH |
| 1 | 16 | 3000 | 0 | 60451 | 1386951 | 0.043585534 | 0.03125 | 5 |
| 2 | 16 | 3E00 | > | 53183 | 1386951 | 0.038345262 | 0.03125 | 5 |
| ... | ... | ... | ... | ... | ... | ... | ... | ... |
| 6 | BASIC | 6E30 | <br> | 28999 | 1386951 | 0.020908453 | 0.015625 | 6 |
| ... | ... | ... | ... | ... | ... | ... | ... | ... |
| 24 | 16 | 6E30 | の | 15577 | 1386951 | 0.011231111 | 0.0078125 | 7 |
| ... | ... | ... | ... | ... | ... | ... | ... | ... |
| 34 | 16 | 7000 | p | 10737 | 1386951 | 0.007741441 | 0.00390625 | 8 |
| ... | ... | ... | ... | ... | ... | ... | ... | ... |
| 79 | 16 | 6F30 | は | 3529 | 1386951 | 0.00254443 | 0.001953125 | 9 |
| ... | ... | ... | ... | ... | ... | ... | ... | ... |
| 110 | 16 | 6972 | 物 | 1569 | 1386951 | 0.001131258 | 0.000976563 | 10 |
| ... | ... | ... | ... | ... | ... | ... | ... | ... |
| 156 | 8 | 0x4E | | 879 | 1386951 | 0.000633764 | 0.000488281 | 11 |
| ... | ... | ... | ... | ... | ... | ... | ... | ... |
| 167 | 8 | 0x51 | | 835 | 1386951 | 0.00060204 | 0.000488281 | 11 |
| ... | ... | ... | ... | ... | ... | ... | ... | ... |
| 286 | 16 | D552 | 動 | 485 | 1386951 | 0.000349688 | 0.000244141 | 12 |
| ... | ... | ... | ... | ... | ... | ... | ... | ... |
| 364 | 8 | 0x93 | | 337 | 1386951 | 0.000242979 | 0.00012207 | 13 |
| ... | ... | ... | ... | ... | ... | ... | ... | ... |
| 691 | 16 | 216B | 次 | 145 | 1386951 | 0.000104546 | 6.10352E-05 | 14 |
| ... | ... | ... | ... | ... | ... | ... | ... | ... |
| 1022 | 16 | EF83 | 華 | 84 | 1386951 | 6.05645E-05 | 3.05176E-05 | 15 |
| ... | ... | ... | ... | ... | ... | ... | ... | ... |
| 1301 | 8 | 0xCE | | 42 | 1386951 | 3.02823E-05 | 1.52588E-05 | 16 |
| 1302 | 8 | 0xFD | | 35 | 1386951 | 2.52352E-05 | 1.52588E-05 | 16 |
| 1303 | 8 | 0xEA | | 33 | 1386951 | 2.37932E-05 | 1.52588E-05 | 16 |
| 1304 | 8 | 0x24 | | 23 | 1386951 | 1.65831E-05 | 1.52588E-05 | 16 |
| 1305 | 8 | 0x23 | | 17 | 1386951 | 1.22571E-05 | 7.62939E-06 | 17 |
| | | | | | TOTAL OCCURRENCE PROBABILITY | | 0.711037 | |

FIG.16

| COMPRESSION CODE LENGTH | LEAF COUNT | LEAF COUNT FOR CORRECTION A | LEAF COUNT FOR CORRECTION B-1 | LEAF COUNT FOR CORRECTION B-2 | LEAF COUNT FOR CORRECTION B-3 | BRANCH COUNT OF HUFFMAN TREE | |
|---|---|---|---|---|---|---|---|
| | | | | | | PER LEAF | SUBTOTAL |
| 5 | 2 | 2 | 1 | 0 | 0 | 64 | 0 |
| 6 | 9 | 9 | 7 | 6 | 6 | 32 | 192 |
| 7 | 22 | 22 | 19 | 18 | 18 | 16 | 288 |
| 8 | 28 | 28 | 24 | 23 | 23 | 8 | 184 |
| 9 | 29 | 29 | 25 | 23 | 23 | 4 | 92 |
| 10 | 25 | 25 | 21 | 20 | 20 | 2 | 40 |
| 11 | 86 | 1190 | 1208 | 1215 | 1215 | 1 | 1215 |
| 12 | 162 | | | | | | |
| 13 | 251 | | | | | | |
| 14 | 407 | | | | | | |
| 15 | 279 | | | | | | |
| 16 | 4 | | | | | | |
| 17 | 1 | | | | | | |
| TOTAL LEAF COUNT TOTAL OCCURRENCE PROBABILITY | 1305 0.711 | 1305 1.146 | 1305 1.042 | 1305 0.982 | 1305 0.982 | | |
| TOTAL BRANCH COUNT | | | | | | | 2011 |

FIG.17

| RANK | CHARACTER DATA TYPE | CHARACTER DATA CODE | CHARACTER DATA CHARACTER (STRING) | APPEARANCE COUNT | TOTAL NUMBER | APPEARANCE RATE | BEFORE CORRECTION OCCURRENCE PROBABILITY | BEFORE CORRECTION COMPRESSION CODE LENGTH | BEFORE CORRECTION AVERAGE LENGTH | CORRECTION A OCCURRENCE PROBABILITY | CORRECTION A COMPRESSION CODE LENGTH | CORRECTION A AVERAGE LENGTH | CORRECTION B-1 OCCURRENCE PROBABILITY | CORRECTION B-1 COMPRESSION CODE LENGTH | CORRECTION B-1 AVERAGE LENGTH | CORRECTION B-2 OCCURRENCE PROBABILITY | CORRECTION B-2 COMPRESSION CODE LENGTH | CORRECTION B-2 AVERAGE LENGTH |
|---|---|---|---|---|---|---|---|---|---|---|---|---|---|---|---|---|---|---|
| 1 | 16 | 3000 | 0 | 60451 | 1386951 | 0.043586 | 0.03125 | 5 | 0.217928 | 0.03125 | 5 | 0.217928 | 0.03125 | 5 | 0.217928 | 0.015625 | 6 | 0.261513 |
| 2 | 16 | 3E00 | v | 53183 | 1386951 | 0.038345 | 0.03125 | 5 | 0.191726 | 0.03125 | 5 | 0.191726 | 0.015625 | 6 | 0.230072 | 0.015625 | 6 | 0.230072 |
| 3 | 16 | 2200 | . | 33815 | 1386951 | 0.024381 | 0.015625 | 6 | 0.146285 | 0.015625 | 6 | 0.146285 | 0.015625 | 6 | 0.146285 | 0.015625 | 6 | 0.146285 |
| ... | ... | ... | ... | ... | ... | ... | ... | ... | ... | ... | ... | ... | ... | ... | ... | ... | ... | ... |
| 12 | 16 | 3400 | 4 | 21501 | 1386951 | 0.015502 | 0.007813 | 7 | 0.108516 | 0.007813 | 7 | 0.108516 | 0.007813 | 7 | 0.108516 | 0.007813 | 7 | 0.108516 |
| 34 | 16 | 7000 | p | 10737 | 1386951 | 0.007741 | 0.003906 | 8 | 0.061932 | 0.003906 | 8 | 0.061932 | 0.003906 | 8 | 0.061932 | 0.003906 | 8 | 0.061932 |
| 62 | 16 | 6A30 | 花 | 5107 | 1386951 | 0.003682 | 0.001953 | 9 | 0.03314 | 0.001953 | 9 | 0.03314 | 0.001953 | 9 | 0.03314 | 0.001953 | 9 | 0.03314 |
| 91 | 16 | 6430 | ∩ | 2637 | 1386951 | 0.001901 | 0.000977 | 10 | 0.019013 | 0.000977 | 10 | 0.019013 | 0.000488 | 11 | 0.019013 | 0.000488 | 11 | 0.020914 |
| 116 | 16 | 625F | 形 | 1309 | 1386951 | 0.000944 | 0.000488 | 11 | 0.010382 | 0.000488 | 11 | 0.010382 | 0.000488 | 11 | 0.010382 | 0.000488 | 11 | 0.010382 |
| 202 | 8 | 75 |  | 673 | 1386951 | 0.000485 | 0.000244 | 12 | 0.005823 | 0.000488 | 11 | 0.005338 | 0.000488 | 11 | 0.005338 | 0.000488 | 11 | 0.005338 |
| 364 | 8 | 93 |  | 337 | 1386951 | 0.000243 | 0.000122 | 13 | 0.003159 | 0.000488 | 11 | 0.002673 | 0.000488 | 11 | 0.002673 | 0.000488 | 11 | 0.002673 |
| 615 | 8 | 45 |  | 169 | 1386951 | 0.000122 | 6.10352E-05 | 14 | 0.001706 | 0.000488 | 11 | 0.00134 | 0.000488 | 11 | 0.00134 | 0.000488 | 11 | 0.00134 |
| 1022 | 16 | EF83 | 華 | 84 | 1386951 | 6.05645E-05 | 3.05176E-05 | 15 | 0.000908 | 0.000488 | 11 | 0.000666 | 0.000488 | 11 | 0.000666 | 0.000488 | 11 | 0.000666 |
| 1301 | 8 | CE |  | 42 | 1386951 | 3.02823E-05 | 1.52588E-05 | 16 | 0.000485 | 0.000488 | 11 | 0.000333 | 0.000488 | 11 | 0.000333 | 0.000488 | 11 | 0.000333 |
| 1305 | 8 | 23 |  | 17 | 1386951 | 1.22571E-05 | 7.62939E-06 | 17 | 0.000208 | 0.000488 | 11 | 0.000135 | 0.000488 | 11 | 0.000135 | 0.000488 | 11 | 0.000135 |
| TOTAL |  |  |  | 1386951 |  | 1 | 0.711037 |  | 8.179405 | 1.146484 |  | 7.878965 | 1.049316 |  | 8.103753 | 0.98584 |  | 8.277232 |

FIG.20

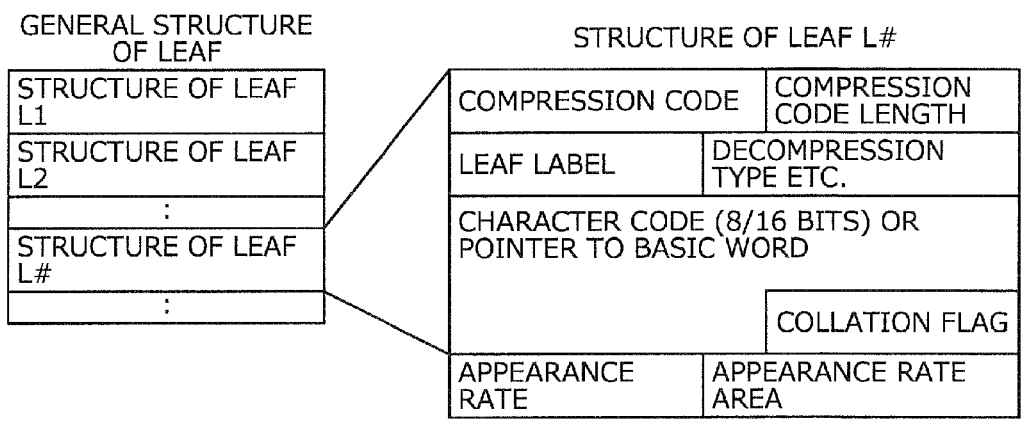

| GENERAL STRUCTURE OF LEAF |
|---|
| STRUCTURE OF LEAF L1 |
| STRUCTURE OF LEAF L2 |
| ⋮ |
| STRUCTURE OF LEAF L# |
| ⋮ |

STRUCTURE OF LEAF L#

| COMPRESSION CODE | COMPRESSION CODE LENGTH |
|---|---|
| LEAF LABEL | DECOMPRESSION TYPE ETC. |
| CHARACTER CODE (8/16 BITS) OR POINTER TO BASIC WORD | |
| | COLLATION FLAG |
| APPEARANCE RATE | APPEARANCE RATE AREA |

| SPECIFIC SINGLE CHARACTER STRUCTURE ||
|---|---|
| CHARACTER CODE | POINTER TO LEAF |
| ⋮ | ⋮ |
| e691 (0x216B: 次) | POINTER TO LEAF OF e691 |
| ⋮ | ⋮ |
| e24 (0x6E30: の) | POINTER TO LEAF OF e24 |
| ⋮ | ⋮ |
| e79 (0x6F30: は) | POINTER TO LEAF OF e79 |
| ⋮ | ⋮ |

| DIVIDED CHARACTER CODE STRUCTURE ||
|---|---|
| DIVIDED CHARACTER CODE | POINTER TO LEAF |
| 0x00 | POINTER TO LEAF OF "0x00" |
| 0x01 | POINTER TO LEAF OF "0x01" |
| ⋮ | ⋮ |
| 0xFF | POINTER TO LEAF OF "0xFF" |

| BASIC WORD STRUCTURE ||
|---|---|
| TOTAL COUNT OF BASIC WORDS | 1000 |
| MAXIMUM BIT LENGTH OF BASIC WORD | Lsmax |
| BIT LENGTH OF BASIC WORD s1 | Ls1 |
| BASIC WORD s1 ("相方") ||
| POINTER TO LEAF OF BASIC WORD s1 ||
| ⋮ ||
| BIT LENGTH OF BASIC WORD s1000 | Ls1000 |
| BASIC WORD s1000 ("ワン切り") ||
| POINTER TO LEAF OF BASIC WORD s1000 ||
| EOT (0xFFFF) ||

FIG.24

| | SPECIFIC SINGLE CHARACTER APPEARANCE MAP DIVIDED CHARACTER CODE APPEARANCE MAP | | BI-GRAM CHARACTER STRING APPEARANCE MAP | |
|---|---|---|---|---|
| (A) 竜馬は脱藩した ↑ | COM-PRESSION CODE OF "竜" | FILE NUMBER 123 ⋯ i / 000 ⋯ 1 | | |
| (B) 竜馬は脱藩した ↑ | COM-PRESSION CODE OF "馬" | FILE NUMBER 123 ⋯ i / 001 ⋯ 1 | COM-PRESSION CODE STRING OF "竜馬" | FILE NUMBER 123 ⋯ i / 000 ⋯ 1 |
| (C) 竜馬は脱藩した ↑ | COM-PRESSION CODE OF "は" | FILE NUMBER 123 ⋯ i / 111 ⋯ 1 | COM-PRESSION CODE STRING OF "馬は" | FILE NUMBER 123 ⋯ i / 000 ⋯ 1 |
| (D) 竜馬は脱藩した [0x81 \| 0x31] ↑ | COM-PRESSION CODE OF "0x81" | FILE NUMBER 123 ⋯ i / 100 ⋯ 1 | COM-PRESSION CODE STRING OF "は 0x81" | FILE NUMBER 123 ⋯ i / 100 ⋯ 1 |
| (E) 竜馬は脱藩した [0x81 \| 0x31] ↑ | COM-PRESSION CODE OF "0x31" | FILE NUMBER 123 ⋯ i / 011 ⋯ 1 | COM-PRESSION CODE STRING OF "0x81 0x31" | FILE NUMBER 123 ⋯ i / 010 ⋯ 1 |
| (F) 竜馬は脱藩した [0xE9 \| 0x85] ↑ | COM-PRESSION CODE OF "0xE9" | FILE NUMBER 123 ⋯ i / 011 ⋯ 1 | COM-PRESSION CODE STRING OF "0x31 0xE9" | FILE NUMBER 123 ⋯ i / 000 ⋯ 1 |
| (G) 竜馬は脱藩した [0xE9 \| 0x85] ↑ | COM-PRESSION CODE OF "0x85" | FILE NUMBER 123 ⋯ i / 100 ⋯ 1 | COM-PRESSION CODE STRING OF "0xE9 0x85" | FILE NUMBER 123 ⋯ i / 000 ⋯ 1 |
| (H) 竜馬は脱藩した ↑ | COM-PRESSION CODE OF "し" | FILE NUMBER 123 ⋯ i / 111 ⋯ 1 | COM-PRESSION CODE STRING OF "0x85 し" | FILE NUMBER 123 ⋯ i / 000 ⋯ 1 |
| (I) 竜馬は脱藩した ↑ | COM-PRESSION CODE OF "た" | FILE NUMBER 123 ⋯ i / 111 ⋯ 1 | COM-PRESSION CODE STRING OF "した" | FILE NUMBER 123 ⋯ i / 111 ⋯ 1 |

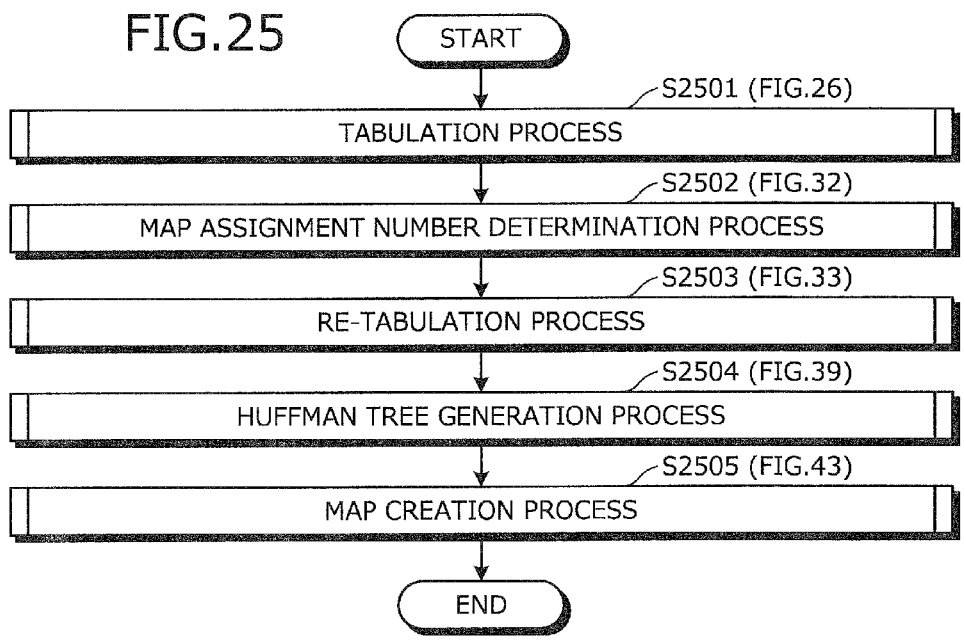
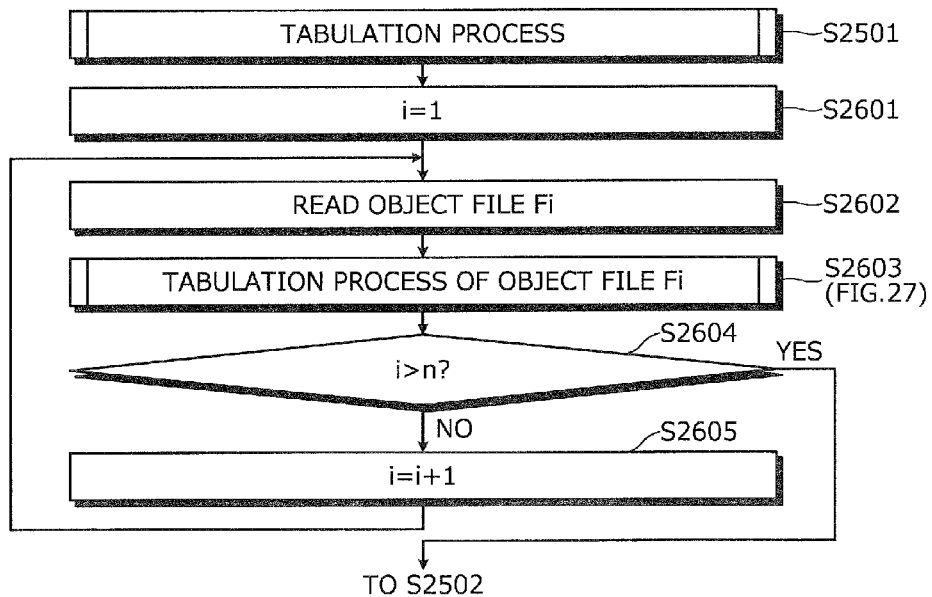

FIG.28       2800

| CHARACTER APPEARANCE FREQUENCY TABULATION TABLE ||
| CHARACTER | APPEARANCE COUNT |
|---|---|
| 0 | ... |
| ⋮ | ⋮ |
| 9 | ... |
| A | ... |
| ⋮ | ⋮ |
| Z | ... |
| a | ... |
| ⋮ | ⋮ |
| z | ... |
| あ | ... |
| ⋮ | ⋮ |
| ん | ... |
| ア | ... |
| ⋮ | ⋮ |
| ン | ... |
| 足 | ... |
| ⋮ | ⋮ |
| 我 | ... |

3000

| BASIC WORD APPEARANCE FREQUENCY TABULATION TABLE ||
|---|---|
| BASIC WORD | APPEARANCE COUNT |
| あの | ... |
| ある | ... |
| ... | ... |
| です | ... |
| ... | ... |

FIG.35    3500

| UPPER DIVIDED CHARACTER CODE APPEARANCE FREQUENCY TABULATION TABLE ||
|---|---|
| UPPER DIVIDED CHARACTER CODE | APPEARANCE COUNT |
| 00 | ... |
| 01 | ... |
| 02 | ... |
| ⋮ | ⋮ |
| FF | ... |

FIG.36    3600

| LOWER DIVIDED CHARACTER CODE APPEARANCE FREQUENCY TABULATION TABLE ||
|---|---|
| LOWER DIVIDED CHARACTER CODE | APPEARANCE COUNT |
| 00 | ... |
| 01 | ... |
| 02 | ... |
| ⋮ | ⋮ |
| FF | ... |

3800

| BI-GRAM CHARACTER STRING APPEARANCE FREQUENCY TABULATION TABLE ||
|---|---|
| BI-GRAM CHARACTER STRING | APPEARANCE COUNT |
| ああ | ... |
| あい | ... |
| あう | ... |
| ⋮ | ⋮ |

| APPEARANCE RATE AREA | COMPRESSION PATTERN | COMPRESSION RATE |
|---|---|---|
| E | 16+1 (64-bit) type HUFFMAN TREE | 7% |
| D | 16+1 (32-bit) type HUFFMAN TREE | 14% |
| C | 16+1 (16-bit) type HUFFMAN TREE | 28% |
| B | 16-TYPE HUFFMAN TREE | 64% |
| A | NO COMPRESSION | 100% |
| A' | | |
| B' | 16-TYPE HUFFMAN TREE | 64% |
| C' | 16+1 (16-bit) type HUFFMAN TREE | 28% |
| D' | 16+1 (32-bit) type HUFFMAN TREE | 14% |
| E' | 16+1 (64-bit) type HUFFMAN TREE | 7% |

| SYMBOL STRING | CODE WORD |
|---|---|
| 0000 | 01 |
| 0010 | 100 |
| 0100 | 101 |
| 1000 | 110 |
| 0001 | 1110 |
| 0111 | 111100 |
| 1011 | 111101 |
| 1101 | 1111100 |
| 1110 | 1111101 |
| 0011 | 11111100 |
| 0101 | 111111010 |
| 0110 | 111111011 |
| 1001 | 111111100 |
| 1010 | 1111111101 |
| 1100 | 1111111110 |
| 1111 | 1111111111 |

| SYMBOL STRING | CODE WORD |
|---:|---:|
| 0000000000000000 | 00 |
| 0000 | 01 |
| 0010 | 100 |
| 0100 | 101 |
| 1000 | 110 |
| 0001 | 1110 |
| 0111 | 111100 |
| 1011 | 111101 |
| 1101 | 1111100 |
| 1110 | 1111101 |
| 0011 | 11111100 |
| 0101 | 111111010 |
| 0110 | 111111011 |
| 1001 | 111111100 |
| 1010 | 1111111101 |
| 1100 | 1111111110 |
| 1111 | 1111111111 |

| SYMBOL STRING | CODE WORD |
|---:|---:|
| 0000····0000 (32-bit) | 00 |
| 0000 | 01 |
| 0010 | 100 |
| 0100 | 101 |
| 1000 | 110 |
| 0001 | 1110 |
| 0111 | 111100 |
| 1011 | 111101 |
| 1101 | 1111100 |
| 1110 | 1111101 |
| 0011 | 11111100 |
| 0101 | 111111010 |
| 0110 | 111111011 |
| 1001 | 111111100 |
| 1010 | 1111111101 |
| 1100 | 1111111110 |
| 1111 | 1111111111 |

| SYMBOL STRING | CODE WORD |
|---|---|
| 0000····0000 (64-bit) | 00 |
| 0000 | 01 |
| 0010 | 100 |
| 0100 | 101 |
| 1000 | 110 |
| 0001 | 1110 |
| 0111 | 111100 |
| 1011 | 111101 |
| 1101 | 1111100 |
| 1110 | 1111101 |
| 0011 | 11111100 |
| 0101 | 111111010 |
| 0110 | 111111011 |
| 1001 | 111111100 |
| 1010 | 1111111101 |
| 1100 | 1111111110 |
| 1111 | 1111111111 |

FILE EXTRACTION METHOD, COMPUTER PRODUCT, FILE EXTRACTING APPARATUS, AND FILE EXTRACTING SYSTEM

CROSS REFERENCE TO RELATED APPLICATIONS

This application is a continuation application of International Application PCT/JP2011/071028, filed on Sep. 14, 2011 and designating the U.S., the entire contents of which are incorporated herein by reference.

FIELD

The embodiment discussed herein is related to an extraction method, a computer product, an extracting apparatus, and an extracting system.

BACKGROUND

If a search character string including specific character data is input, files including the specific character data are narrowed down out of files to be searched by reference to index information indicative of which of multiple files to be searched includes the specific character data in a conventional technique. For example, refer to Japanese Patent No. 2986865.

Nonetheless, as the number of files to be searched increases, the volume of index information accordingly increases. The increase in the volume of the index information increases the time required for a process of referring to the index information, consequently causing a problem of an increase in the time consumed for a search process.

SUMMARY

According to an aspect of an embodiment, an extraction method includes storing first information and second information into a storage unit, the first information indicating whether each of a plurality of files respectively includes a specific plurality of character data, the second information indicating whether at least any one of the plurality of files includes the specific plurality of character data; updating the first information and the second information with addition of an additional file to the plurality of files, the first information being updated by merging additional presence information that indicates whether the additional file includes the specific plurality of character data, the second information being updated to indicate whether at least any one of the plurality of files that the additional file is added includes the specific plurality of character data, using the additional presence information; and extracting a file that includes the specific plurality of character data based on the first information, when a search request is accepted for the specific plurality of character data and the second information is detected to include the specific plurality of character data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view of an addition example of a compression code map when an object file is added;

FIG. 4 is an explanatory view of a hierarchy of appearance maps;

FIG. 5 is an explanatory view of a hierarchy of deletion maps;

FIG. 15 is an explanatory view of details of (2) Calculation of Compression Code Length (N=11) depicted in FIG. 13;

FIG. 16 is an explanatory view of details of (3) Specification of Leaf count to (5) Generation of Leaf Structure (N=11) depicted in FIG. 13;

FIG. 17 is an explanatory view of a correction result for each character data;

FIG. 20 is an explanatory view of a leaf structure;

FIG. 21 is an explanatory view of a specific single character structure;

FIG. 22 is an explanatory view of a divided character code structure;

FIG. 23 is an explanatory view of a basic word structure;

FIG. 24 is an explanatory view of a generation example of the compression code maps;

FIG. 25 is a flowchart of a compression code map creation process example by a creating unit;

FIG. 26 is a flowchart of a detailed process example of a tabulation process (step S2501) depicted in FIG. 25;

FIG. 28 is an explanatory view of a character appearance frequency tabulation table;

FIG. 35 is an explanatory view of an upper divided character code appearance frequency tabulation table;

FIG. 36 is an explanatory view of a lower divided character code appearance frequency tabulation table;

FIG. 56 is an explanatory view of a compression pattern table having compression patterns by appearance rate areas;

FIG. 57 is an explanatory view of a compression pattern in a case of areas B and B';

FIG. 58 is an explanatory view of a compression pattern in a case of areas C and C';

FIG. 59 is an explanatory view of a compression pattern in a case of areas D and D';

FIG. 60 is an explanatory view of a compression pattern in a case of areas E and E';

DESCRIPTION OF EMBODIMENTS

Figure 1:
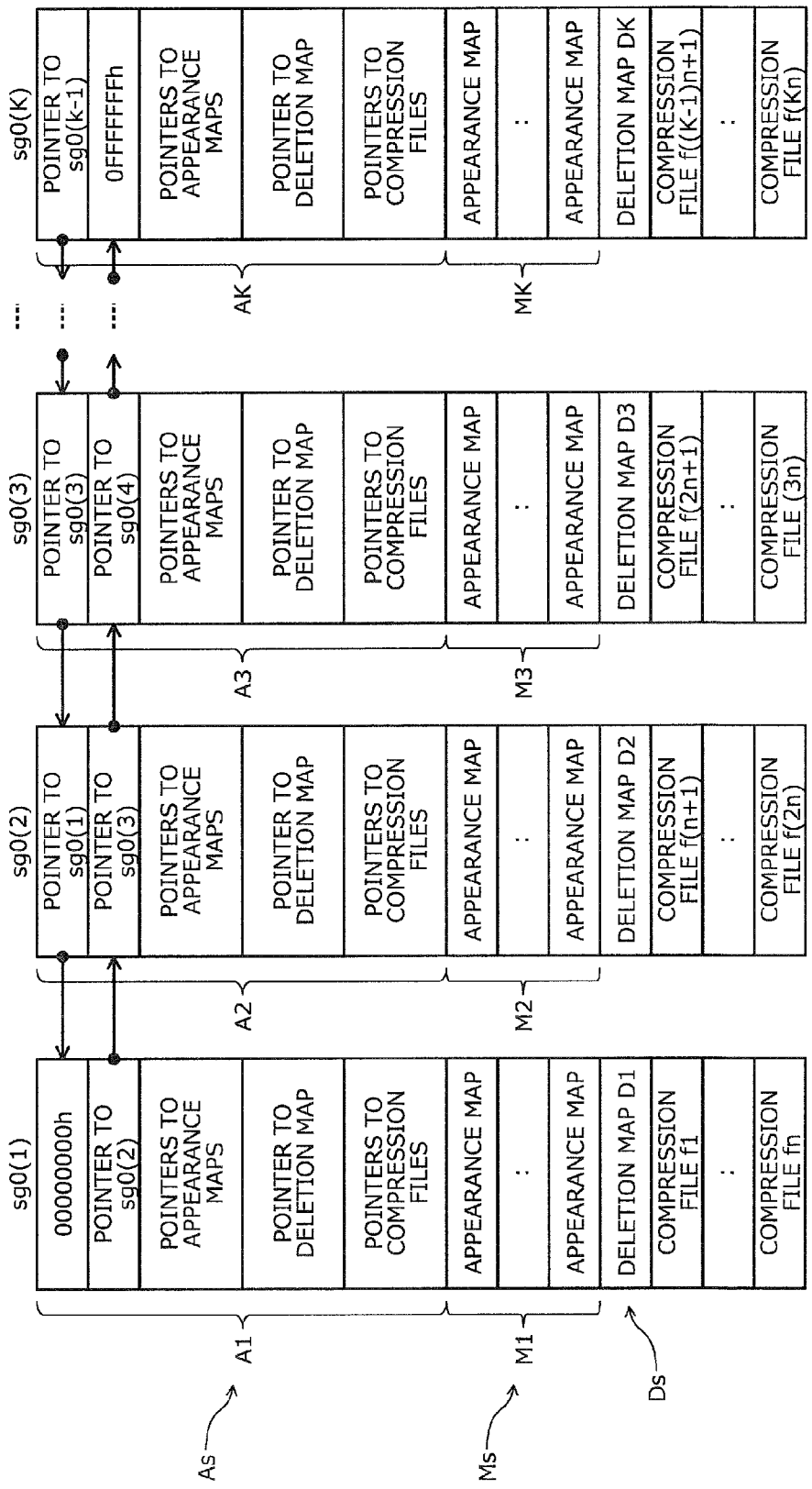
FIG. 1 is an explanatory view of distribution of a compression code map according to an embodiment.

An embodiment of the present invention will be described in detail with reference to the accompanying drawings. In this description, "character data" means single characters, basic words, divided character codes, etc., making up text data. An object file group is electronic data such as document files, web pages, and e-mails, for example, and is electronic data in text format, HyperText Markup Language (HTML) format, and Extensible Markup Language (XML) format, for example.

A "single character" means a character represented by one character code. A character code length of a single character differs depending on a character code type.

For example, the character code is 16-bit code in the case of UTF (Unicode Transformation Format) 16, 8-bit code in the case of ASCII (American Standard Code for Information Interchange) code, and 8-bit code in the case of shift JIS (Japanese Industrial Standard) code. If a Japanese character is represented by the shift JIS code, two 8-bit codes are combined.

"Basic words" mean basic words taught in elementary school or junior high school, and reserved words represented by certain character strings. Taking an English sentence "This is a . . . " as an example, the basic words are words such as "This", "is", and "a" and are classified into a 1000-word level, a 2000-word level, and a several-thousand-word level, to which marks "*", "", and "*" are respectively added in English-Japanese dictionaries. The reserved words are predetermined character strings and include, for example, HTML tags (e.g., <br>).

A "divided character code" means each of codes acquired by dividing a single character into an upper code and a lower code. In the embodiment, as described later, a single character may be divided into an upper code and a lower code. For example, a character code of a single character "葦" is represented as "9D82" in the case of UTF16 and is divided into an upper divided character code "0x9D" and a lower divided character code "0x82".

A "gram" is a character unit. For example, in the case of a single character, one character is uni-gram. In the case of the divided character codes, a divided character code itself is uni-gram. Therefore, a single character "葦" is bi-gram. The embodiment will be described by taking UTF16 as an example of a character code.

In this description, if a "bit is set to ON", a value of the bit is set to "1" and if a "bit is set to OFF", a value of the bit is set to "0". Alternatively, if a "bit is set to ON", a value of the bit may be set to "0" and if a "bit is set to OFF", a value of the bit may be set to "1".

An "appearance map" is an index for full-text search and a bit string acquired by combining a pointer specifying character data and a bit string indicative of the presence of the character data in each object file. At the time of a search process, this bit string can be used as an index indicative of whether character data to be searched is included, depending on ON/OFF of bits. For example, a compression code of character data is employed as the pointer specifying the character data. The pointer specifying the character data may be implemented by using the character data itself, for example. A "compression code map" is a bit map acquired by integrating appearance maps of respective character data indicated by pointers of compression codes. A compression code map of a bi-gram character string is a compression code string acquired by combining a compression code of a first gram and a compression code of a second gram.

A "bi-gram character string" is a character string having concatenated uni-gram character codes. For example, a character string " 人形芝居 " includes double concatenated characters " 人形 ", " 形芝 ", and " 芝居 ". Each of " 人 " and " 形 " of the double concatenated character " 人形 " is an undivided single character and therefore, the double concatenated character " 人形 " is a bi-gram character string by itself.

Since "芝" is divided as described above, a combination of a single character "形" and the upper divided character code "0x9D" of the "芝" forms a bi-gram character string. A combination of the upper divided character code "0x9D" and the lower divided character code "0x82" forms a bi-gram character string. A combination of the lower divided character code "0x82" and an undivided single character "居" forms a bi-gram character string.

If an object file group is compressed, the basic words enable single pass access at the time of generation and search of a compression code map. If the object file group is not compressed, a character code of character data may directly be employed as the pointer specifying the character data.

A "deletion map" is an index indicative of the presence or deletion of object files with a bit string. In the deletion map, a bit corresponding to ON (=1) means that the object file with a file number corresponding to the bit is present. On the other hand, if the bit is set to OFF (=0), this means that the object file is deleted. Therefore, if a search is performed by using the compression code map, the deletion map corresponding to the object file can be set to OFF to exclude the object file from search objects without deleting the object file itself.

FIG. 1 is an explanatory view of distribution of a compression code map according to the embodiment. The compression code map is divided by a predetermined file number n (e.g., n=256). Each divided part is referred to as a segment.

A segment Sg0(1) is a segment having a compression code map of compression files f1 to fn; a segment Sg0(2) is a segment having a compression code map of compression files f(n+1) to f(2n); and a segment Sg0(3) is a segment having a compression code map of compression files f(2n+1) to f(3n).

With regard to the segments, only the segment Sg0(1) is initially present and, when the file number exceeds n due to an addition of files, the segment Sg0(2) is generated and, when the file number exceeds 2n, the segment Sg0(3) is generated. Because of an increase in file number, the last segment Sg0(K) is a segment having a compression code map of compression files ((K−1)n+1) to f(Kn) (where K is the current segment number; K is integer not less than one).

The segments have management areas A1 to AK (a management area group As). The management areas A1 to AK store a pointer to a preceding segment, a pointer to a subsequent segment, pointers to appearance maps making up a compression code map in the segment, a pointer to a deletion map in the segment, and pointers to compression files in the segment.

Since the head segment Sg0(1) has no preceding segment, for example, "00000000h" is stored as the pointer to the preceding segment. The address "00000000h" is a logical address specifying the head segment Sg0(1). Similarly, since the last segment Sg0(K) has no subsequent segment, for example, "0FFFFFFFh" is stored as the pointer to the subsequent segment. In other words, a segment having "0FFFFFFFh" stored as the pointer to the subsequent segment is the last segment.

In the case of K=1, i.e., if only the segment Sg0(1) is present, the pointer to the preceding segment of the segment Sg0(1) is "00000000h" and the pointer to the subsequent segment is "0FFFFFFFh". If a file is added and K=2 is achieved, the pointer to the subsequent segment of the segment Sg0(1) is changed from "0FFFFFFFh" to a "pointer to segment Sg0(2)".

The pointer to the preceding segment of the segment Sg0(2) is stored as a "pointer to segment Sg0(1) (address "00000000h" of the segment Sg0(1))". The pointer to the subsequent segment of the segment Sg0(2) is stored as "0FFFFFFFh". By correlating the preceding segment and the subsequent segment for each segment, a search can be performed on the basis of a segment in a coordinated manner.

Compression code maps M1 to MK (compression code maps Ms) of the segments have appearance maps of the same character data; however, associated file numbers are different. The file numbers associated with the compression code maps M1 to MK of the segments are file numbers of the compression files retained by the respective segments. For example, the compression code map MK of the segment Sg0(K) has bit strings indicative of the presence/absence in terms of file numbers (K−1)n to Kn for the appearance maps of the respective character data.

Deletion maps D1 to Dk (deletion maps Ds) of the segments are different in associated file numbers as is the case with the compression code map group Ms. The file numbers associated with the deletion maps D1 to Dk are file numbers of the compression files retained by the respective segments. For example, the deletion map DK of the segment Sg0(K) has bit strings indicative of the presence or deletion in terms of file numbers (K−1)n to Kn for the appearance maps of the respective character data.

Figure 2:
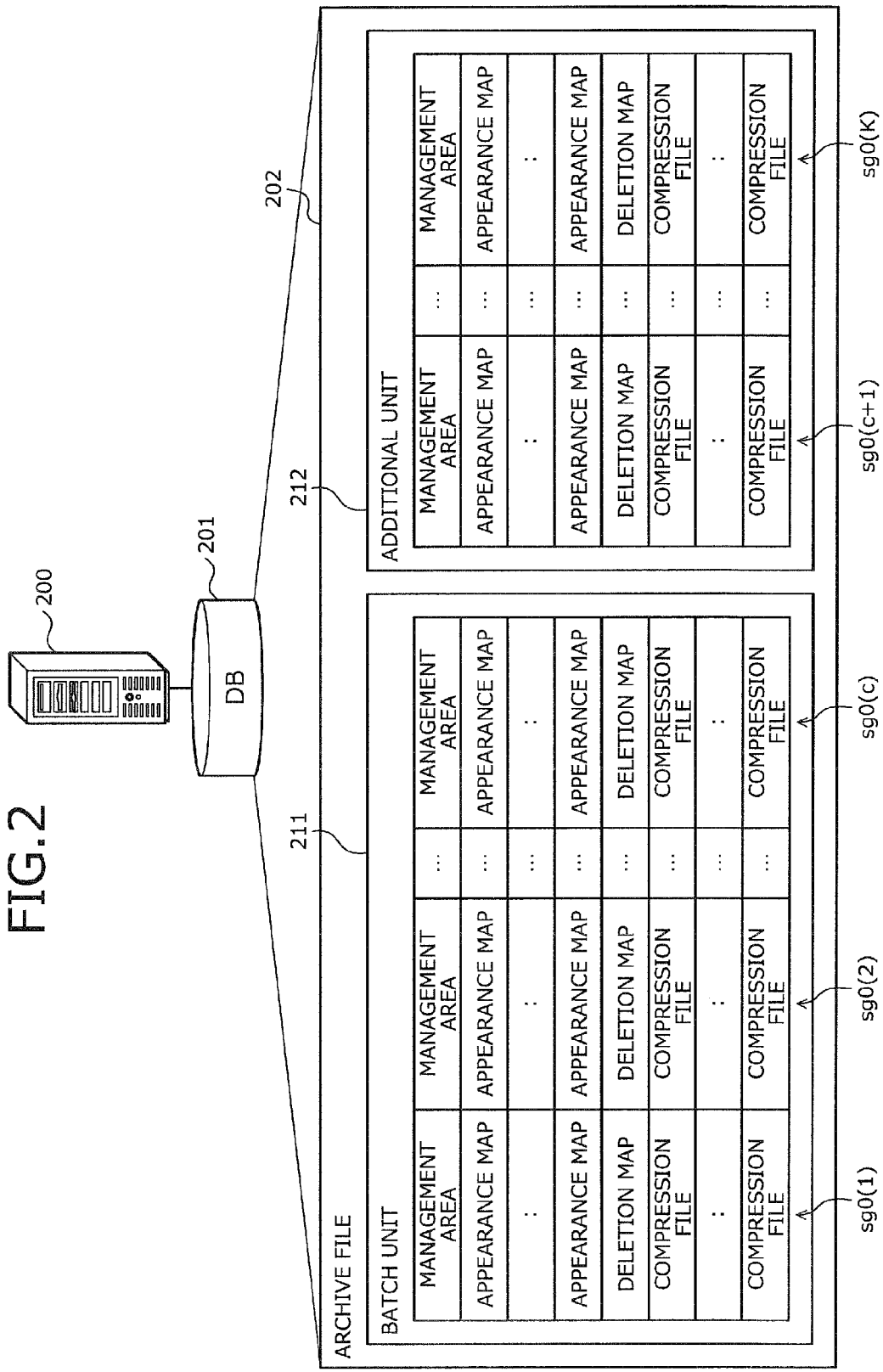
FIG. 2 is an explanatory view of a server storing a segment group.

FIG. 2 is an explanatory view of a server storing a segment group. A server 200 has a database 201. The database 201 stores an archive file 202. The archive file 202 has a batch unit 211 and an additional unit 212. The batch unit 211 stores c segments Sg0(1) to sg0(c) by default. The additional unit 212 stores added segments Sg0(c+1) to sg0(K). If no free space is available in the additional unit 212, a segment is stored in another server capable of communication via a network with the server 200.

FIG. 3 is an explanatory view of an addition example of a compression code map when an object file is added. In (A), the segments sg0(1) and sg0(2) are already registered and the index information of file numbers 1 to 2n is stored in the appearance maps for compression codes P(LT1) to P(LTz) of character data LT1 to LTz.

(B) depicts a state in which the appearance maps are compressed from the state of (A). Although a compression technique will be described later, it is assumed that the compression is performed at the timing when a multiple of the file number n of one segment is reached. In this case, the file number is 2n, which is a multiple of n, and therefore, a bit string, i.e., the index information, is compressed for each appearance map. It is assumed that the appearance maps are decompressed when the presence/absence of the character data LT1 to LTz is checked. A decompression technique will be described later. Since appearance maps are normally compressed and saved and are decompressed as needed, memory saving can be achieved.

(C) depicts a state in which a new compression file f(2n+1) is added to the state of (B). Since the last segment in (B), i.e., the segment sg0(2), cannot store the compression file f(2n+1), the segment sg0(3) is newly set and the compression file f(2n+1) is saved. The compression code map of the segment sg0(3) has a bit for the compression file f(2n+1) set for each compression code. In the example of (C), "1" is set for the character data LT1, LT2, and "0" is set for LTz.

(D) depicts a state in which n compression files f(2n+1) to f(3n) are added in the segment Sg0(3) to the state of (C).

(E) depicts a state in which the index information of the segments Sg0(1) to Sg0(3) is compressed for each compression code because the n compression files f(2n+1) to f(3n) are added in the segment Sg0(3) in the state of (D). When n compression files are accumulated in each segment, the appearance maps are compressed in this way.

FIG. 4 is an explanatory view of a hierarchy of appearance maps. As the segment count increases, a bit string used as index information for each compression code becomes redundant. Although ON/OFF of bits indicative of the presence/absence must be confirmed for each compression code, i.e., each of the character data, for the entire number of files, if the bit strings become redundant, the confirming operations at locations of absence are wasteful and cause an increase in search time. Therefore, if m+1 segments are generated for each compression code, i.e., each character data, the index information is integrated for every m character data.

In description of FIG. 4, by way of example, the index information of the compression code P(LTx) of the character data LTx is integrated into a higher-level layer. X and Y of "sgX(Y)" denote a layer number and a segment number, respectively. Therefore, sgX(Y) indicates a Y-th segment on an X-th layer. The segments sg0(1) to sg0(K) described above are segments on a zero-th layer.

An integration example from the zero-th layer, i.e., a basic layer, to a first layer, i.e., a higher-level layer, will be described. A rule of the integration is that if a bit string defined as index information of a segment on an object layer is all zero, i.e., if the character data LTx is not present in the object files in the segment, the bit string is integrated as "0" that is an index on the higher-level layer. On the other hand, if a bit string defined as index information of a segment on an object layer has at least one "1", i.e., if the character data LTx is present in at least any one of the object files in the segment, the bit string is integrated as "1" that is an index on the higher-level layer.

For example, the segment sg0(1) has "1" and therefore, "1" is set in the segment sg1(1) on the higher-level layer. Similarly, the segment sg0(m) is all zero and therefore, "0" is set in the segment sg1(1) on the higher-level layer. Bit positions in the segment sg1(1) on the higher-level layer indicate the positions of the lower-level segments sg0(1) to sg0(m). A state of index information of a lower-level segment can be identified by a value of a bit in a segment of the higher-level layer.

Such integration is performed not only between the zero-th layer and the first layer and when the number of segments on the highest-level layer reaches m, a segment of a higher-level layer is newly generated. For example, if the segments on the first layer are completed to the segment sg1(m), a segment sg2(1) on a second layer is generated as described above. Although FIG. 4 depicts an example limited to the second layer, the segments are integrated to a third or later layer as the number of added compression files increases.

FIG. 5 is an explanatory view of a hierarchy of deletion maps. The deletion maps are integrated to a higher layer on the basis of a segment as is the case with FIG. 4.

Figure 6:
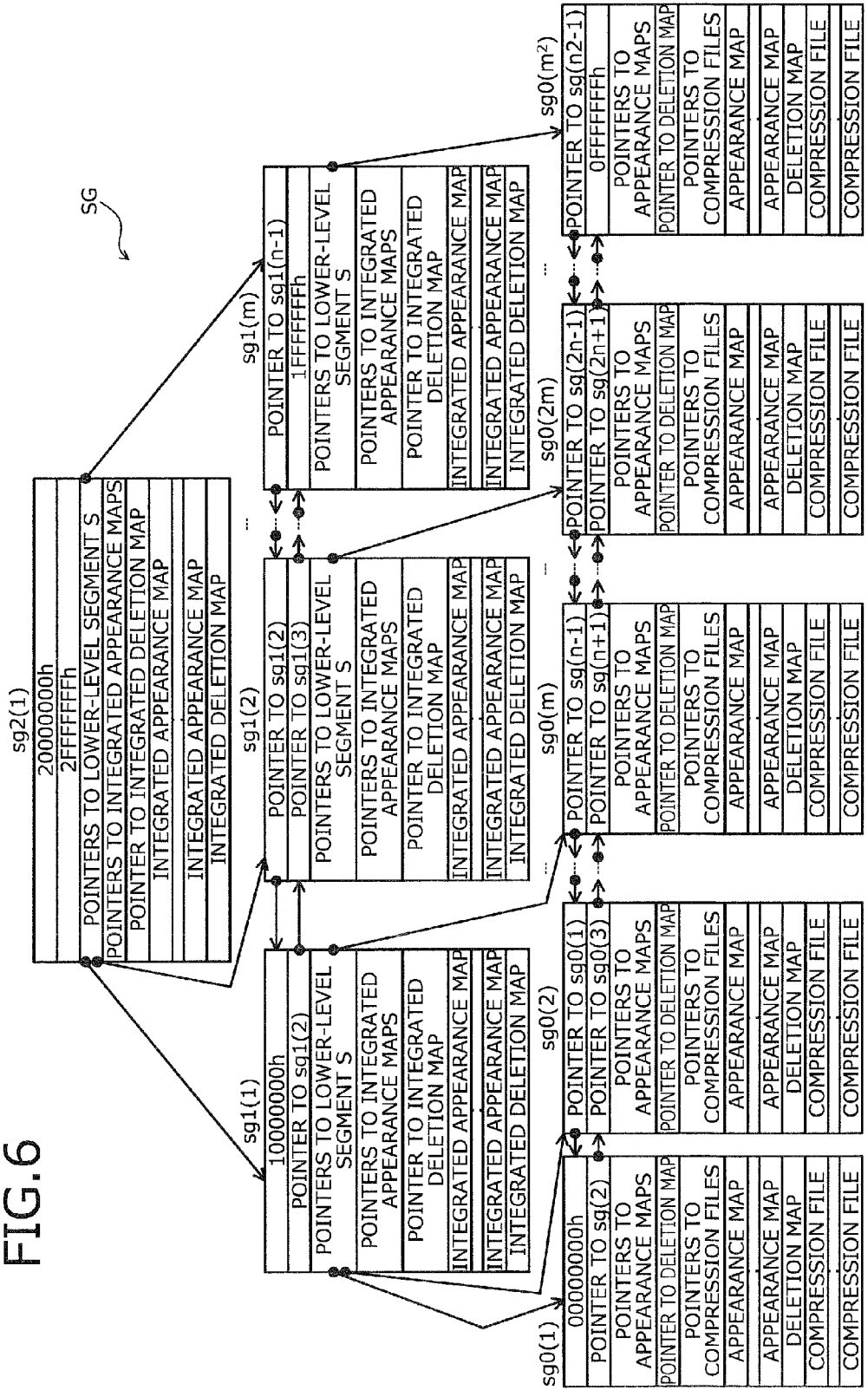
FIG. 6 is an explanatory view of details of a hierarchal segment group.

FIG. 6 is an explanatory view of details of a hierarchal segment group. A hierarchal structure segment group of FIG. 6 has $m^2$ segments sg0(1) to sg0($m^2$) as depicted in FIG. 1 generated on the zero-th layer. Segments sg1(1) to sg1(m) having the same data structure are generated on a higher-level layer. For example, the segments sg1(1) to sg1(m) on the first layer store appearance maps integrated on the zero-th layer (integrated appearance maps) for respective compression codes. In the same way, deletion maps integrated on the zero-th layer (integrated deletion maps) are stored for respective compression codes.

As is the case with the zero-th layer, a pointer to a preceding segment and a pointer to subsequent segment are set in each of the management areas. Pointers to an integrated appearance maps and an integrated deletion map in the segment are also stored. The management area stores respective pointers to the segments on the lower-level layer (lower-level segments). For example, the segment sg1(1) stores a pointer to the segment Sg0(1) to a pointer to the segment Sg0(m) on the lower-level layer so that the segments sg0(1) to sg0(m) can be specified. No compression file is stored in a segment on the first or later layer.

Figure 7:
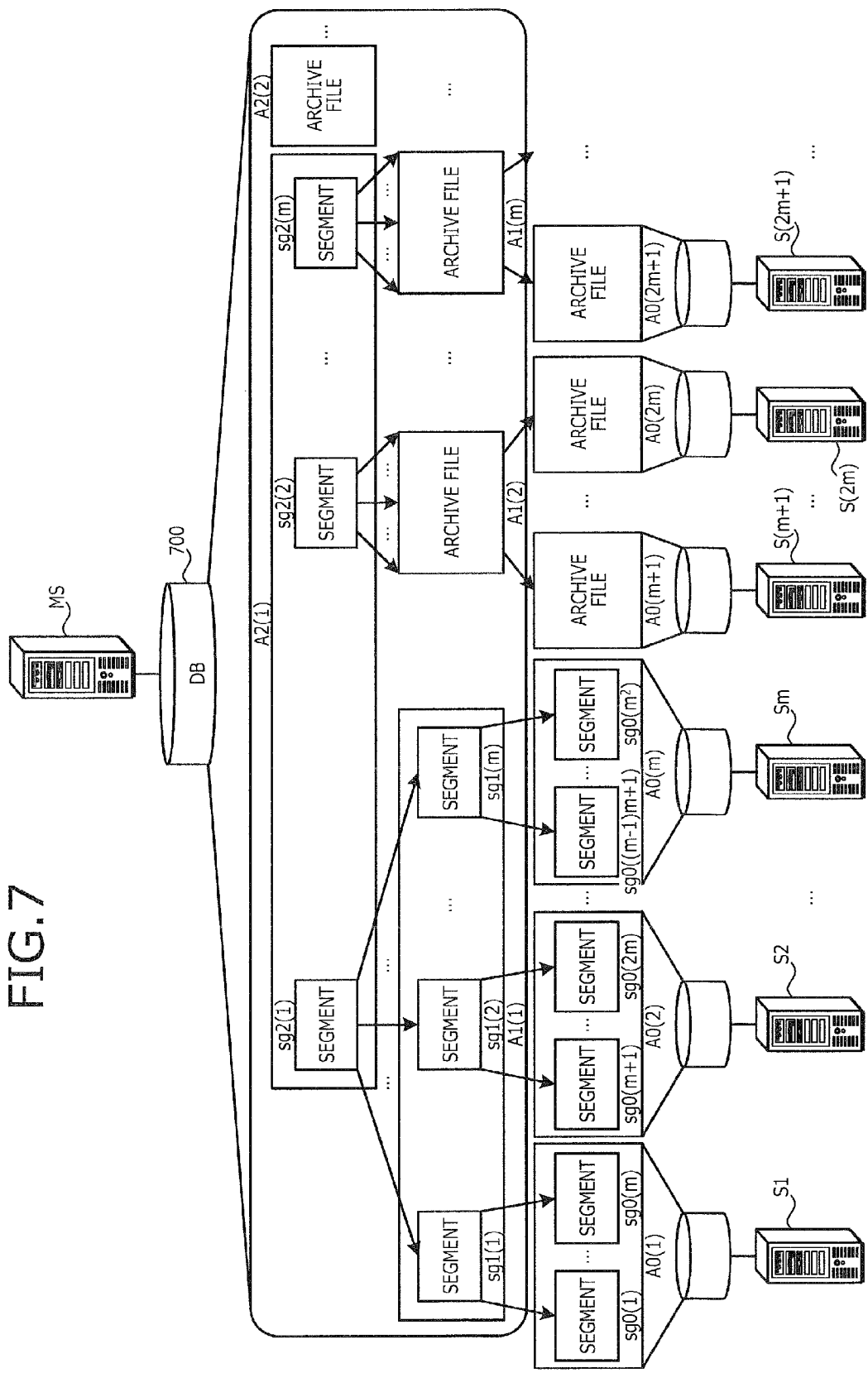
FIG. 7 is an explanatory view of a configuration example of a computer system equipped with the hierarchal structure segment group depicted in FIG. 6.

FIG. 7 is an explanatory view of a configuration example of a computer system equipped with a hierarchal structure segment group SG depicted in FIG. 6. In the hierarchal structure segment group SG in FIG. 7, m segments are considered as one archive file. "AX(Y)" is a code of an archive file, and X and Y denote a layer number and an archive number, respectively. Therefore, AX(Y) indicates a Y-th archive file on an X-th layer. For example, an archive file A0(1) is an aggregate of the segments sg0(1) to sg0(m) on the zero-th layer.

In the example of FIG. 7, a master server MS stores archive files on the first and later layers. Each of slave servers S1, S2, . . . , S(2m+1), . . . stores one archive file assigned by the master server MS. The assignment of the archive files of FIG. 7 is an example, and the archive files on the first and later layers may not all be associated with the master server MS and may be distributed to another server. Each of slave servers S1, S2, . . . , S(2m+1), . . . may be assigned with not only one archive file but also multiple archive files.

Figure 8:
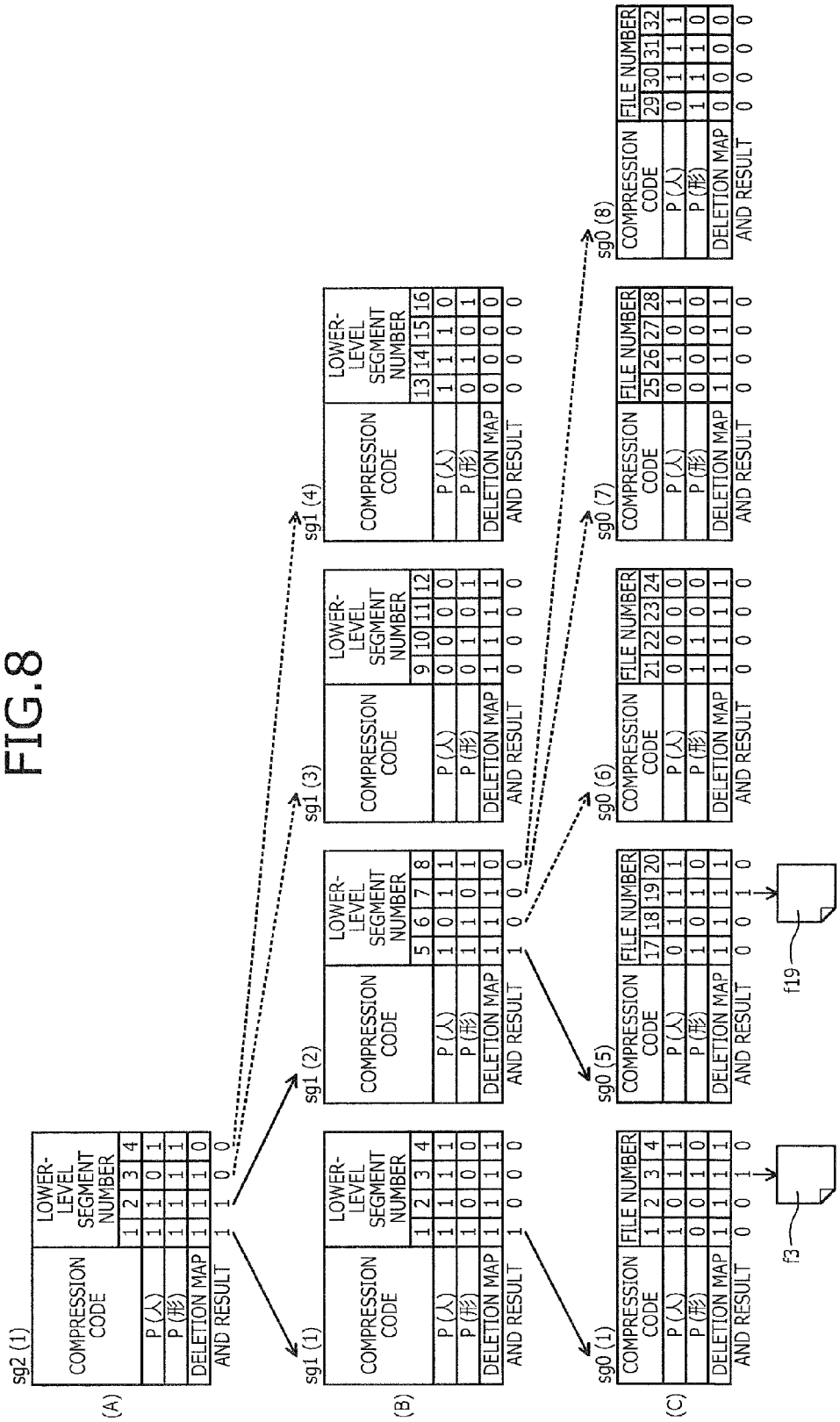
FIG. 8 is an explanatory view of an example of narrowing-down of compression files using the hierarchal structure segment group.

FIG. 8 is an explanatory view of an example of narrowing-down of compression files using the hierarchal structure segment group SG. In FIG. 8, the file number n of a segment on the zero-th layer is set to n=4 and m=4 is used for simplicity of description. Therefore, the zero-th-layer segments sg0(1) to sg0(16) are present while segments not depicted will not be described. In the description of FIG. 8, the highest-level layer is the second layer. In FIG. 8, a solid arrow indicates that a segment on a lower-level layer is specified according to an AND result, and a dotted line arrow is depicted for a segment that is not actually specified, for comparison with the specified segments. FIG. 8 depicts the case that "人形" is input as a search character string.

In (A), an AND operation is performed for an integrated appearance map of a compression code P(人) of character data "人", an integrated appearance map of a compression code P(形) of character data "形", and an integrated deletion map for the segment sg2(1) on the second layer, which is the highest-level layer. The AND result is "1100" and it is found that the character data "人" and "形" are likely to be present in the segments sg1(1) and sg1(2) on the first layer that is a lower-level layer.

The AND result is "0" for the lower-level segment numbers 3 and 4. Therefore, it is found that the respective AND results of the segments sg1(3) and sg1(4) are all zero without performing the AND operations of the segments sg1(3) and sg1(4).

In (B), since the segments sg1(1) and sg1(2) on the first layer are specified from the AND result of the second layer, the AND operations are performed for the segments sg1(1) and sg1(2) as is the case with (A). As a result, the segment sg0(1) is specified from the segment sg1(1) and the segment sg0(5) is specified from the segment sg1(2). Focusing on the segment sg1(2), the AND result is "0" for the lower-level segment numbers 6 to 8. Therefore, it is found that the respective AND results of the segments sg0(6) to sg0(8) are all zero without performing the AND operations of the segments sg0(6) to sg0(8).

In (C), since the segments sg0(1) and sg0(5) on the zero-th layer are specified from the AND result on the first layer, the AND operations are performed for the sg0(1) and sg0(5) as is the case with (A) and (B). As a result, a file number 3 is specified from the segment sg0(1) and a file number 19 is specified from the segment sg0(5). Therefore, it is found that both of the character data "人" and "形" are present in compression files f3 and f19.

Figure 9:
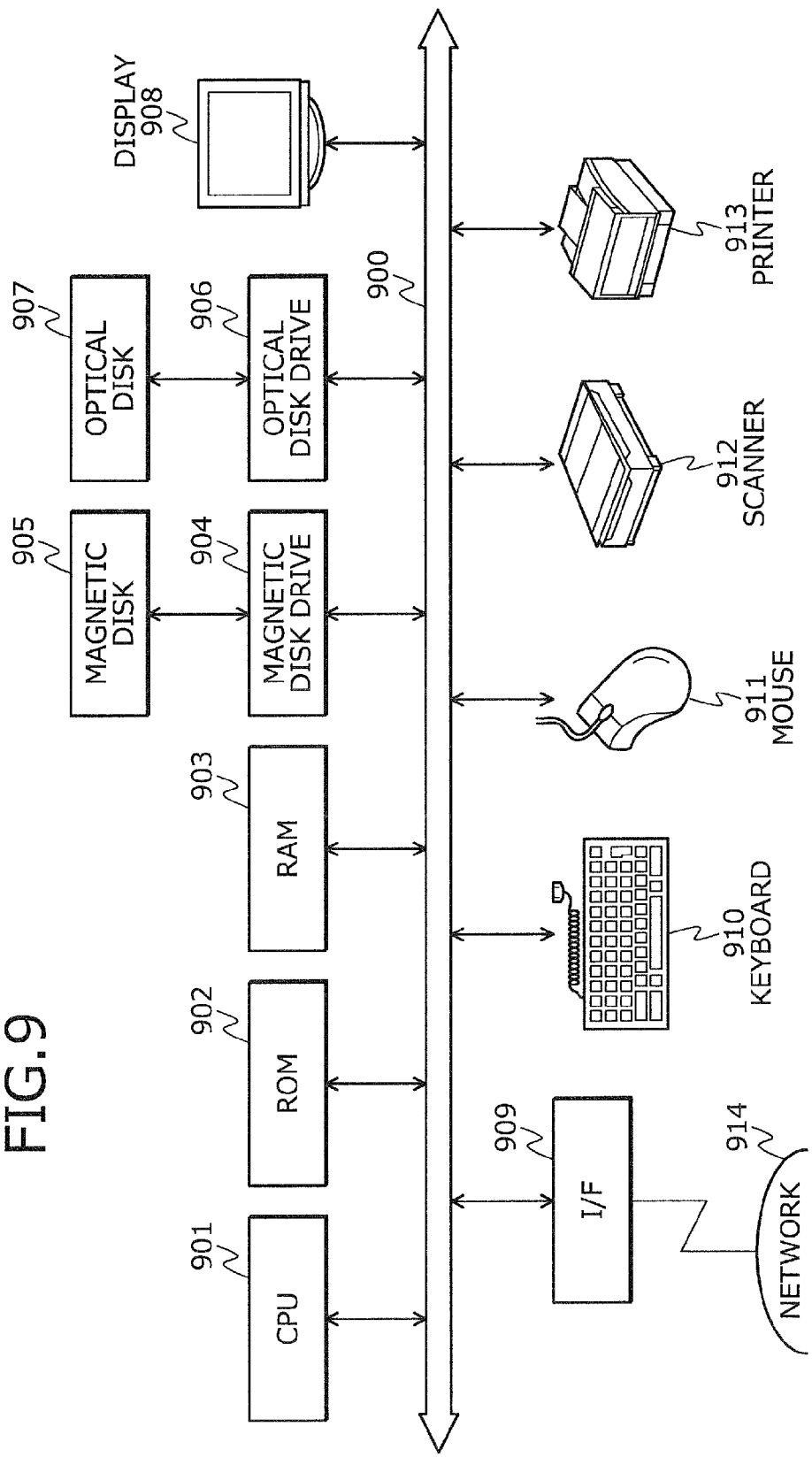
FIG. 9 is a block diagram of a hardware configuration of a computer according to the embodiment.

FIG. 9 is a block diagram of a hardware configuration of a computer according to the embodiment. As depicted in FIG. 9, the computer includes a central processing unit (CPU) 901, a read-only memory (ROM) 902, a random access memory (RAM) 903, a magnetic disk drive 904, a magnetic disk 905, an optical disk drive 906, an optical disk 907, a display 908, an interface (I/F) 909, a keyboard 910, a mouse 911, a scanner 912, and a printer 913, respectively connected by a bus 900.

The CPU 901 governs overall control of the computer. The ROM 902 stores therein programs such as a boot program. The ROM 902 also stores a program for generating/managing the compression code map Ms and a search program that uses the compression code map Ms. The RAM 903 is used as a work area of the CPU 901, and the CPU 901 reads the program stored in the ROM 902 into the RAM 903 for execution. The magnetic disk drive 904, under the control of the CPU 901, controls the reading and writing of data with respect to the magnetic disk 905. The magnetic disk 905 stores therein data written under control of the magnetic disk drive 904.

The optical disk drive 906, under the control of the CPU 901, controls the reading and writing of data with respect to the optical disk 907. The optical disk 907 stores therein data written under control of the optical disk drive 906, the data being read by an information processing apparatus.

The display 908 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 908.

The I/F 909 is connected to a network 914 such as a local area network (LAN), a wide area network (WAN), and the Internet through a communication line and is connected to other apparatuses through the network 914. The I/F 909 administers an internal interface with the network 914 and controls the input/output of data from/to external apparatuses. For example, a modem or a LAN adaptor may be employed as the I/F 909.

The keyboard 910 includes, for example, keys for inputting letters, numerals, and various instructions and performs the input of data. Alternatively, a touch-panel-type input pad or numeric keypad, etc. may be adopted. The mouse 911 is used to move the cursor, select a region, or move and change the size of windows. A track ball or a joy stick may be adopted provided each respectively has a function similar to a pointing device.

The scanner 912 optically reads an image and takes in the image data into the computer. The scanner 912 may have an optical character reader (OCR) function as well. The printer 913 prints image data and text data. The printer 913 may be, for example, a laser printer or an ink jet printer.

The computer may be various servers described above or a stand-alone personal computer as well as a portable terminal such as a portable telephone, a smartphone, an electronic book terminal, and a notebook personal computer. The embodiment may be implemented on the basis of multiple computers.

Figure 10:
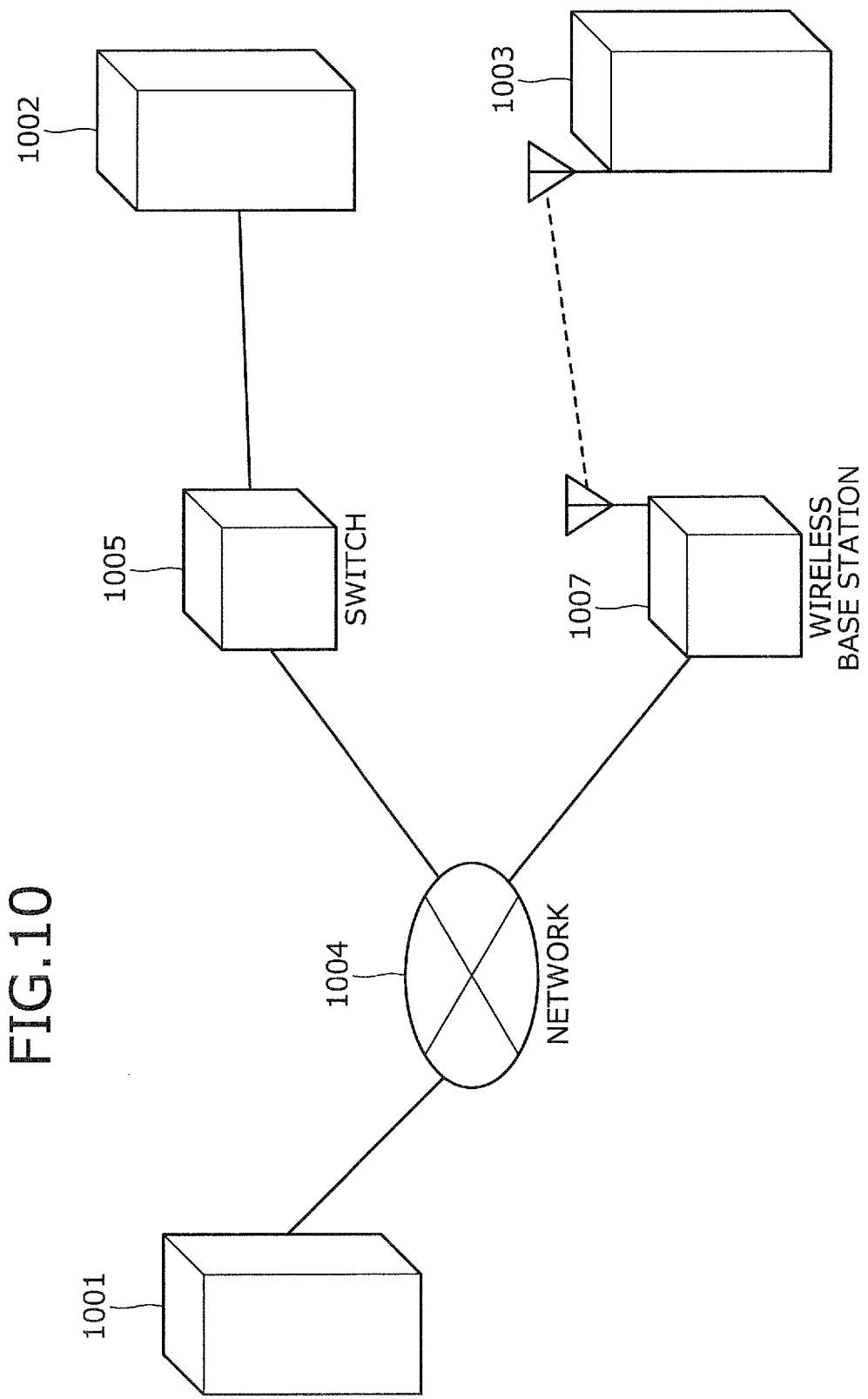
FIG. 10 is an explanatory view of a system configuration example according to the embodiment.

FIG. 10 is an explanatory view of a system configuration example according to the embodiment. In FIG. 10, a system includes computers 1001 to 1003 that may include the hardware depicted in FIG. 9, a network 1004, a switch 1005, and a wireless base station 1007. An I/F included in the computer 1003 has a wireless communication function.

For example, the computer 1001 may execute a process of generating a compression code map for contents including multiple files for delivery to the computers 1002 and 1003, and each of the computers 1002 and 1003 may execute a search process for the delivered contents.

Alternatively, the computer 1001 may execute a process of generating a compression code map for contents including multiple files and the computer 1001 may accept a search request for contents from the computer 1002 or the computer 1003, execute a search process, and return a result of the executed search process to each of the computer 1002 and the computer 1003 in another configuration. As is the case with FIG. 2, each of the computers 1001 to 1003 may be various servers described above or stand-alone personal computers as well as portable terminals such as portable telephones, smartphones, electronic book terminals, and notebook personal computers.

<First Functional Configuration Example>

Figure 11:
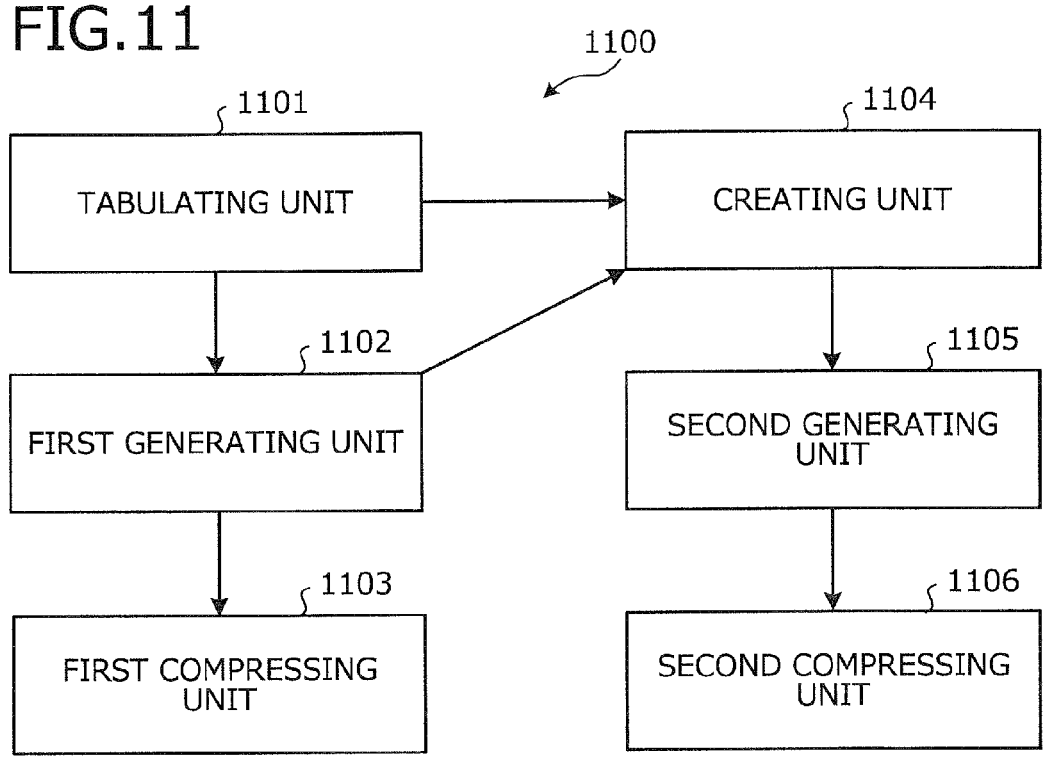
FIG. 11 is a block diagram of a first functional configuration example of a computer or a computer system according to the embodiment.
Figure 12:
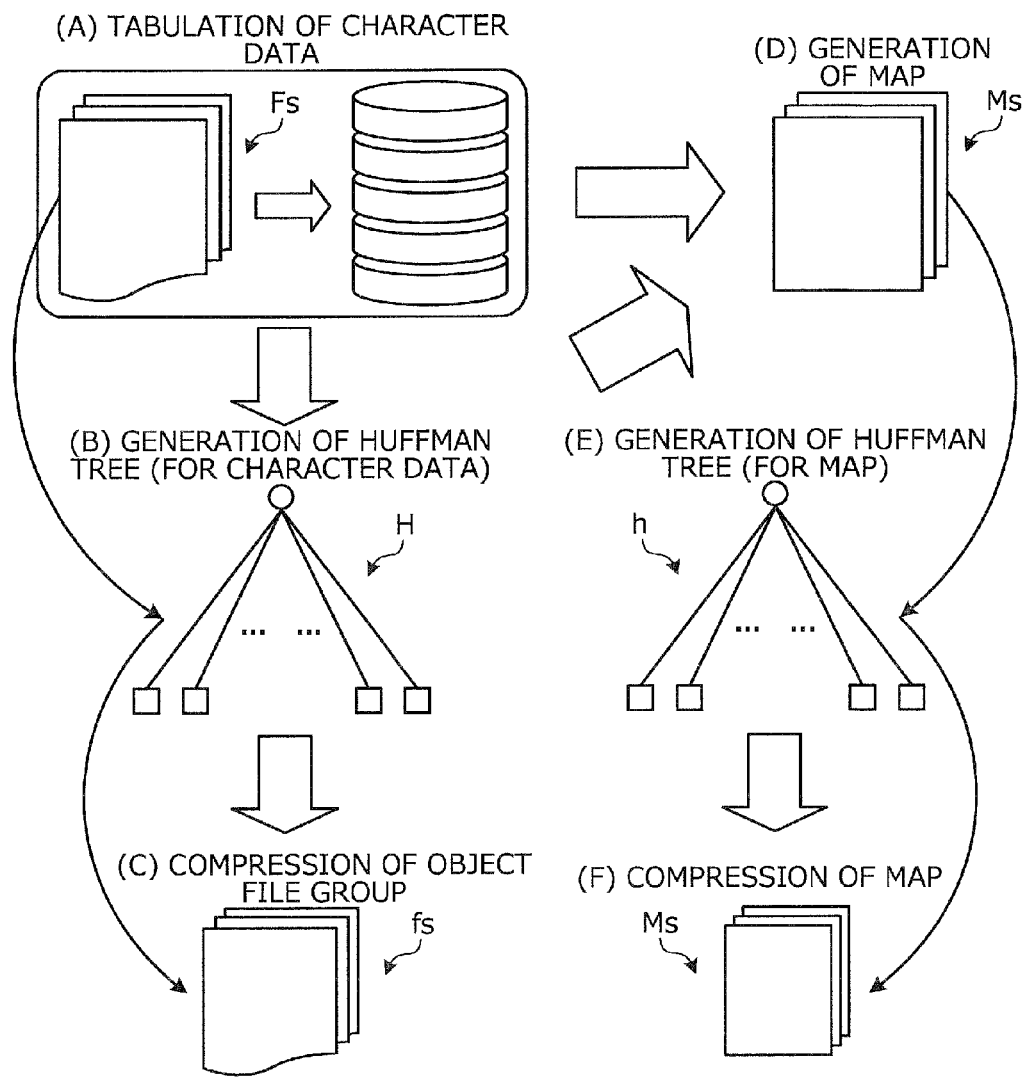
FIG. 12 is an explanatory view of a flow of processing from a tabulating unit to a second compressing unit of the computer or the computer system depicted in FIG. 11.

FIG. 11 is a block diagram of a first functional configuration example of a computer or a computer system according to the embodiment and FIG. 12 is an explanatory view of a flow of processing from a tabulating unit to a second compressing unit of the computer or the computer system depicted in FIG. 11. In FIG. 11, a computer or a computer system (hereinafter, a "computer 1100") includes a tabulating unit 1101, a first generating unit 1102, a first compressing unit 1103, a creating unit 1104, a second generating unit 1105, and a second compressing unit 1106.

For example, the functions of the tabulating unit 1101 to the second compressing unit 1106 are implemented as an extracting apparatus by causing the CPU 901 to execute programs stored in a storage device such as the ROM 902, the RAM 903, and the magnetic disk 905 depicted in FIG. 9. Each of the tabulating unit 1101 to the second compressing unit 1106 writes an execution result into the storage device and reads an execution result of another unit to perform calculations. The tabulating unit 1101 to the second compressing unit 1106 will hereinafter briefly be described.

The tabulating unit 1101 tabulates the appearance counts of character data in an object file group. For example, the tabulating unit 1101 tabulates the appearance counts of character data in the object file group Fs as depicted in (A) of FIG. 12. The tabulating unit 1101 counts the respective appearance counts of specific single characters, upper divided character codes, lower divided character codes, bi-gram characters, and basic words. Detailed process contents of the tabulating unit 1101 will be described later.

The first generating unit 1102 generates a $2^N$-branch nodeless Huffman tree H based on the tabulation result of the tabulating unit 1101 (FIG. 12(B)). The $2^N$-branch nodeless Huffman tree H is a Huffman tree having $2^N$ branches branched from a root to directly point leaves with one or more branches. No node (inner node) is present. Since no node is present and leaves are directly hit, a decompression rate can be accelerated as compared to a normal Huffman tree having nodes. A leaf is a structure including corresponding character data and a compression code thereof. A leaf is also referred to as a leaf structure. The branch count assigned to a leaf depends on a compression code length of a compression code present in the leaf to which the branches are assigned. Detailed process contents of the first generating unit 1102 will be described later.

The first compressing unit 1103 compresses the object files of the object file group Fs into a compression file group fs by using the $2^N$-branch nodeless Huffman tree H (FIG. 12(C)). Detailed process contents of the first compressing unit 1103 will be described later.

The creating unit 1104 creates a compression code map Ms based on the tabulation result of the tabulating unit 1101 and a compression code assigned to each character data in the $2^N$-branch nodeless Huffman tree H. The creating unit 1104 creates the respective compression code maps Ms for specific single characters, upper divided character codes, lower divided character codes, bi-gram characters, and basic words. If a corresponding character data appears at least once in an object file, the creating unit 1104 sets the bit of the file number to ON in the compression code map Ms (FIG. 12(D)). In an initial state, all the object files are set to ON in a deletion map Ds. Detailed process contents of the creating unit 1104 will be described later.

The second generating unit 1105 generates a nodeless Huffman tree h for compressing an appearance map based on appearance probability of character data (FIG. 12(E)). Detailed process contents of the second generating unit 1105 will be described later. In the case of the computer system depicted in FIG. 7, the nodeless Huffman tree generated by the second generating unit 1105 of the master server MS is transmitted to the slave servers S1, S2, . . . .

The second compression unit 1106 compresses the appearance maps by using the nodeless Huffman tree generated by the second generating unit 1105 (FIG. 12(F)). Detailed process contents of the second compression unit 1106 will be described later. In the case of the computer system depicted in FIG. 7, the slave servers S1, S2, . . . use the Huffman tree generated and transmitted by the second generating unit 1105 of the master server MS to compress the appearance maps in the slave servers S1, S2, . . . with the second compression unit 1106.

<Details of Tabulation and Creation of Compression Code Map Ms>

Details of the tabulation by the tabulating unit 1101 and the creation of the compression code map Ms by the creating unit 1104 will be descried. When the compression code map Ms is created, the tabulating unit 1101 must tabulate the appearance counts of character data from the object file group Fs and the first generating unit 1102 must generate the $2^N$-branch nodeless Huffman tree H before the creation.

Figure 13:
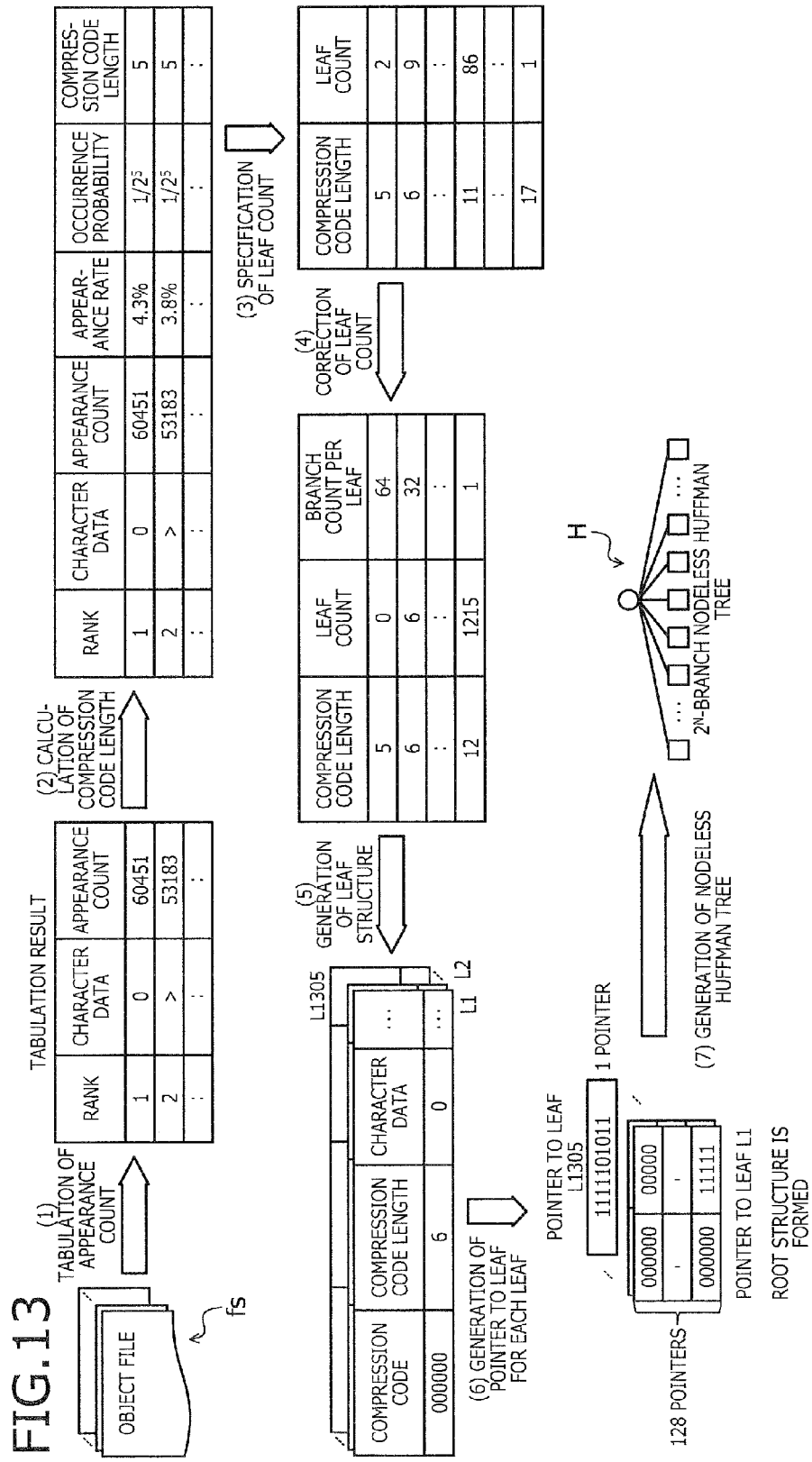
FIG. 13 is an explanatory view of an example of tabulation by the tabulating unit and creation of a compression code map Ms by a creating unit.

FIG. 13 is an explanatory view of an example of the tabulation by the tabulating unit 1101 and the creation of the compression code map Ms by the creating unit 1104.

(1) Tabulation of Appearance Count

The computer 1100 tabulates the appearance count of character data present in the object file group Fs. A tabulation result is sorted in descending order of the appearance count and ranks are given in ascending order from the highest appearance count. In this description, it is assumed that the total count of types of the character data is 1305 (<2048 (=$2^{11}$)) by way of example. Details of (1) Tabulation of Appearance Count will be described with reference to FIG. 14.

(2) Calculation of Compression Code Length

The computer 1100 calculates a compression code length for each of the character data based on the tabulation result acquired in (1). For example, the computer 1100 calculates an appearance rate for each of the character data. The appearance rate can be obtained by dividing the appearance count of a character data by the total count of appearances of all the character data. The computer 1100 obtains an occurrence probability corresponding to the appearance rate and derives a compression code length from the occurrence probability.

The occurrence probability is expressed by $1/2^x$. X is an exponent. A compression code length is the exponent X of the occurrence probability. For example, the compression code length is determined depending on which of the following ranges the occurrence probability falls within. AR is an appearance rate.

| | |
|---|---|
| $1/2^0 > AR \geq 1/2^1$ | Compression code length is 1 bit. |
| $1/2^1 > AR \geq 1/2^2$ | Compression code length is 2 bits. |
| $1/2^2 > AR \geq 1/2^3$ | Compression code length is 3 bits. |
| $1/2^3 > AR \geq 1/2^4$ | Compression code length is 4 bits. |
| ... | |
| $1/2^{N-1} > AR \geq 1/2^N$ | Compression code length is N bits. |

Details of (2) Calculation of Compression Code Length will be described with reference to FIG. 15.

(3) Specification of Leaf Count

The computer 1100 tabulates the leaf count for each compression code length to specify the leaf count for each compression code length. In this example, it is assumed that the maximum compression code length is 17 bits. The leaf count is the number of types of character data. Therefore, if the leaf count at the compression code length of 5 bits is two, this indicates that two character data assigned with a five-bit compression code are present.

(4) Correction of Leaf Count

The computer 1100 corrects the leaf count. For example, the computer 1100 makes corrections such that an exponent N of the upper limit $2^N$ of the branch count is the maximum compression code length. For example, in the case of the exponent N=11, the sum of the leaf count at the compression code lengths from 11 to 17 bits is defined as the corrected leaf count at the compression code length of 11 bits. The computer 1100 assigns the branch count per leaf for each compression code length. For example, the branch count per leaf is determined as $2^0$, $2^1$, $2^2$, $2^3$, $2^4$, $2^5$, and $2^6$ for the compression code lengths after the correction in descending order.

For example, in FIG. 13, while the total count of the character data (the leaf count) assigned with a compression code having the compression code length of 11 bits is 1215, the branch count per leaf is one. To each of the character data assigned with a compression code having the compression code length of 11 bits, only one branch is assigned. On the other hand, while the total count of the character data (the leaf count) assigned with a compression code having the compression code length of 6 bits is 6, the branch count per leaf is 32. To each of the character data assigned with a compression code having the compression code length of 6 bits, 32 branches are assigned. The correction of the leaf count of (4) may be performed as needed or may not be performed.

(5) Generation of Leaf Structure

The computer 1100 then generates a leaf structure. The leaf structure is a data structure formed by correlating character data, a compression code length thereof, and a compression code of the compression code length. For example, a compression code length of a character "0" ranked in the first place of the appearance ranking is 6 bits and the compression code is "000000". In the example depicted in FIG. 13, the number of types of the character data (the leaf count) is 1305 and therefore, structures of a leaf L1 to a leaf L1305 are generated. Details of (3) Specification of Leaf count to (5) Generation of Leaf Structure (N=11) will be described with reference to FIG. 16.

(6) Generation of Pointer to Leaf

The computer 1100 then generates a pointer to leaf for each leaf structure. The pointer to leaf is a bit string acquired by concatenating a compression code in a leaf structure pointed to and a bit string corresponding to the branch count of the leaf. For example, since the compression code length of the compression code "000000" assigned to the character "0" of the leaf L1 is 6 bits, the branch count of the leaf L1 is 32.

Therefore, the head six bits of the pointers to the leaf L1 is the compression code "000000". The subsequent bit strings are 32 ($=2^5$) types of bit strings represented by the branch count of the leaf L1. As a result, 32 types of 5-bit bit strings are subsequent bit strings of the compression code "000000". Therefore, the pointers to the leaf L1 are 32 types of 11-bit bit strings with the head six bits fixed to "000000". If the branch count per leaf is one, one pointer to the leaf is present, and the compression code and the pointer to the leaf are the same bit strings. Details of (6) Generation of Pointer to Leaf will be described with reference to FIG. 18.

(7) Construction of $2^N$-Branch Nodeless Huffman Tree

Lastly, the computer 1100 constructs a $2^N$-branch nodeless Huffman tree. For example, pointers to leaf are used as a root to construct the $2^N$-branch nodeless Huffman tree that directly specifies leaf structures. If the compression code string is an 11-bit bit string having "000000" as the head six bits, the structure of the leaf L1 of the character "0" can be pointed by the $2^N$-branch nodeless Huffman tree regardless of which one of 32 types of bit strings corresponds to the subsequent five bits. Details of (7) Construction of $2^N$-Branch Nodeless Huffman Tree will be described with reference to FIG. 19.

Figure 14:
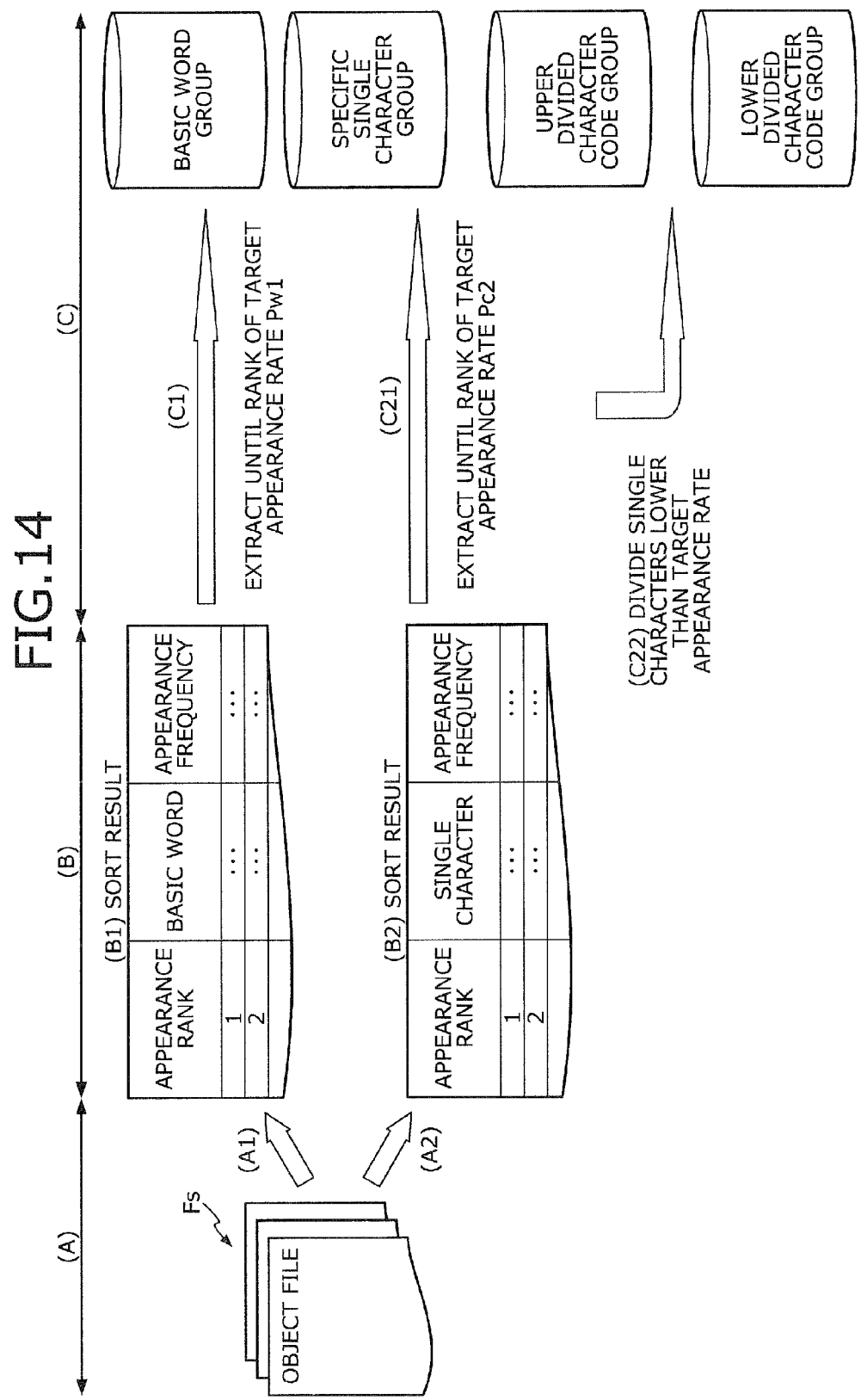
FIG. 14 is an explanatory view of details of (1) Tabulation of the Appearance Count.

FIG. 14 is an explanatory view of details of (1) Tabulation of the Appearance Count. In FIG. 14, the computer 1100 executes three phases, i.e., (A) tabulation from the object file group Fs, (B) sort in descending order of appearance frequency, and (C) extraction until the rank of the target appearance rate. The three phases will hereinafter be described separately for basic words and single characters.

(A1) First, the computer 1100 reads the object file group Fs to tabulate the appearance frequency (appearance count) of basic words. The computer 1100 refers to a basic word structure and, if a character string identical to a basic word in the basic word structure is present in an object file, the computer adds one to the appearance frequency of the basic word (default value is zero). The basic word structure is a data structure having descriptions of basic words.

(B1) Once the tabulation of basic words in the object file group Fs is completed, the computer 1100 sorts a basic word appearance frequency tabulation table in descending order of the appearance frequency. In other words, the table is sorted in the order from the highest appearance frequency and the basic words are ranked in the order from the highest appearance frequency.

(A2) The computer 1100 reads the object file group Fs to count the appearance frequency of single characters. For example, the computer 1100 adds one to the appearance frequency of the single characters (default value is zero).

(B2) Once the tabulation of single characters in the object file group Fs is completed, the computer 1100 sorts a single character appearance frequency tabulation table in descending order of the appearance frequency. In other words, the table is sorted in the order from the highest appearance frequency and the single characters are ranked in the order from the highest appearance frequency.

(C1) The computer 1100 then refers to the basic word appearance frequency tabulation table after the sorting of (B1) to extract the basic words ranked within a target appearance rate Pw. For example, the computer 1100 calculates the target appearance rate Pw to each rank by using the sum of appearance frequencies (the total appearance frequency) of all the basic words as a denominator and accumulating the appearance frequencies in descending order from the basic word ranked in the first place to obtain a numerator.

For example, assuming that the total appearance frequency is 40000 and that the cumulative appearance frequency of basic words from the first place to the y-th place is 30000, the appearance frequency within the y-th place is (40000/30000)×100=75 [%]. If the target appearance rate Pw is 75 [%], the basic words ranked in the top y are extracted.

(C21) The computer 1100 then refers to the single character appearance frequency tabulation table after the sorting of (B2) to extract the single characters ranked within a target appearance rate Pc. For example, the computer 1100 calculates an appearance rate to each rank by using the sum of appearance frequencies (the total appearance frequency) of all the single characters as a denominator and accumulating the appearance frequencies in descending order from the single character ranked in the first place to obtain a numerator.

For example, assuming that the total appearance frequency is 50000 and that the cumulative appearance frequency of single characters from the first place to the y-th place is 40000, the appearance frequency within the y-th place is (50000/40000)×100=80 [%]. If the target appearance rate Pc is 80 [%], the single characters ranked in the top y are extracted. A single character extracted at (C21) is referred to as "specific single character(s)" so as to distinguish the character from original single characters.

(C22) Among single characters, a single character excluded from the specific single characters (hereinafter, "nonspecific single character(s)") has appearance frequency lower than each of the specific single characters and therefore, the character code thereof is divided. For example, a character code of a nonspecific single character is divided into a character code of upper bits and a character code of lower bits.

For example, if the single character is represented by a UTF 16-bit character code, the character code is divided into a character code of upper 8 bits and a character code of lower 8 bits. In this case, each of the divided character codes is represented by a code from 0x00 to 0xFF. The character code of the upper bits is an upper divided character code and the character code of the lower bits is a lower divided character code.

FIG. 15 is an explanatory view of details of (2) Calculation of Compression Code Length (N=11) depicted in FIG. 13. A character data table of FIG. 15 is a table reflecting the tabulation result in (1) depicted in FIG. 13 and has a rank field, decompression type field, a code field, a character field, an appearance count field, a total count field, an appearance rate field, an uncorrected occurrence probability field, and a compression code length field set for character data. Among these fields, the rank field to the total count field are information acquired as a result of re-sorting.

In the rank field, ranks (in ascending order) are written in descending order of the appearance count of character data. In the decompression type field of character data fields, types of character data are written. (A single character of) a 16-bit code is denoted by "16". An 8-bit divided character code is denoted by "8". "基" indicates a basic word.

In the code field of the character data fields, a specific single character or a divided character code is written. In the case of a basic word, this field is left blank. In the character field of the character data fields, a character or a basic word is written. In the case of a divided character code, this field is left blank. In the appearance count field, the appearance count of character data in the object file group Fs is written. In the total count field, the total count of appearances of all the character data is written.

In the appearance rate field, a value acquired by dividing the appearance count by the total count is written as an appearance rate. In the occurrence probability field of uncorrected fields, occurrence probability corresponding to the appearance rate is written. In the compression code length field, a compression code length corresponding to the occurrence probability, i.e., an exponent y of the occurrence probability $1/2^y$ is written as a compression code length.

FIG. 16 is an explanatory view of details of (3) Specification of Leaf count to (5) Generation of Leaf Structure (N=11) depicted in FIG. 13. A result of tabulation of the leaf count (the total count of types of character data) on the basis of the compression code length in the character data table of FIG. 15 is the uncorrected leaf count in FIG. 16. Correction A is correction for aggregating the leaf count assigned to compression code lengths equal to or greater than the upper limit length N of the compression code length (i.e., the exponent N of the maximum branch count $2^N$ of the $2^N$-branch nodeless Huffman tree) to the upper limit length N of the compression code length. In this case, although the maximum compression code length before the correction is 17 bits, the total count of types of the character data is 1305 and therefore, the upper limit length N of the compression code length is N=11. Thus, with the correction A, the leaf count at the compression code length of 11 bits is set to the sum of the leaf counts at the compression code lengths from 11 to 17 bits (1190).

The computer 1100 obtains the total occurrence probability. Since the occurrence probability of each compression code length is determined ($1/2^5$ in the case of 5 bits), a multiplication result of each compression code length is acquired by multiplying the occurrence probability by the leaf count for each compression code length. For example, the leaf count at the compression code length of 5 bits with the correction A is two. The occurrence probability of the compression code length of 5 bits is $1/2^5$. Therefore, the occurrence probability of the compression code length of 5 bits with the correction A is $2\times(1/2^5)=1/2^4$. The compression code length occurrence probability with the correction A is also obtained for the compression code length equal to or greater than 6 bits. By summing the occurrence probabilities of the compression code lengths after the correction A, the total occurrence probability with the correction A is acquired.

The computer 1100 determines whether the total occurrence probability is equal to or less than one. A threshold value t is 0≤t≤1. If it is not desired to provide the threshold value t, t=1 may be used. If less than the threshold value t, a shift to correction B is made. If equal to or greater than the threshold value t and equal to or less than one, the leaf count at each compression code length at this point is fixed without shifting to the correction B.

The correction B is correction for updating the leaf count without changing the compression code lengths (5 bits to 12 bits) in the correction A. For example, this is the correction performed if the total occurrence probability with the correction A is not equal to or greater than the threshold value t or not equal to or less than one. In particular, the correction B includes two types.

In one type of the correction, if the total occurrence probability is less than the threshold value t, the total occurrence probability is increased until the maximum value of the total occurrence probability equal to or less than one is acquired, for example, until the total occurrence probability converges to a maximum asymptotic value (hereinafter, correction B$^+$). In the other type of the correction, if the total occurrence probability is greater than one, the total occurrence probability is reduced until the maximum value equal to or less than one is acquired after the total occurrence probability becomes equal to or less than one, for example, until the total occurrence probability converges to a maximum asymptotic value (hereinafter, correction B$^-$).

In the example depicted in FIG. 16, since the total occurrence probability with the correction A is "1.146", the correction B$^-$ is performed. The same correction is performed by dividing the leaf count by the total occurrence probability in the correction B regardless of whether the correction B$^+$ or correction B$^-$.

At the first time of the correction B$^-$ (correction B$^-$1), the leaf count with the correction A at each compression code length is divided by the total occurrence probability (1.146) of the previous correction (the correction A in this case) to update the leaf count. Figures after the decimal point may be rounded down or rounded off. For the upper limit N of the compression code length in the correction A (N=11 bits), the leaf count at the upper limit N of the compression code length is obtained by subtracting the total count of leaves with the correction B$^-$1 at the compression code lengths (except the leaf count at the upper limit length N of the compression code length) from the total count of leaves (1305) rather than dividing by the total occurrence probability (1.146) of the previous correction (the correction A in this case). In this case, the leaf count is 1208.

The computer 1100 obtains the total occurrence probability with the correction B$^-$1 from the computing process same as the case of the correction A. The computer 1100 then determines whether the total occurrence probability with the correction B$^-$1 converges to the maximum asymptotic value equal to or less than one. If the total occurrence probability with the correction B$^-$1 does not converge to the maximum asymptotic value equal to or less than one, a shift to the second correction B$^-$ (correction B$^-$2) is made. If converging to the maximum asymptotic value, the leaf count at each compression code length at this point is fixed without shifting to the correction B$^-$2. Since the total occurrence probability "1.042" updated with the correction B$^-$1 is greater than one and does not converge to the maximum asymptotic value, the shift to the correction B$^-$2 is made.

In the correction B$^-$2, the leaf count with the correction B$^-$1 at each compression code length is divided by the total occurrence probability (1.042) of the previous correction (the correction B$^-$1 in this case) to update the leaf count. Figures after the decimal point may be rounded down or rounded off. For the upper limit N of the compression code length in the correction B$^-$1 (N=11 bits), the leaf count at the upper limit N of the compression code length is obtained by subtracting the total count of leaves with the correction B$^-$2 at the compression code lengths (except the leaf count at the upper limit length N of the compression code length) from the total count of leaves (1305) rather than dividing by the total occurrence probability (1.042) of the previous correction (the correction B$^-$1 in this case). In this case, the leaf count is 1215.

The computer 1100 obtains the total occurrence probability with the correction B$^-$2 from the computing process same as the case of the correction B-1. The computer 1100 then determines whether the total occurrence probability with the correction B$^-$2 converges to the maximum asymptotic value equal to or less than one. If the total occurrence probability with the correction B$^-$2 does not converge to the maximum asymptotic value equal to or less than one, a shift to the third correction B$^-$ (correction B$^-$2) is made. If converging to the maximum asymptotic value, the leaf count at each compression code length at this point is fixed without shifting to the correction B$^-$3. Since the total occurrence probability "0.982" updated with the correction B$^-$2 is one or less and convergence to the maximum asymptotic value is indeterminate, the shift to the correction B$^-$3 is made.

In the correction B$^-$3, the leaf count with the correction B$^-$2 at each compression code length is divided by the total occurrence probability (0.982) of the previous correction (the correction B$^-$2 in this case) to update the leaf count. Figures after the decimal point may be rounded down or rounded off. For the upper limit N of the compression code length in the correction B$^-$2 (N=11 bits), the leaf count at the upper limit N of the compression code length is obtained by subtracting the total count of leaves with the correction B$^-$2 at the compression code lengths (except the leaf count at the upper limit length N of the compression code length) from the total count of leaves (1305) rather than dividing by the total occurrence probability (0.982) of the previous correction (the correction B$^-$1 in this case). In this case, the leaf count is 1215.

The computer 1100 obtains the total occurrence probability with the correction B$^-$3 from the computing process same as the case of the correction B-2. The computer 1100 then determines whether the total occurrence probability with the correction B$^-$3 converges to the maximum asymptotic value equal to or less than one. If the total occurrence probability with the correction B$^-$3 does not converge to the maximum asymptotic value equal to or less than one, a shift to the fourth correction B$^-$ (correction B$^-$4) is made. If converging to the maximum asymptotic value, the leaf count at each compression code length at this point is fixed without shifting to the correction B$^-$4.

The total occurrence probability "0.982" updated with the correction B$^-$3 is the same value as the total occurrence probability "0.982" updated with the correction B$^-$2. In other words, the leaf counts at the compression code lengths with the correction B$^-$3 are the same as the leaf counts at the compression code lengths with the correction B$^-$2. In this case, the computer 1100 determines that the total occurrence probability converges to the maximum asymptotic value and the leaf counts are fixed.

As described above, the correction B$^-$ is continued until the leaf counts are fixed. In the example of FIG. 16, the leaf count at each compression code length is fixed with the correction B$^-$3. Subsequently, the computer 1100 calculates the branch count per leaf for each compression code length. In the calculation of the branch count per leaf, as described above, the branch count per leaf is assigned in descending order from the upper limit length N of the compression code length (N=11 bits in this case) as $2^0$, $2^1$, $2^2$, $2^3$, $2^4$, $2^5$, and $2^6$. A subtotal of the branch count is a multiplication result of multiplying the branch count per leaf by the fixed leaf count for each compression code length.

FIG. 17 is an explanatory view of a correction result for each of the character data. In FIG. 17, the correction results of the correction A and the corrections B⁻1 to B⁻2 are added to the character data table. Since the leaf count at each compression code length is updated by the correction as depicted in FIG. 17, the compression code lengths are assigned in order such that the character data ranked first in the rank field has the shortest compression code length.

For example, if fixed with the correction B⁻2, the leaf count is 6 at the compression code length of 6 bits; the leaf count is 18 at the compression code length of 7 bits; . . . ; and the leaf count is 1215 at the compression code length of 11 bits. Therefore, the compression code length of 6 bits is assigned to the character data ranked in the first to sixth places (corresponding to 6 leaves); the compression code length of 7 bits is assigned to the character data ranked in the 7th to 24th places (corresponding to 18 leaves); . . . ; and the compression code length of 11 bits is assigned to the character data ranked in the 91st to 1305th places (corresponding to 1215 leaves).

The computer 1100 assigns a compression code to each of the character data to generate a leaf structure based on the character data, the compression code length assigned to the character data, and the leaf count at each compression code length. For example, since the compression code length of 5 bits is assigned to the single character "0" ranked first for the appearance rate, the compression code thereof is "000000". Therefore, a structure of a leaf L1 is generated that includes the compression code "000000", the compression code length "6", and the character data "0".

Although the compression code length is 5 bits to 11 bits in the correction process described above, the compression code map M of bi-gram character strings may be divided in some cases and therefore, the compression code length may be corrected to the even number of bits. For example, the character data of the compression code length of 5 bits and 7 bits is corrected to 6 bits; the character data of 9 bits is corrected to 8 bits; and the character data of 11 bits is corrected to 10 bits.

Figure 18:
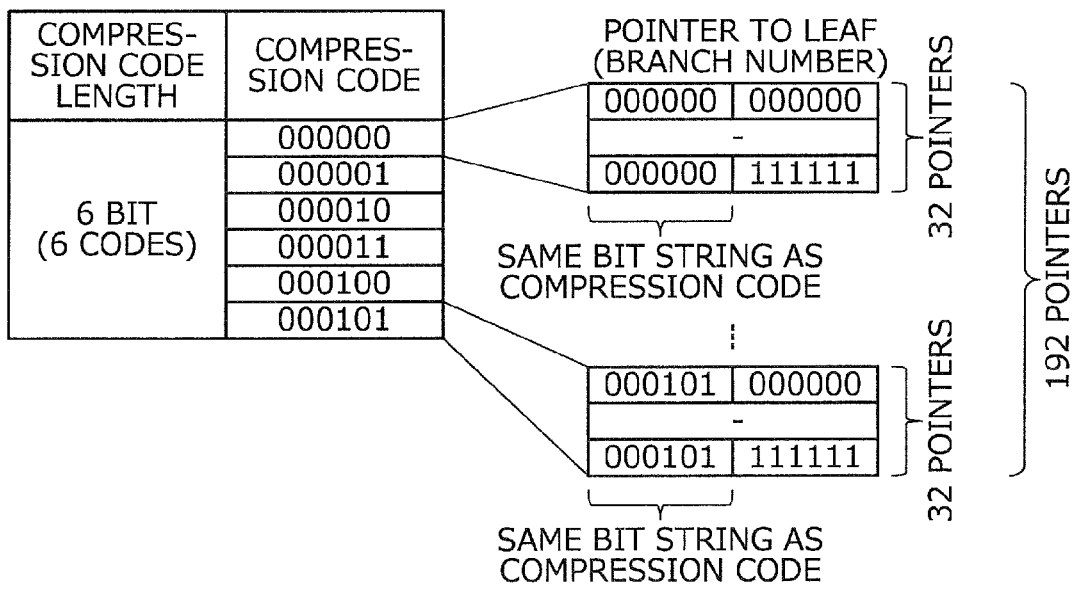
FIG. 18 is an explanatory view of details of (6) Generation of Pointer to Leaf (N=11) depicted in FIG. 13.

FIG. 18 is an explanatory view of details of (6) Generation of Pointer to Leaf (N=11) depicted in FIG. 13. FIG. 18 depicts a pointer to a leaf when the upper limit N of the compression code length is 11 bits. In FIG. 18, since the leaf count is 6 when the compression code length is 6 bits, compression codes "000000" to "000101" are assigned. The branch count per leaf is 32 when the compression code length is 6 bits. Therefore, 32 ($=2^5$) pointers to leaf are generated for a compression code having the compression code length of 6 bits. For example, the head 6 bits of the pointers to leaf represent a compression code and the subsequent 5 bits represent 32 types of bit strings. Therefore, 32 types of the pointers to leaf are generated for each of the compression codes having the compression code length of 6 bits.

Although not depicted, since the leaf count is 18 when the compression code length is 7 bits, compression codes "0001100" to "0011111" are assigned. The branch count per leaf is 16 when the compression code length is 7 bits. Therefore, 16 ($=2^4$) pointers to leaf are generated for the compression codes having the compression code length of 7 bits. For example, the head 7 bits of the pointers to leaf represent the compression codes and the subsequent 4 bits represent 16 types of bit strings. Therefore, 16 types of the pointers to leaf are generated for each of the compression codes having the compression code length of 7 bits.

Similarly, since the leaf count is 23 when the compression code length is 9 bits, compression codes "010101110" to "011000100" are assigned. The branch count per leaf is 4 when the compression code length is 9 bits. Therefore, 4 ($=2^2$) pointers to leaf are generated for the compression codes having the compression code length of 9 bits. For example, the head 9 bits of the pointers to leaf represent the compression codes and the subsequent 2 bits represent 4 types of bit strings. Therefore, 4 types of the pointers to leaf are generated for each of the compression codes having the compression code length of 9 bits.

Similarly, since the leaf count is 23 when the compression code length is 8 bits, compression codes "01000000" to "01010110" are assigned. The branch count per leaf is 8 when the compression code length is 8 bits. Therefore, 8 ($=2^3$) pointers to leaf are generated for the compression codes having the compression code length of 8 bits. For example, the head 8 bits of the pointers to leaf represent the compression codes and the subsequent 3 bits represent 8 types of bit strings. Therefore, 8 types of the pointers to leaf are generated for each of the compression codes having the compression code length of 8 bits.

Similarly, since the leaf count is 20 when the compression code length is 10 bits, compression codes "0110000110" to "0110011101" are assigned. The branch count per leaf is 2 when the compression code length is 10 bits. Therefore, 2 ($=2^1$) pointers to leaf are generated for the compression codes having the compression code length of 10 bits. For example, the head 10 bits of the pointers to leaf represent the compression codes and the subsequent 1 bit represents 2 types of bit strings. Therefore, 2 types of the pointers to leaf are generated for each of the compression codes having the compression code length of 10 bits.

Similarly, since the leaf count is 1215 when the compression code length is 11 bits, compression codes "01100111100" to "11111111010" are assigned. The branch count per leaf is 1 when the compression code length is 11 bits. Therefore, 1 ($=2^0$) pointers to leaf are generated for the compression codes having the compression code length of 11 bits. For example, the compression code becomes the pointer to the leaf. Therefore, 1 type of pointer to the leaf is generated for each of the compression codes having the compression code length of 11 bits.

Figure 19:
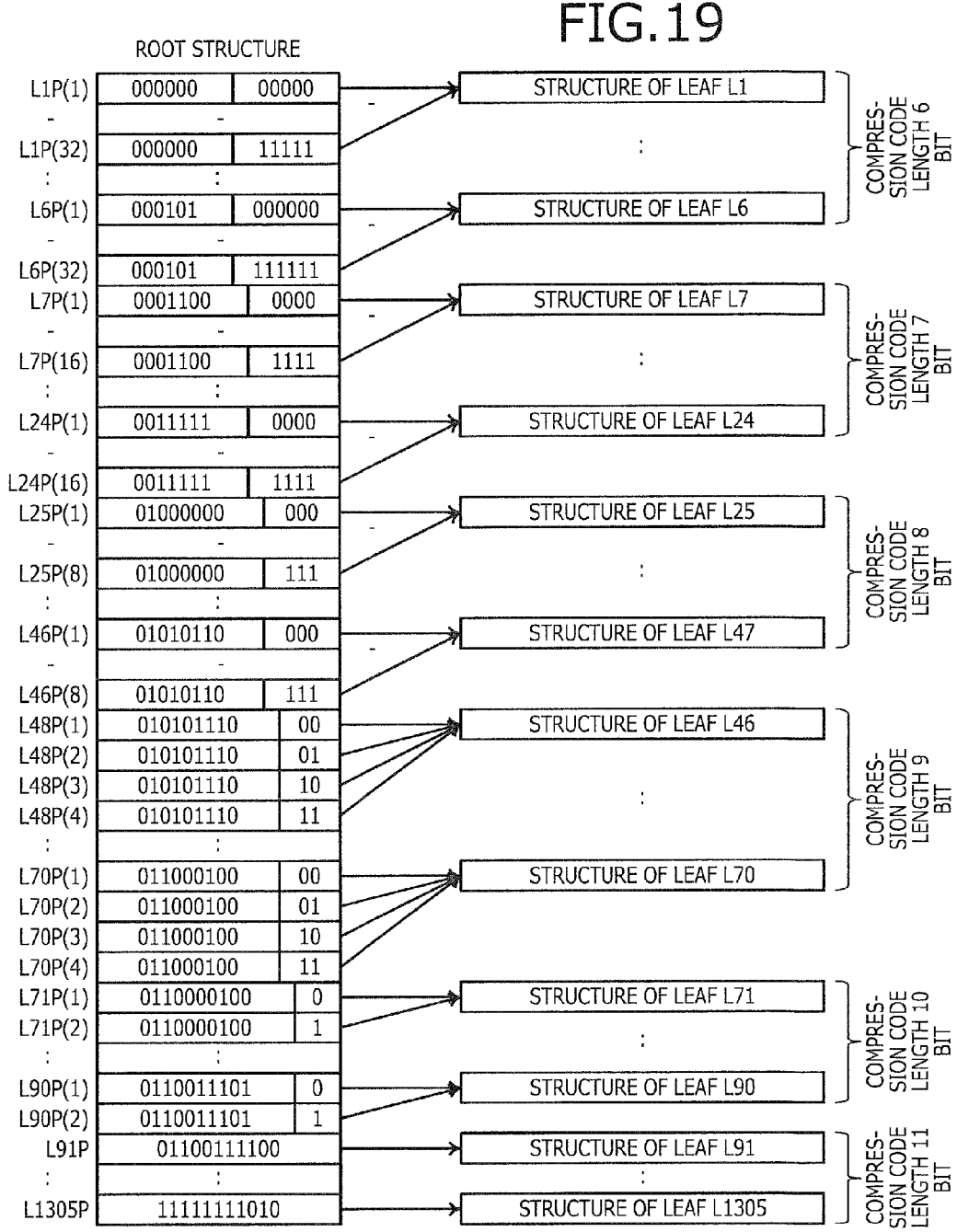
FIG. 19 is an explanatory view of details of (7) Construction of $2^N$-Branch Nodeless Huffman Tree (N=11) depicted in FIG. 13.

FIG. 19 is an explanatory view of details of (7) Construction of $2^N$-Branch Nodeless Huffman Tree (N=11) depicted in FIG. 13. FIG. 19 depicts a 2048($=2^{11}$)-branch nodeless Huffman tree in the case of N=11. A root structure stores the pointers to leaf. A pointer to leaf can specify a leaf structure at a pointed destination.

For example, as depicted in FIG. 18, 32 pointers to leaf are generated for a leaf structure storing a compression code having the compression code length of 6 bits. Therefore, for the structure of the leaf L1, 32 pointers L1P(1) to L1P(32) to the leaf L1 are stored in the root structure. The same applies to the structure of the leaf L2 to the structure of the leaf L6. Structures of a leaf L7 and later are as depicted in FIG. 19.

FIG. 20 is an explanatory view of the leaf structure. The leaf structure is a data structure having first to fourth areas. In the leaf structure, the first area stores a compression code and a compression code length thereof. The second area stores a leaf label, a decompression type (see FIG. 15), and an appearance rate (see FIG. 15). The third area stores a 16-bit character code that is a specific single character, an 8-bit divided character code acquired by dividing a character code of a nonspecific single character, or a pointer to basic word depending on the decompression type. The pointer to basic word specifies a basic word within the basic word structure. A collation flag is also stored. The collation flag is "0" by default. In the case of "0", a character to be decompressed is directly written in a decompression buffer and, in the case of "1", the character is interposed between a <color> tag and a </color> tag and written in the decompression buffer.

The fourth area stores an appearance rate and an appearance rate area of an appearance map of stored character data. The appearance rate is the appearance rate of character data depicted in FIG. 15. The appearance rate area of an appearance map will be described with reference to FIGS. 55 and 56. The third area also stores a code type and a code category. The code type is information identifying which of a numeric character, an alphabetic character, a special symbol, katakana, hiragana, or kanji a character code corresponds to, or whether a character code is a pointer to a basic word. The code category is information identifying whether the character code is 16-bit or 8-bit. In the case of a 16-bit character code or in the case of a reserved word, "1" is assigned as the code category and, in the case of 8-bit divided character code, "0" is assigned as the code category.

The information in the first to fourth areas is stored in a construction process (step S3905) described later.

FIG. 21 is an explanatory view of a specific single character structure. A specific single character structure 2100 is a data structure storing specific single character codes e# and pointers to leaves L# thereof. For example, when the computer 1100 acquires the tabulation result from the object file group Fs, the computer 1100 stores the specific single character codes e# into the specific single character structure 2100. When the $2^N$-branch nodeless Huffman tree is constructed, the computer 1100 stores pointers to the specific character codes e# in the specific single character structure 2100 corresponding to compression codes stored in the structures of leaves in the $2^N$-branch nodeless Huffman tree.

When the pointers to the specific single character codes e# are stored in the structures of the corresponding leaves, the computer 1100 stores pointers to the leaves corresponding to the specific single character codes e# in the $2^N$-branch nodeless Huffman tree H in a manner correlated with the corresponding specific single character codes e# in the specific single character structure 2100. As a result, the specific single character structure 2100 is generated.

FIG. 22 is an explanatory view of a divided character code structure. A divided character code structure 2200 stores divided character codes and pointers to leaves L# thereof. For example, when the computer 1100 acquires the tabulation result from the object file group Fs, the computer 1100 stores the divided character codes into the divided character code structure 2200. When the $2^N$-branch nodeless Huffman tree is constructed, the computer 1100 stores pointers to the divided character codes in the divided character code structure 2200 corresponding to compression codes stored in the structures of leaves in the $2^N$-branch nodeless Huffman tree.

When the pointers to the divided character codes are stored in the structures of the corresponding leaves, the computer 1100 stores pointers to the leaves corresponding to the divided character codes in the $2^N$-branch nodeless Huffman tree in a manner correlated with the corresponding divided character codes in the divided character code structure 2200. As a result, the divided character code structure 2200 is generated.

FIG. 23 is an explanatory view of a basic word structure. A basic word structure 2300 is a data structure storing basic words and pointers to leaves L# thereof. The basic word structure 2300 stores the basic words in advance. When the $2^N$-branch nodeless Huffman tree H is constructed, the computer 1100 stores pointers to the basic words in the basic word structure 2300 corresponding to compression codes stored in the structures of leaves in the $2^N$-branch nodeless Huffman tree H.

When the pointers to the basic words are stored in the structures of the corresponding leaves, the computer 1100 stores pointers to the leaves corresponding to the basic words in the $2^N$-branch nodeless Huffman tree H in a manner correlated with the corresponding basic words in the basic word structure 1600.

<Creation Example of Compression Code Map Ms>

Once the $2^N$-branch nodeless Huffman tree H is generated by the first generating unit 1102, the creating unit 1104 crates a compression code map Ms of single characters, a compression code map Ms of upper divided character codes, a compression code map Ms of lower divided character codes, a compression code map Ms of words, and a compression code map Ms of bi-gram character strings. A detailed creation example of the compression code map Ms of single characters, the compression code map Ms of upper divided character codes, the compression code map Ms of lower divided character codes, and the compression code map Ms of bi-gram character strings will hereinafter be described. The compression code map Ms of basic words is created in the same way as the compression code map Ms of single characters and therefore will not be described.

FIG. 24 is an explanatory view of a generation example of the compression code maps Ms. In FIG. 24, it is assumed that a character string " 竜馬は脱藩した " is described in an object file Fi.

(A) First, the first character " 竜 " is the object character. Since the object character " 竜 " is a specific single character, the compression code of the specific single character " 竜 " is acquired by accessing the $2^N$-branch nodeless Huffman tree H to identify the appearance map of the specific single character " 竜 ". If not generated, the appearance map of the specific single character " 竜 " is generated that has the compression code of the specific single character " 竜 " as a pointer and a bit string set to all zero indicative of the presence/absence in object files. In the appearance map of the specific single character " 竜 ", the bit of the object file Fi is set to ON ("0"→"1").

(B) The object character is shifted by one gram to define " 馬 " as the object character. Since the object character " 馬 " is a specific single character, the compression code of the specific single character " 馬 " is acquired by accessing the $2^N$-branch nodeless Huffman tree H to identify the appearance map of the specific single character " 馬 ". If not generated, the appearance map of the specific single character " 馬 " is generated that has the compression code of the specific single character " 馬 " as a pointer and a bit string set to all zero indicative of the presence/absence in object files. In the appearance map of the specific single character " 馬 ", the bit of the object file Fi is set to ON ("0"→"1").

When the object character is shifted to " 馬 ", a bi-gram character string " 竜馬 " is acquired and therefore, the appearance map of the bi-gram character string " 竜馬 " is identified by the compression code string of " 竜馬 " acquired by combining the compression code of " 竜 " and the compression code of " 馬 ". If not generated, the appearance map of the bi-gram character string " 竜馬 " is generated that has the compression code of " 竜馬 " as a pointer and a bit string set to all zero indicative of the presence/absence in object files. In the appearance map of the bi-gram character string " 竜馬 ", the bit of the object file Fi is set to ON ("0"→"1").

(C) The object character is shifted by one gram to define "は" as the object character. The object character "は" is processed in the same way as (B) and, in the appearance map of the specific single character "は", the bit of the object file Fi is set to ON ("0"→"1"). Similarly, in the appearance map of the bi-gram character string "馬は", the bit of the object file Fi is set to ON ("0"→"1").

(D) The object character is shifted by one gram to define "骶" as the object character. Since the object character "骶" is not a specific single character, the character code "0x8131" of the object character "骶" is divided into the upper divided character code "0x81" and the lower divided character code "0x31". The object character is then defined as the upper divided character code "0x81". The upper divided character code "0x81" is processed in the same way as a specific single character and, in the appearance map of the upper divided character code "0x81", the bit of the object file Fi is set to ON ("0"→"1"). Similarly, in the appearance map of the bi-gram character string "ま 0x81", the bit of the object file Fi is set to ON ("0"→"1").

(E) The object character is shifted by one gram to define the lower divided character code "0x31" of the character "骶" as the object character. The lower divided character code "0x31" is processed in the same way and, in the appearance map of the lower divided character code "0x31", the bit of the object file Fi is set to ON ("0"→"1"). Similarly, in the appearance map of the bi-gram character string "0x81 0x31", the bit of the object file Fi is set to ON ("0"→"1").

By executing the same process in (F) to (I) and completing the process for the last object file Fn, the respective compression code maps Ms are generated for single characters, upper divided character codes, lower divided character codes, and bi-gram character strings.

<Compression Code Map Generation Process Procedure>

A compression code map creation process example by the creating unit 1104 will be described.

FIG. 25 is a flowchart of the compression code map creation process example by the creating unit 1104. The computer 1100 executes a tabulation process (step S2501), a map assignment count determination process (step S2502), a re-tabulation process (step S2503), a Huffman tree generation process (step S2504), and a map creation process (step S2505). The computer 1100 uses the tabulating unit 1101 to execute the tabulation process (step S2501) to the re-tabulation process (step S2503). The computer 1100 uses the first generating unit 1102 to execute the Huffman tree generation process (step S2504) and uses the creating unit 1104 to executed the map creation process (step S2505).

The tabulation process (step S2501) is a process of counting the appearance counts (also referred to as appearance frequencies) of single characters and basic words in the object file group Fs. The map assignment count determination process (step S2502) is a process of determining the map assignment counts of the single characters and the basic words tabulated in the tabulation process (step S2501). Single characters and basic words in the appearance ranks corresponding to the map assignment counts are respectively defined as the specific single characters and the basic words.

The re-tabulation process (step S2503) is a process of dividing a non-specific character other than the specific single characters among the single characters into an upper divided character code and a lower divided character code and tabulating the respective appearance counts. In the re-tabulation process (step S2503), the appearance counts of bi-gram character strings are also tabulated.

The Huffman tree generation process (step S2504) is a process of generating the $2^N$-branch nodeless Huffman tree H as depicted in FIGS. 15 to 20. The map creation process (step S2505) is a process of generating the compression code maps M of specific single characters, basic words, upper divided character codes, lower divided character codes, and bi-gram character strings.

(Tabulation Process (Step S2501))

FIG. 26 is a flowchart of a detailed process example of the tabulation process (step S2501) depicted in FIG. 25. First, the computer 1100 sets a file number i to i=1 (step S2601) and reads an object file Fi (step S2602). The computer 1100 executes the tabulation process for the object file Fi (step S2603). Details of the tabulation process for the object file Fi (step S2603) will be described with reference to FIG. 27. The computer 1100 then determines whether the file number i satisfies i>n (where n is the total count of object files F1 to Fn) (step S2604).

If i>n is not satisfied (step S2604: NO), the computer 1100 increments i (step S2605) and returns to step S2602. On the other hand, if i>n is satisfied (step S2604: YES), the computer 1100 goes to the map assignment count determination process (step S2502) depicted in FIG. 25 and terminates the tabulation process (step S2501). With this tabulation process (step S2501), the tabulation process for the object file Fi (step S2603) can be executed for each of the object files Fi.

(Tabulation Process for Object File Fi (Step S2603))

Figure 27:
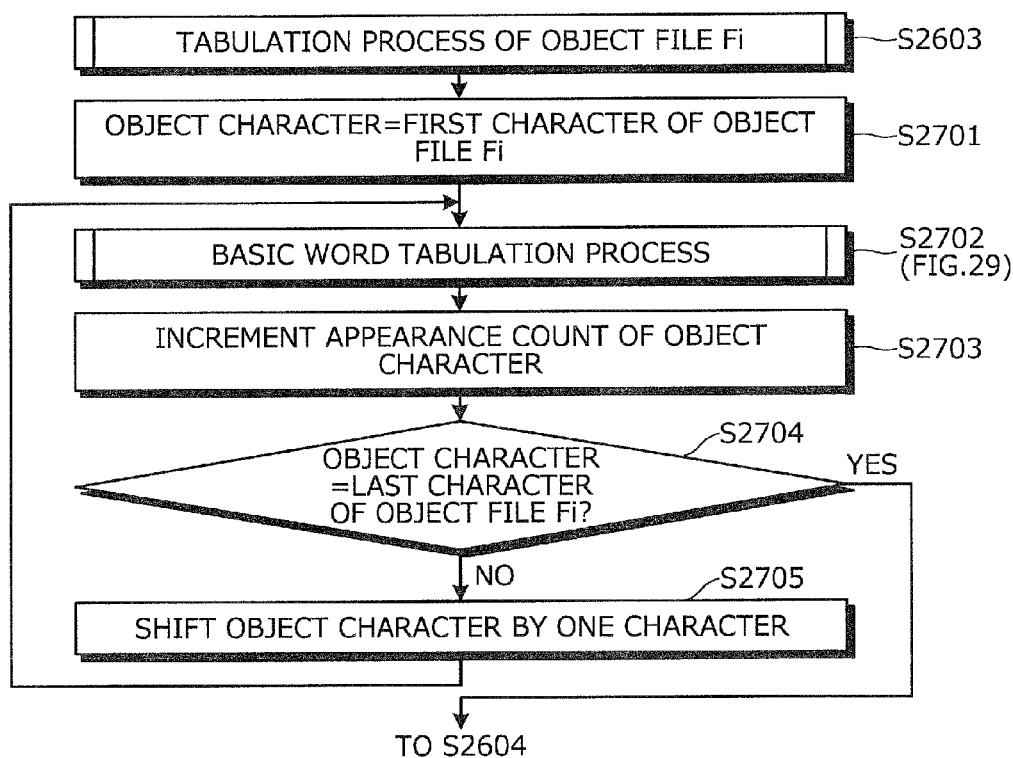
FIG. 27 is a flowchart of a detailed process example of the tabulation process for an object file Fi (step S2603) depicted in FIG. 26.

FIG. 27 is a flowchart of a detailed process example of the tabulation process for the object file Fi (step S2603) depicted in FIG. 26. First, the computer 1100 defines the first character of the object file Fi as the object character (step S2701) and executes a basic word tabulation process (step S2702). Details of the basic word tabulation process (step S2702) will be described with reference to FIG. 29. The computer 1100 then increments the appearance count of the object character by one in the character appearance frequency tabulation table (step S2703).

FIG. 28 is an explanatory view of the character appearance frequency tabulation table. A character appearance frequency tabulation table 2800 is stored in a storage device such as the RAM 903 and the magnetic disk 905 and the appearance count is incremented by one each time a corresponding character appears.

Returning to FIG. 27, the computer 1100 determines whether the object character is the last character of the object file Fi (step S2704). If the object character is not the last character of the object file Fi (step S2704: NO), the computer 1100 shifts the object character by one character toward the end (step S2705) and returns to step S2702.

On the other hand, if the object character is the last character of the object file Fi (step S2704: YES), the computer 1100 goes to step S2604 and terminates the tabulation process for the object file Fi (step S2603). With this tabulation process for the object file Fi (step S2603), the appearance frequencies of the basic words and the single characters present in the object file group Fs can be tabulated.

(Basic Word Tabulation Process (step S2702))

Figures 29, 30:
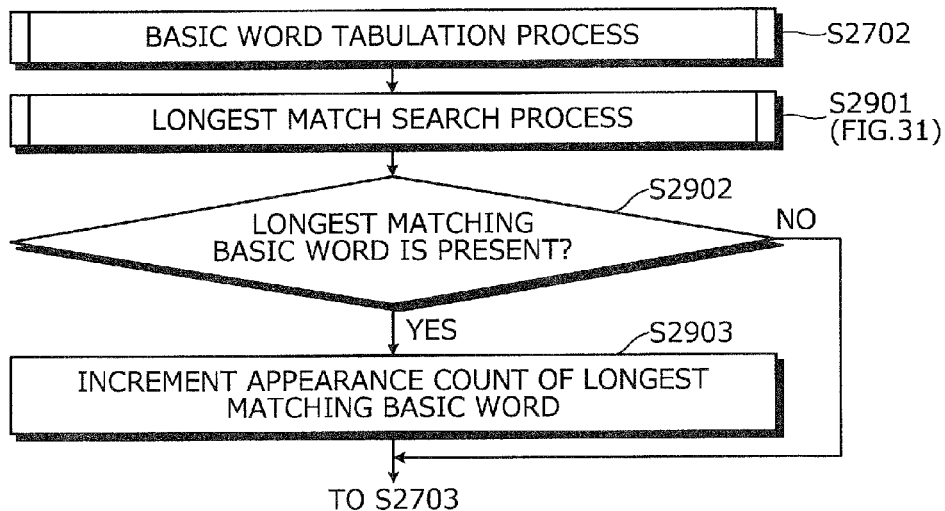
FIG. 29 is a flowchart of a detailed process example of a basic word tabulation process (step S2702) depicted in FIG. 27.
FIG. 30 is an explanatory view of a basic word appearance frequency tabulation table.

FIG. 29 is a flowchart of a detailed process example of the basic word tabulation process (step S2702) depicted in FIG. 27. First, the computer 1100 executes a longest match search process (step S2901) and determines whether a longest matching basic word is present (step S2902). Details of the longest match search process (step S2901) will be described with reference to FIG. 31. If the longest matching basic word is present (step S2902: YES), the computer 1100 increments the appearance count of the longest matching basic word by one in the basic word appearance frequency tabulation table (step S2903) and goes to step S2703.

FIG. 30 is an explanatory view of the basic word appearance frequency tabulation table. A basic word appearance frequency tabulation table 3000 is stored in the storage device such as the RAM 903 or the magnetic disk 905 and the appearance count is incremented by one each time a corresponding basic word appears.

Returning to FIG. 29, if no longest matching basic word is present (step S2902: NO), the computer goes to step S2703. The basic word tabulation process is then terminated (step S2702). With the basic word tabulation process (step S2702), basic words can be counted by the longest match search process (step S2901) and therefore, a basic word having a longer character string can preferentially be counted.

(Longest Match Search Process (Step S2901))

Figure 31:
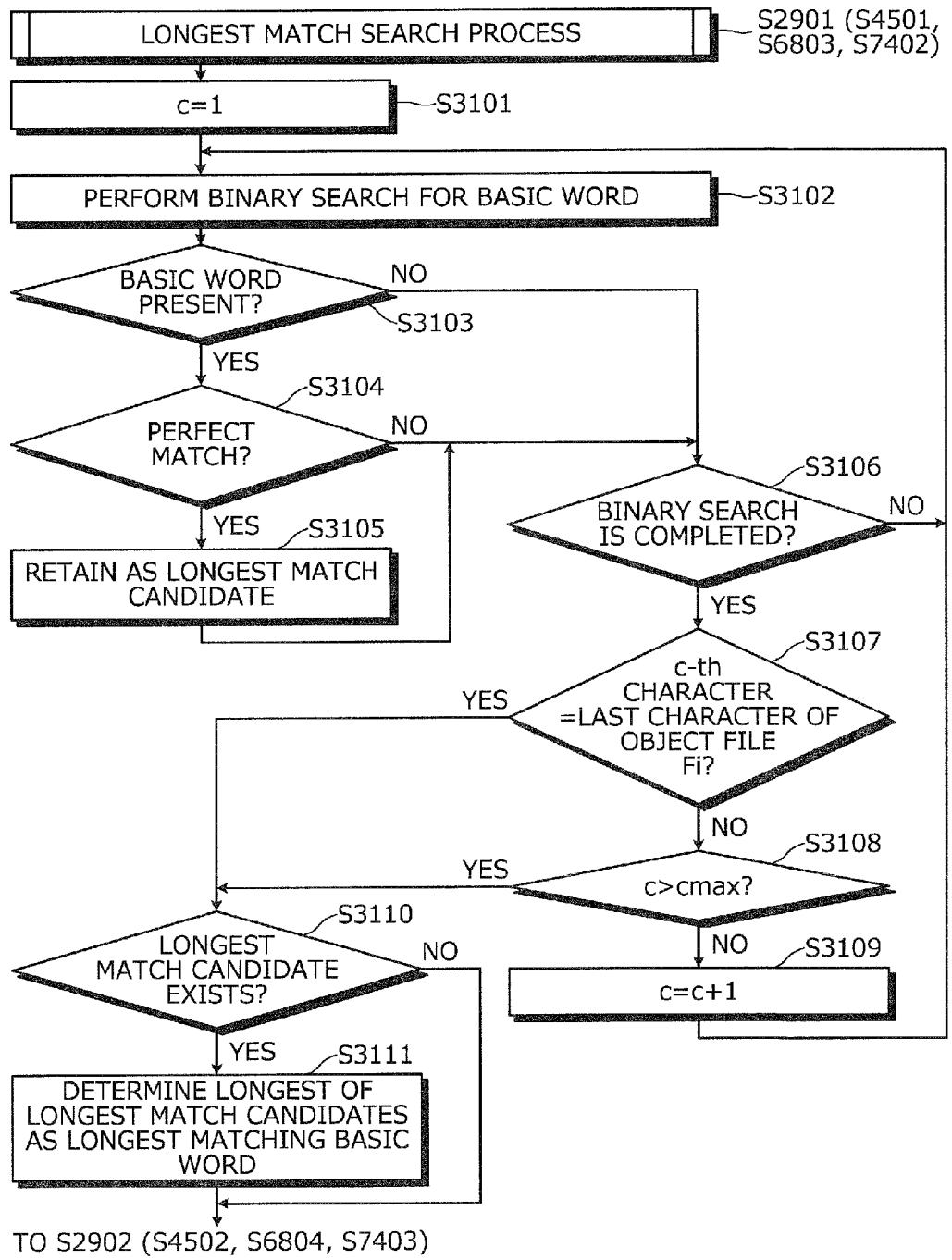
FIG. 31 is a flowchart of a detailed process procedure of a longest match search process (step S2901) depicted in FIG. 29.

FIG. 31 is a flowchart of a detailed process procedure of the longest match search process (step S2901) depicted in FIG. 29. First, the computer 1100 sets c=1 (step S3101). The number of characters from the object character is denoted by c (including the object character). In the case of c=1, only the object character is indicated. The computer 1100 then performs binary search for a basic word starting with characters matching an object character string of c characters from the object character (step S3102). The computer 1100 determines whether the basic word is present as a result of the search (step S3103). If no basic word is hit by the binary search (step S3103: NO), the computer goes to step S3106.

On the other hand, if a basic word is hit by the binary search (step S3103: YES), the computer 1100 determines whether the hit basic word perfectly matches the object character string (step S3104). If not perfectly matching (step S3104: NO), the computer 1100 goes to step S3106. On the other hand, if perfectly matching (step S3104: YES), the computer 1100 retains the basic word as a longest match candidate in a storage device (step S3105) and goes to step S3106.

At step S3106, the computer 1100 determines whether the binary search has been completed for the object character string (step S3106). For example, the computer 1100 determines whether the binary search is performed to the ending basic word. If the binary search is not completed (step S3106: NO), the computer 1100 goes to step S3102 to continue until the binary search is completed.

On the other hand, if the binary search is completed for the object character string (step S3106: YES), the computer 1100 determines whether a c-th character is the last character of the object file Fi (step S3107). If the c-th character is the last character of the object file Fi (step S3107: YES), the computer 1100 goes to step S3110. On the other hand, if the c-th character is not the last character of the object file Fi (step S3107: NO), the computer 1100 determines whether c>cmax is satisfied (step S3108). A value is set in advance as cmax, thereby setting the upper limit of the number of characters of the object character string.

If c>cmax is not satisfied (step S3108: NO), the computer 1100 increments c (step S3109) and returns to step S3102. On the other hand, if c>cmax is satisfied (step S3108: YES), the computer 1100 determines whether a longest match candidate is present (step S3110). For example, the computer 1100 determines whether at least one longest match candidate is retained in a memory at step S3105.

If a longest match candidate is present (step S3110: YES), the computer 1100 determines the longest character string of the longest match candidates as the longest matching basic word (step S3111). The computer 1100 goes to step S2902. On the other hand, if no longest match candidate is present at step S3110 (step S3110: NO), the computer 1100 goes to step S2902. As a result, the longest match search process (step S2901) is terminated. With this longest match search process (step S2901), the longest character string of the perfectly matching character strings can be found as the basic word out of the basic words within the basic word structure.

(Map Assignment Count Determination Process (Step S2502))

Figure 32:
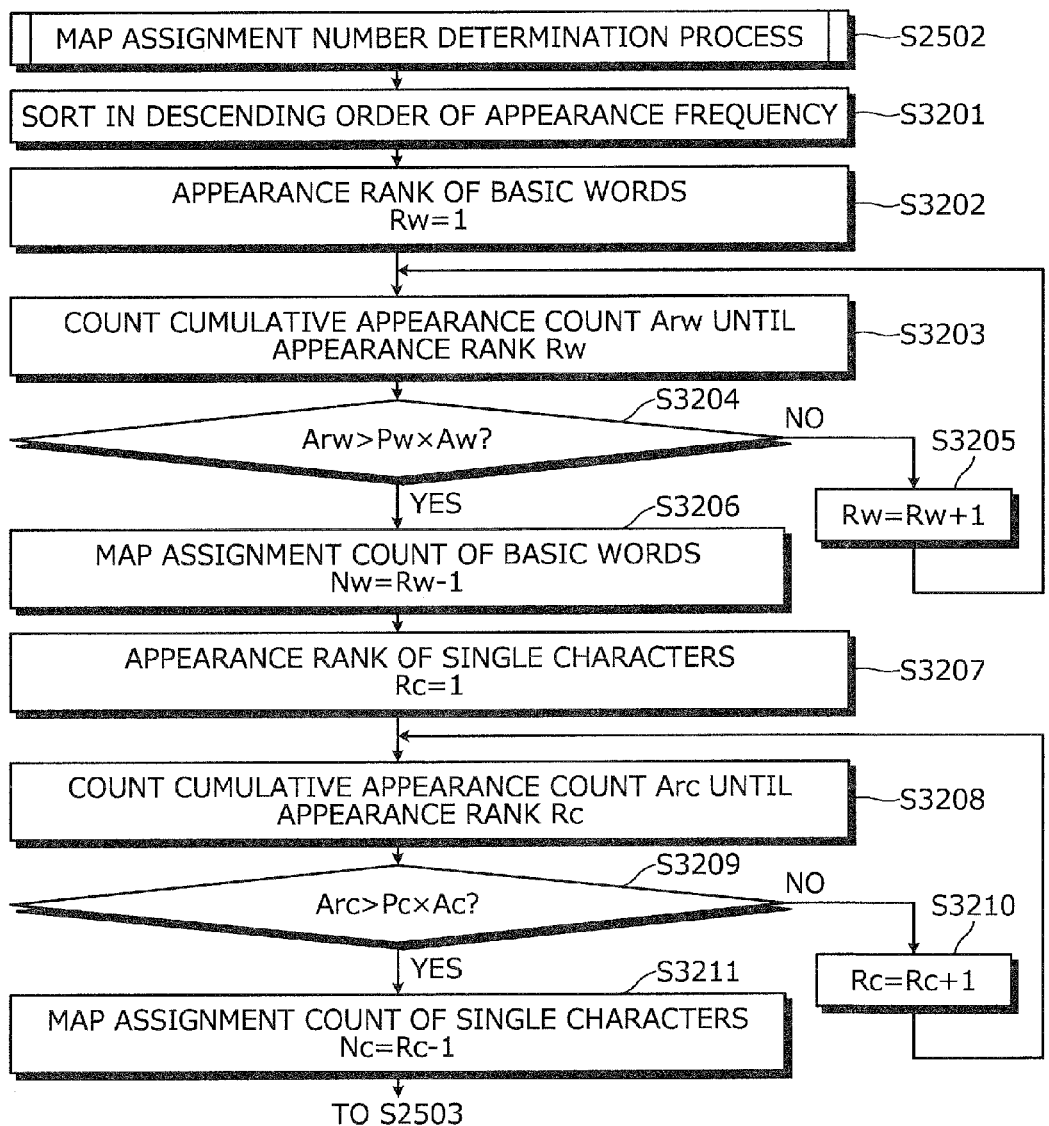
FIG. 32 is a flowchart of a detailed process example of a map assignment count determination process (step S2502) depicted in FIG. 25.

FIG. 32 is a flowchart of a detailed process example of the map assignment count determination process (step S2502) depicted in FIG. 25. First, the computer 1100 sorts in descending order of appearance frequency, the basic word appearance frequency tabulation table 3000 that indicates the appearance frequency of each basic words and the character appearance frequency tabulation table 2800 that indicates the appearance frequency of each single character acquired from the tabulation process (step S2501) (step S3201). The computer 1100 refers to the sorted basic word appearance frequency tabulation table 3000 to set an appearance rank Rw of the basic words to Rw=1 (step S3202) and counts a cumulative appearance count Arw until the appearance rank Rw (step S3203). The computer 1100 determines whether Equation (1) is satisfied (step S3204).

$$Arw > Pw \times Aw \quad (1)$$

Where, Aw is the total count of appearances of the tabulated basic words.

If Equation (1) is not satisfied (step S3204: NO), the computer 1100 increments the appearance rank Rw (step S3205) and returns to step S3203. Therefore, the appearance rank Rw is continuously lowered until Equation (1) is satisfied.

If Equation (1) is satisfied (step S3204: YES), the computer 1100 sets a map assignment count Nw of the basic words to Nw=Rw−1 (step S3206). The map assignment count Nw is the number of basic words assigned to the basic word appearance map generated in the map creation process (step S3205) and means the number of records (lines) of the basic word appearance map.

The computer 1100 sets an appearance rank Rc of the single characters to Rc=1 (step S3207) and counts the cumulative appearance count Arc until the appearance rank Rc (step S3208). The computer 1100 determines whether Equation (2) is satisfied (step S3209).

$$Arc > Pc \times Ac \quad (2)$$

Where, Ac is the total count of appearances of the tabulated single characters.

If Equation (2) is not satisfied (step S3209: NO), the computer 1100 increments the appearance rank Rc (step S3210) and returns to step S3208. Therefore, the appearance rank Rc is continuously lowered until Equation (2) is satisfied.

If Equation (2) is satisfied (step S3209: YES), the computer 1100 sets a map assignment count Nc of the single characters to Nc=Rc−1 (step S3211). The map assignment count Nc is the number of single characters assigned to the specific single character appearance map generated in the map creation process (step S2505) and means the number of records (lines) of the specific single character appearance map. The computer 1100 subsequently goes to the re-tabulation process (step S2503) and terminates the map assignment count determination process (step S2502).

With the map assignment count determination process (step S2502), the basic word appearance map can be generated for the number of the basic words corresponding to the target appearance rate Pw in the map creation process (step S2505). Therefore, since it is not necessary to assign all the basic words to the map and the assignment is determined according to the target appearance rate Pw, the map size can be optimized.

For the single characters, the compression code map M of specific single characters can be generated for the number of the single characters corresponding to the target appearance rate Pc in the map creation process (step S2505). Therefore, since it is not necessary to assign all the single characters to the map and the assignment is determined according to the target appearance rate Pc, the map size can be optimized.

(Re-Tabulation Process (Step S2503))

Figure 33:
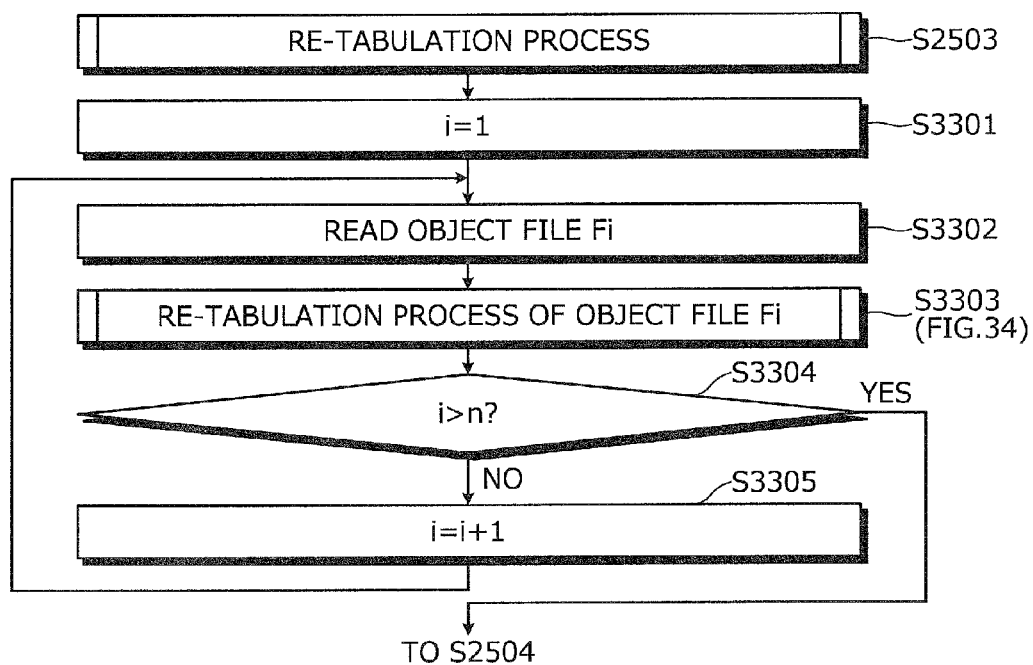
FIG. 33 is a flowchart of a detailed process example of a re-tabulation process (step S2503) depicted in FIG. 25.

FIG. 33 is a flowchart of a detailed process example of the re-tabulation process (step S2503) depicted in FIG. 25. First, the computer 1100 sets the file number i to i=1 (step S3301) and reads the object file Fi (step S3302). The computer 1100 executes the re-tabulation process for the object file Fi (step S3303). Details of the re-tabulation process for the object file Fi (step S3303) will be described with reference to FIG. 33. Subsequently, the computer 1100 determines whether the file number i satisfies i>n (where n is the total count of the object files F1 to Fn) (step S3304).

If i>n is not satisfied (step S3304: NO), the computer 1100 increments i (step S3305) and returns to step S3302. On the other hand, if i>n is satisfied (step S3304: YES), the computer 1100 goes to the Huffman tree generation process (step S2504) depicted in FIG. 25 and terminates the re-tabulation process (step S3303). With this re-tabulation process (step S3303), the re-tabulation process for the object file Fi (step S3303) can be executed for each of the object files Fi.

(Re-Tabulation Process for Object File Fi (Step S3303))

Figure 34:
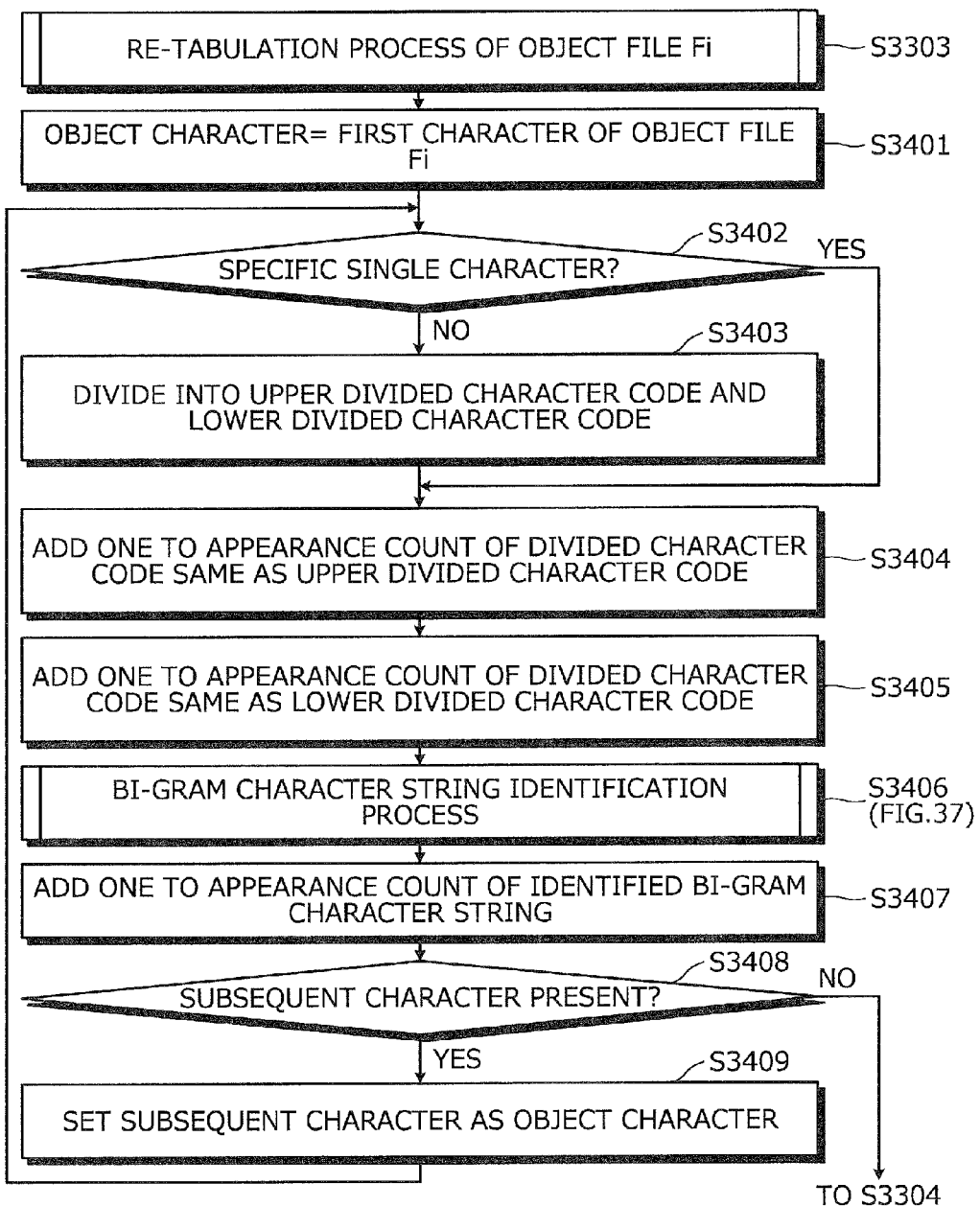
FIG. 34 is a flowchart of a detailed process example of the re-tabulation process for the object file Fi (step S3303)

FIG. 34 is a flowchart of a detailed process example of the re-tabulation process for the object file Fi (step S3303). First, the computer 1100 defines the first character of the object file Fi as the object character (step S3401) and determines whether the object character is a specific single character (step S3402). If the object character is a specific single character (step S3402: YES), the computer 1100 goes to step S3404 without dividing the character.

On the other hand, if the object character is not a specific single character (step S3402: NO), the computer 1100 divides the character code of the object character into the upper divided character code and the lower divided character code (step S3403). The computer 1100 goes to step S3404.

At step S3404, the computer 1100 adds one to the appearance count of the same divided character code as the upper divided character code acquired at step S3403 in an upper divided character code appearance frequency tabulation table (step S3404).

FIG. 35 is an explanatory view of the upper divided character code appearance frequency tabulation table. An upper divided character code appearance frequency tabulation table 3500 is stored in the storage device such as the RAM 903 and the magnetic disk 905 and the appearance count is incremented by one each time a corresponding upper divided character code appears.

In FIG. 34, the computer 1100 adds one to the appearance count of the same divided character code as the lower divided character code acquired at step S3403 in a lower divided character code appearance frequency tabulation table (step S3405).

FIG. 36 is an explanatory view of the lower divided character code appearance frequency tabulation table. An lower divided character code appearance frequency tabulation table 3600 is stored in the storage device such as the RAM 903 or the magnetic disk 905 and the appearance count is incremented by one each time a corresponding lower divided character code appears.

In FIG. 34, the computer 1100 executes a bi-gram character string identification process (step S3406). In the bi-gram character string identification process (step S3406), a bi-gram character string starting from the object character is identified. Details of the bi-gram character string identification process (step S3406) will be described with reference to FIG. 37.

The computer 1100 adds one to the appearance count of the bi-gram character string identified in the bi-gram character string identification process (step S3406) in a bi-gram character string appearance frequency tabulation table (step S3407).

Figure 37:
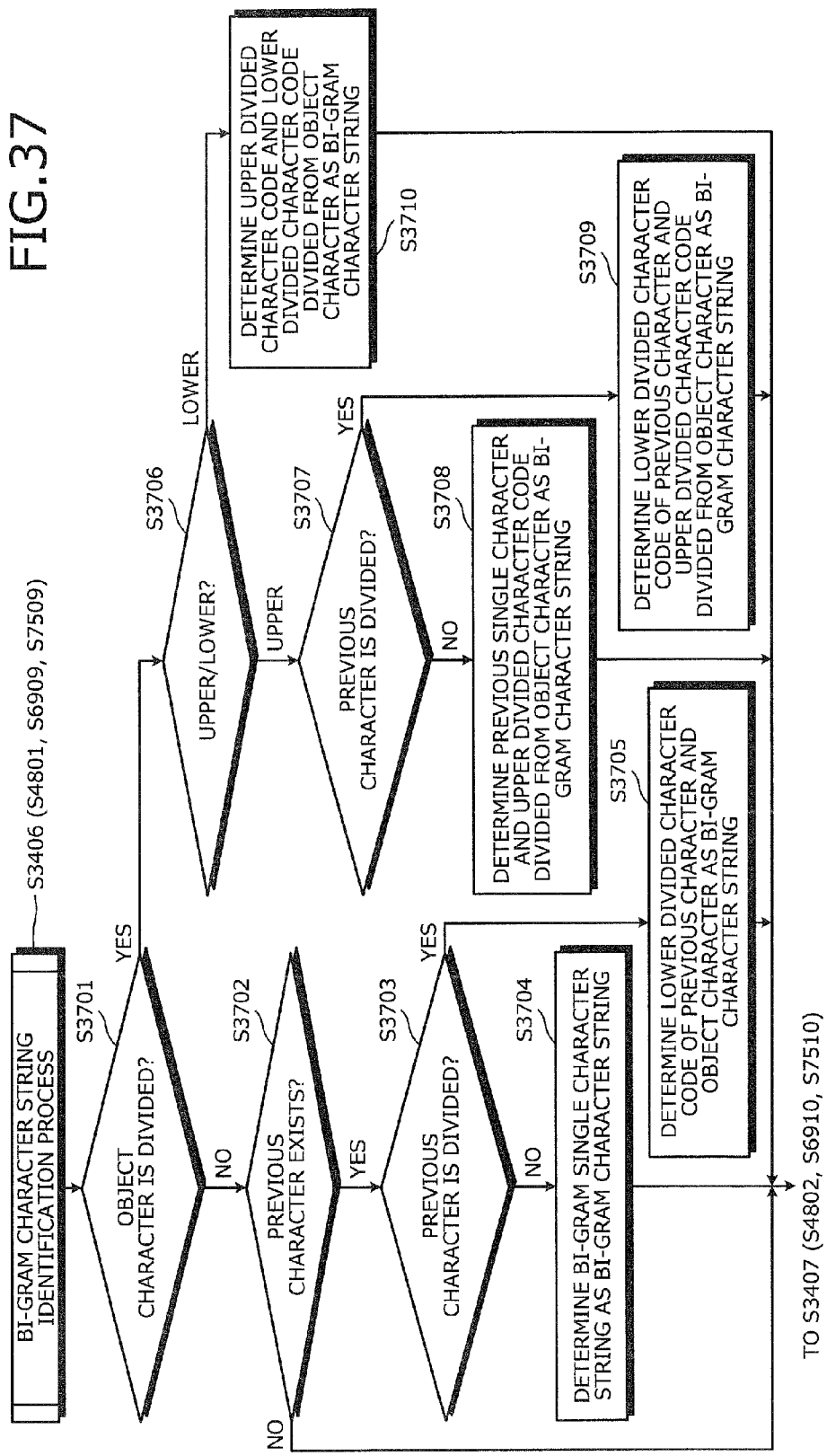
FIG. 37 is a flowchart of a detailed process procedure of a bi-gram character string identification process (step S3406) depicted in FIG. 34.

FIG. 37 is a flowchart of a detailed process procedure of the bi-gram character string identification process (step S3406) depicted in FIG. 34. First, for the object character, the computer 1100 determines whether the object character has been divided (step S3701). In other words, the computer 1100 determines whether the object character is a divided character code. If not (step S3701: NO), i.e., in the case of a single character, the computer 1100 determines whether a previous character is present (step S3702).

If a previous character is present (step S3702: YES), the computer 1100 determines whether the previous character has been divided (step S3703). In other words, the computer 1100 determines whether the previous character is a divided character code. If not (step S3703: NO), i.e., in the case of a single character, the computer 1100 determines a character string consisting of the previous single character before the object character and the object character (single character) as a bi-gram character string (step S3704). The computer 1100 goes to step S3407.

On the other hand, at step S3703, if the previous character has been divided (step S3703: YES), i.e., in the case of a divided character code, the divided character code, i.e., the previous character, is a lower divided character code. Therefore, the computer 1100 determines a character string consisting of the lower divided character code, which is the previous character, and the object character as a bi-gram character string (step S3705). The computer 1100 goes to step S3407.

At step S3702, if no previous character is present (step S3702: NO), only the object character is left and therefore, the computer 1100 goes to step S3407 without determining a bi-gram character string.

At step S3701, if the object character is divided (step S3701: YES), i.e., in the case of a divided character code, the computer 1100 determines whether the divided character code is an upper divided character code or a lower divided character code (step S3706).

In the case of the upper divided character code (step S3706: UPPER), the computer 1100 determines whether the previous character is divided (step S3707). In other words, it is determined whether the previous character is a divided character code. If not divided (step S3707: NO), i.e., in the case of a single character, the computer 1100 determines a character string consisting of the previous single character before the object character and the upper divided character code divided from the object character as a bi-gram character string (step S3708). The computer 1100 goes to step S3407.

On the other hand, at step S3707, if the previous character has been divided (step S3707: YES), i.e., in the case of a divided character code, the divided character code, i.e., the previous character, is a lower divided character code. Therefore, the computer 1100 determines a character string consisting of the lower divided character code, which is the previous character, and the upper divided character code divided from the object character as a bi-gram character string (step S3709). The computer 1100 goes to step S3407.

At step S3706, in the case of the lower divided character code (step S3706: LOWER), the computer 1100 determines a character string consisting of the upper divided character code and the lower divided character code divided from the object character as a bi-gram character string (step S3710). The computer 1100 goes to step S3407.

With the bi-gram character string identification process (step S3406), a bi-gram character string can be identified even if the object character is divided. Since the bi-gram character strings are identified as characters are shifted one-by-one, the map can simultaneously be generated in parallel with the compression code map M of basic words and the compression code map M of specific single characters.

With the information generation as described above, since the numbers of basic words and single characters associated with the map creation are limited by the target appearance rates Pw and Pc, wasteful map creation is eliminated, and the acceleration of the map creation and the optimization of the map size can be realized at the same time. The multiple types of maps can simultaneously be created in parallel by shifting characters one-by-one, and the creation of the multiple types of maps used in highly accurate search can be made more efficient.

Figures 38, 39:
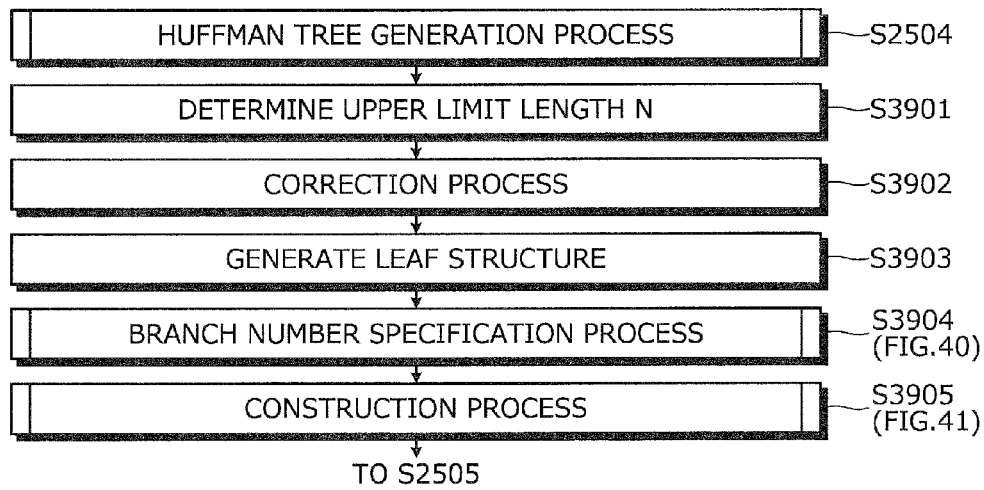
FIG. 38 is an explanatory view of a bi-gram character string appearance frequency tabulation table.
FIG. 39 is a flowchart of a detailed process example of the Huffman tree generation process (step S2504) depicted in FIG. 25.

FIG. 38 is an explanatory view of the bi-gram character string appearance frequency tabulation table. A bi-gram character string appearance frequency tabulation table 3800 is stored in the storage device such as the RAM 903 and the magnetic disk 905 and the appearance count is incremented by one each time a corresponding bi-gram character string appears.

The computer 1100 then determines whether a subsequent character of the object character is present in the object file Fi (step S3408), and if a subsequent character is present (step S3408: YES), the computer 1100 sets the subsequent character as the object character (step S3409) and returns to step S3402. On the other hand, if no subsequent character is present (step S3408: NO), the computer 1100 terminates the re-tabulation process for the object file Fi (step S3303) and goes to step S3304.

As a result, the appearance counts of the upper divided character codes, the lower divided character codes, and the bi-gram character strings present in the object files Fi can be tabulated for each of the object files Fi.

(Huffman Tree Generation Process (Step S2504))

FIG. 39 is a flowchart of a detailed process example of the Huffman tree generation process (step S2504) depicted in FIG. 25. In FIG. 39, the computer 1100 determines the upper limit length N of the compression code length (step S3901). The computer 1100 then executes a correction process (step S3902). The correction process is a process of correcting the occurrence probability and the compression code length of each of the character data by using the upper limit length N of the compression code length as described with reference to FIGS. 15 to 17.

The computer 1100 generates a leaf structure for each of the character data (step S3903). The computer 1100 executes a branch count specification process (step S3904). In the branch count specification process (step S3904), the branch count per leaf is specified for each compression code length. Details of the branch count specification process (step S3904) will be described with reference to FIG. 40.

The computer 1100 executes a construction process (step S3905). Since the branch count of each leaf structure is specified by the branch count specification process (step S3904), the computer 1100 first generates pointers to a leaf to the branch count for each leaf structure. The computer 1100 merges the generated pointers to leaves for the leaf structures to form a root structure. As a result, the $2^N$-branch nodeless Huffman tree H is generated. The generated $2^N$-branch nodeless Huffman tree H is stored in the storage device (such as the RAM 903 and the magnetic disk 905) in the computer 1100. The computer 1100 then goes to the map creation process (step S2505) of FIG. 25.

Figure 40:
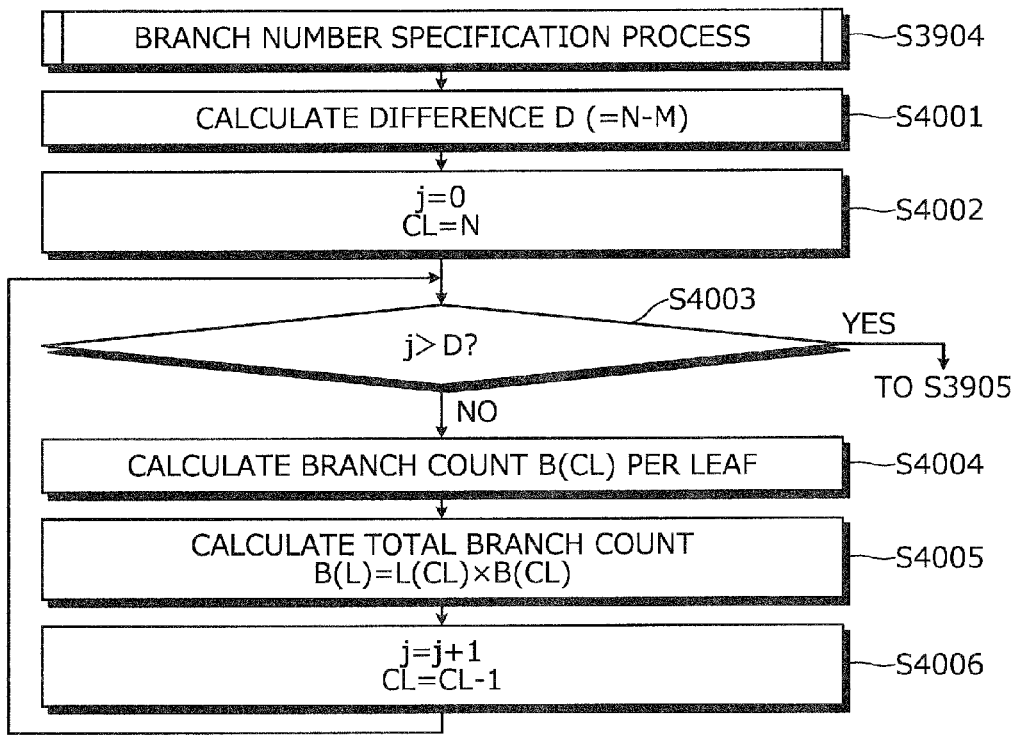
FIG. 40 is a flowchart of a detailed process example of a branch count specification process (step S3904) depicted in FIG. 39.

FIG. 40 is a flowchart of a detailed process example of the branch count specification process (step S3904) depicted in FIG. 39. First, the computer 1100 calculates a difference D (=N−M) of a maximum compression code length CLmax (=N) and a minimum compression code length CLmin (=M) (step S4001). For example, in the case of N=11, M=6 is known by reference to FIG. 26. Therefore, D=5 is obtained.

The computer 1100 sets a variable j of an exponent of 2 to j=0 and sets a variable CL of compression code length to CL=N (step S4002). The computer 1100 determines whether j>D is satisfied (step S4003). If j>D is not satisfied (step S4003: NO), the computer 1100 calculates the branch count b(CL) per leaf at the compression code length CL (step S4004). The branch count b(CL) per leaf at the compression code length CL is calculated from $b(CL)=2^j$. For example, since j=0 results in the compression code length CL=N=11, the branch count b(11) per leaf at the compression code length of 11 bits is $b(11)=2^j=2^0=1$.

The computer 1100 calculates the total branch count b(L) at the compression code length CL (step S4005). The total branch count b(L) at the compression code length CL is calculated by B(L)=L(CL)×b(CL). L(CL) is the leaf count (number of types of character data) at the compression code length CL. For example, since j=0 results in the compression code length CL=N=11, the total branch count b(L) at the compression code length of 11 bits is 1216×$2^0$=1216.

The computer 1100 then increments j and decrements the compression code length CL (step S4006) and returns to step S4003 to determine whether j after the increment satisfies j>D. In the case of N=11, j=D results in j=D=5 and, as a result, CL=M=6 is obtained. Therefore, at step S4004, the branch count b(6) per leaf at the compression code length CL (5 bits) is b(6)=$2^6$=64. Similarly, the total branch count b(L) is B(6)=0x$2^6$=0. If j>D is satisfied (step S4003: YES), the computer 1100 goes to the construction process (step S3905).

Figure 41:
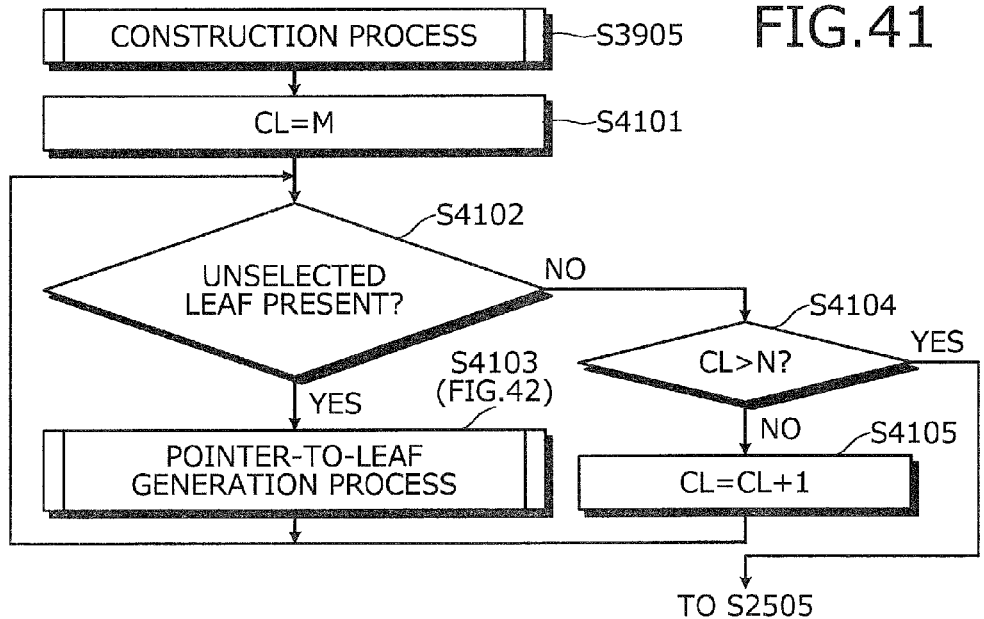
FIG. 41 is a flowchart of a detailed process procedure of a construction process (step S3905) depicted in FIG. 39.

FIG. 41 is a flowchart of a detailed process procedure of the construction process (step S3905) depicted in FIG. 39. The computer 1100 sets the compression code length CL to CL=CLmin=M (step S4101). The computer 1100 determines whether an unselected leaf is present at the compression code length CL (step S4102). If an unselected leaf is present (step S4102: YES), the computer 1100 executes a pointer-to-leaf generation process (step S4103) and returns to step S4102. In the pointer-to-leaf generation process (step S4103), pointers to a leaf are generated to the branch count corresponding to the compression code length CL for each leaf structure. Details of the pointer-to-leaf generation process (step S4103) will be described with reference to FIG. 42.

On the other hand, if no unselected leaf is present at step S4102 (step S4102: NO), the computer 1100 determines whether CL>N is satisfied (step S4104). If CL>N is not satisfied (step S4104: NO), the computer 1100 increments CL (step S4105) and returns to step S4102. On the other hand, if CL>N is satisfied (step S4104: YES), this means that the $2^N$-branch nodeless Huffman tree H is constructed, and the computer 1100 goes to step S2505. The information in the first to fifth areas is stored in this construction process (step S3905).

Figure 42:
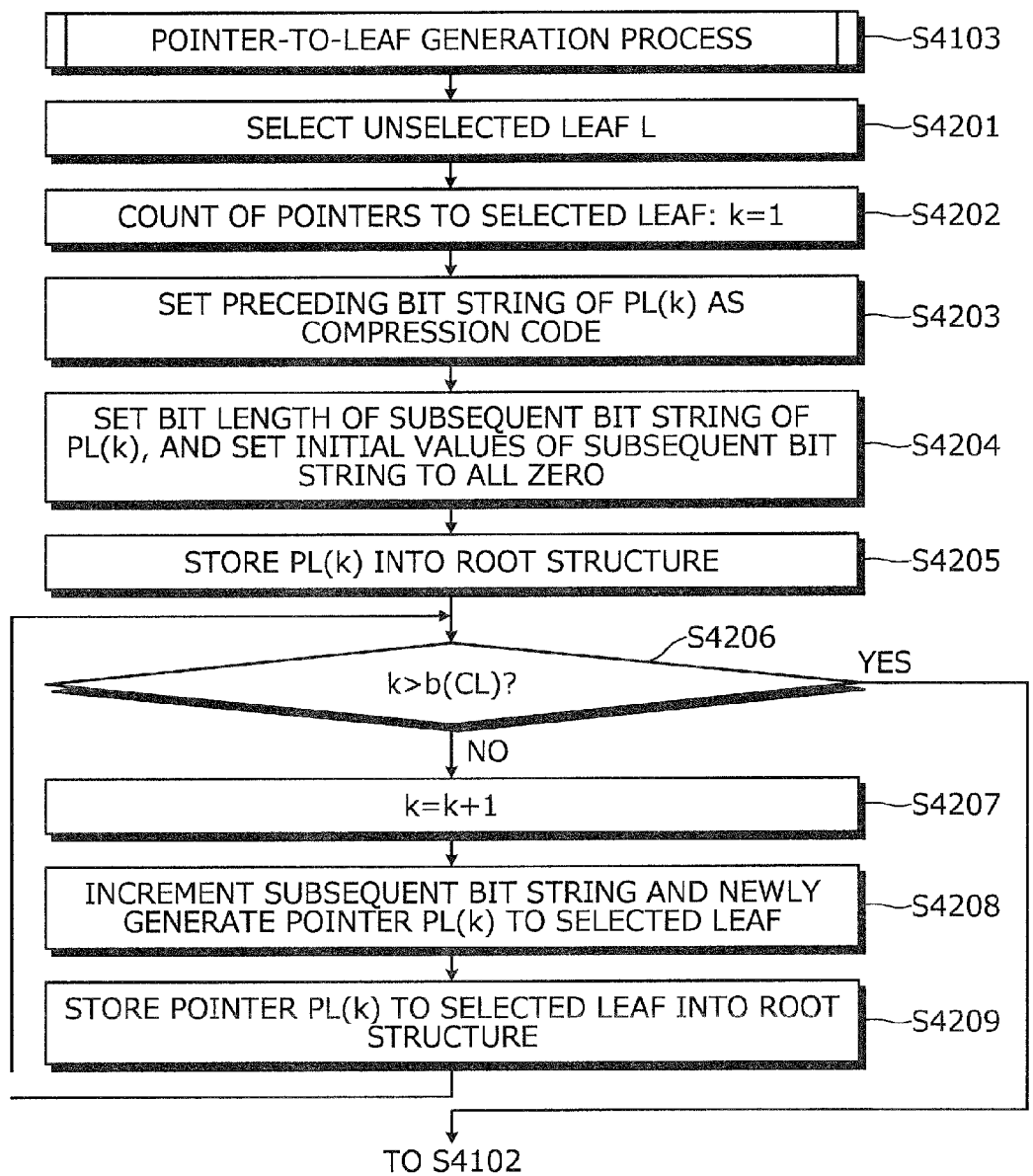
FIG. 42 is a flowchart of a detailed process procedure of a pointer-to-leaf generation process (step S4103) depicted in FIG. 41.

FIG. 42 is a flowchart of a detailed process procedure of the pointer-to-leaf generation process (step S4103) depicted in FIG. 41. First, the computer 1100 selects an unselected leaf L (step S4201) and sets a number k of pointers to the selected leaf to k=1 (step S4202). The computer 1100 sets a preceding bit string of a pointer PL(k) to the selected leaf as the compression code of the selected leaf (step S4203). For example, in the case of the upper limit length N=11, if the selected leaf is the leaf structure of the character data "0", the compression code is "000000". Therefore, the preceding bit string of the pointer PL(k) to the selected leaf is also "000000".

The computer 1100 sets a bit length of the subsequent bit string of the pointer PL(k) to the selected leaf to a difference acquired by subtracting the compression code length CL of the selected leaf from the maximum compression code length N and sets initial values of the subsequent bit string to all zero (step S4204). For example, if the selected leaf is the leaf structure of the character data "0", the compression code length CL is 6 bits and therefore, the bit length of the subsequent bit string is 5 bits (=11−6). In the case of k=1, the subsequent bit string is set to all zero and therefore, the subsequent bit string is 5-bit "00000".

The computer 1100 stores the pointer PL(k) to the selected leaf into the root structure (step S4205). Subsequently, the computer 1100 determines whether k>b(CL) is satisfied (step S4206) and b(CL) is the branch count per leaf at the compression code length CL of the selected leaf. If k>b(CL) is not satisfied (step S4206: NO), pointers to a leaf are generated for not all the branches assigned to the selected leaf and therefore, the computer 1100 increments k (step S4207).

The computer 1100 increments the current subsequent bit string and couples the incremented subsequent bit string to the end of the preceding bit string to newly generate the pointer PL(k) to the selected leaf (step S4208). The computer 1100 stores the pointer PL(k) to the selected leaf into the root structure (step S4209) and returns to step S4206. By repeating step S4206 to S4209, the pointers to a leaf are generated to the branch count per leaf. If k>b(CL) is satisfied at step S4206 (step S4206: YES), the computer 1100 goes to step S4102.

Since the maximum branch count $2^N$ of the $2^N$-branch nodeless Huffman tree H can be set to the optimum number depending on the number of types of character data appearing in the object file group Fs as described above, the size of the $2^N$-branch nodeless Huffman tree H can be made appropriate. According to the embodiment, even if the upper limit length N is not an integer multiple of 2 to 4 (e.g., the upper limit length N=11 or 13), the $2^N$-branch nodeless Huffman tree H can be generated with good compression efficiency.

The computer 1100 then mutually correlates the leaf structures in the $2^N$-branch nodeless Huffman tree H with the basic word structure, the specific character code structure, and the divided character code structure by reference to the character data table of FIG. 17. For example, as described above, the leaf structures store the specific characters, the divided character codes, and pointers to leaves and pointers to the basic words corresponding to the compression codes stored in the corresponding leaves.

The computer 1100 stores a pointer to a leaf storing a corresponding compression code for each basic word of the basic word structure. The computer 1100 stores a pointer to a leaf storing a corresponding compression code for each specific character of the specific character code structure. The computer 1100 stores a pointer to a leaf storing a corresponding compression code for each divided character code of the divided character code structure.

(Map Creation Process (Step S2505))

Figure 43:
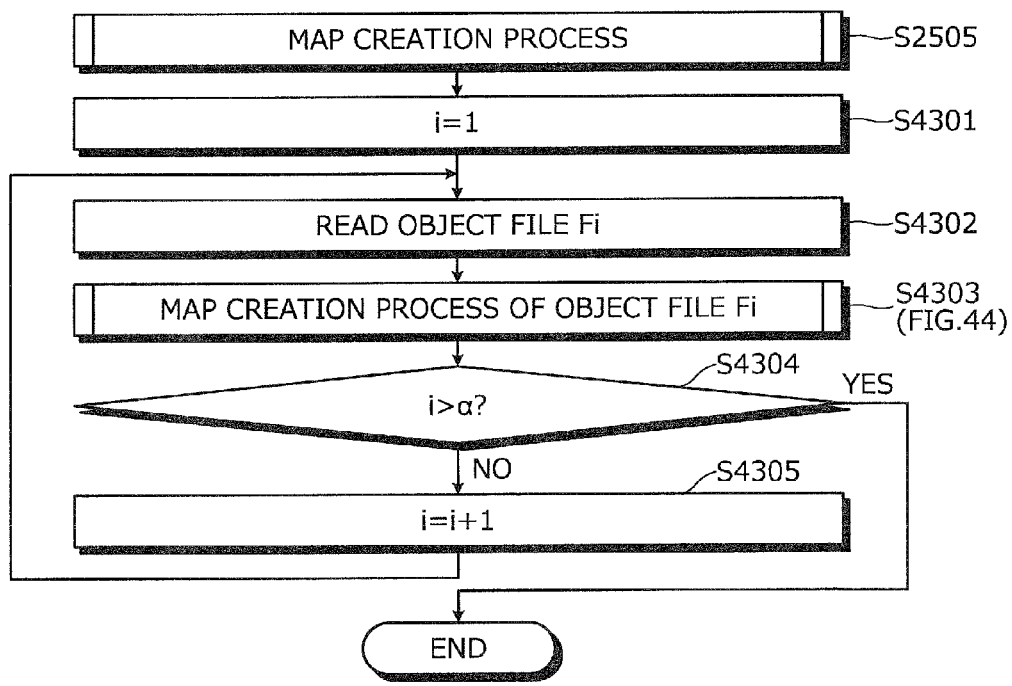
FIG. 43 is a flowchart of a detailed process example of a map creation process (step S2505) depicted in FIG. 25.

FIG. 43 is a flowchart of a detailed process example of the map creation process (step S2505) depicted in FIG. 25. First, the computer 1100 sets the file number i to i=1 (step S4301) and reads the object file Fi (step S4302). The computer 1100 executes the map creation process for the object file Fi (step S4303). Details of the map creation process for the object file Fi (step S4303) will be described with reference to FIG. 44. Subsequently, the computer 1100 determines whether the file number i satisfies i>α (where α is the total count of files in the object files Fs) (step S4304).

If i>α is not satisfied (step S4304: NO), the computer 1100 increments i (step S4305) and returns to step S4302. On the other hand, if i>α is satisfied (step S4304: YES), the map creation process (step S2505) is terminated. With this map creation process (step S2505), the map creation process for the object file Fi (step S4303) can be executed for each of the object files Fi.

Figure 44:
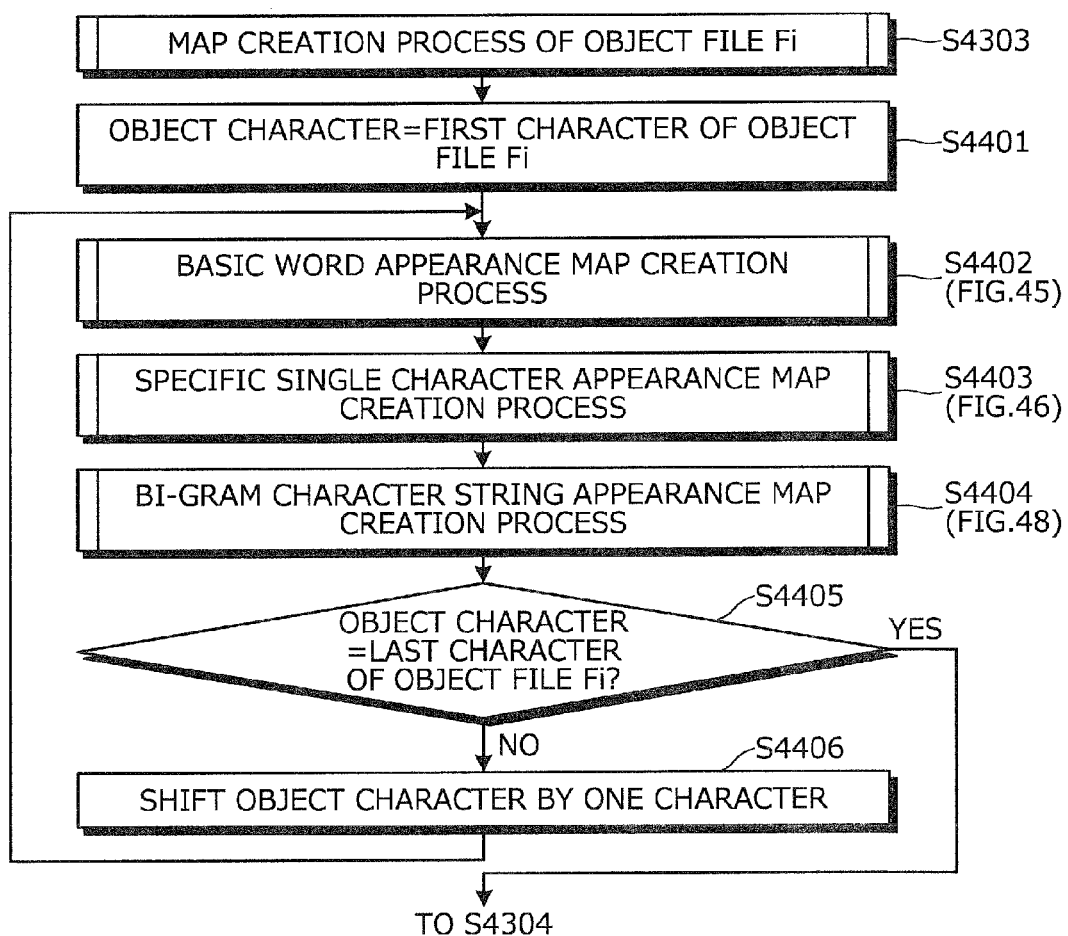
FIG. 44 is a flowchart of a detailed process procedure of the map creation process for the object file Fi (step S4303) depicted in FIG. 43.

FIG. 44 is a flowchart of a detailed process procedure of the map creation process for the object file Fi (step S4303) depicted in FIG. 43. First, the computer 1100 defines the first character of the object file Fi as the object character (step S4401) and executes a basic word appearance map creation process (step S4402), a specific single character appearance map creation process (step S4403), and a bi-gram character string appearance map creation process (step S4404).

Details of the basic word appearance map creation process (step S4402) will be described with reference to FIG. 45. Details of the specific single character appearance map creation process (step S4403) will be described with reference to FIG. 46. Details of the bi-gram character string appearance map creation process (step S4404) will be described with reference to FIG. 48.

The computer 1100 then determines whether the object character is the last character of the object file Fi (step S4405). If the object character is not the last character of the object file Fi (step S4405: NO), the computer 1100 shifts the object character by one character toward the end (step S4406) and returns to step S4402. On the other hand, if the object character is the last character of the object file Fi (step S4405: YES), the computer 1100 goes to step S4304 and terminates the map creation process for the object file Fi (step S4303).

With this map creation process for the object file Fi (step S4303), the basic word appearance map, the specific single character appearance map, and the bi-gram character string appearance map can simultaneously be generated in parallel while the object character is shifted one-by-one.

Figure 45:
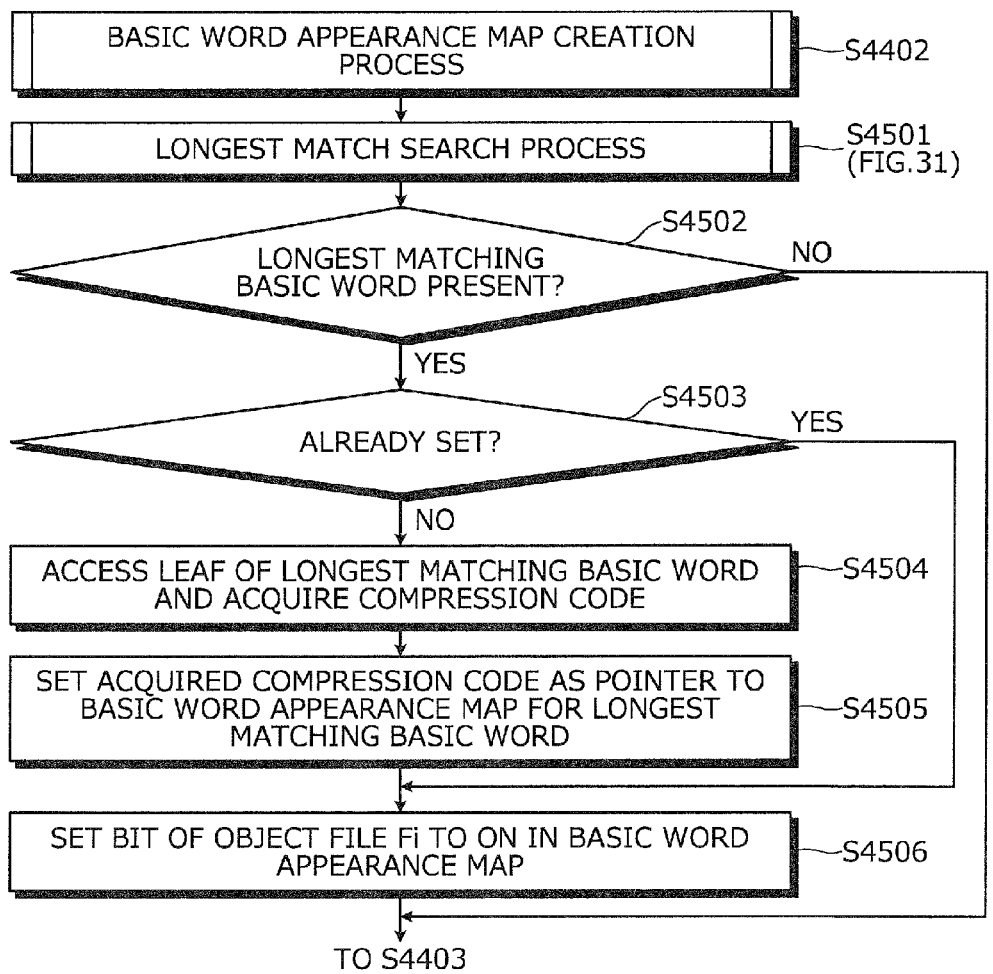
FIG. 45 is a flowchart of a detailed process example of a basic word appearance map creation process (step S4402) depicted in FIG. 44.

FIG. 45 is a flowchart of a detailed process example of the basic word appearance map creation process (step S4402) depicted in FIG. 44. First, the computer 1100 executes a longest match search process for the object character (step S4501). A detailed process procedure of the longest match search process (step S4501) has the same process contents as the longest match search process (step S2901) depicted in FIG. 31 and therefore will not be described.

The computer 1100 determines whether a longest matching basic word, i.e., a basic word, is present (step S4502). If no longest matching basic word is present (step S4502: NO), the computer 1100 goes to the specific single character appearance map creation process (step S4403). On the other hand, if a longest matching basic word is present (step S4502: YES), the computer 1100 determines whether the basic word appearance map is already set in terms of the longest matching basic word (step S4503).

If already set (step S4503: YES), the computer 1100 goes to step S4506. On the other hand, if not already set (step S4503: NO), the computer 1100 accesses the leaf of the longest matching basic word in the $2^N$-branch nodeless Huffman tree H to acquire the compression code thereof (step S4504). The computer 1100 sets the acquired compression code as a pointer to the basic word appearance map for the longest matching basic word (step S4505) and goes to step S4506. Subsequently, at step S4506, the computer 1100 sets the bit of the object file Fi to ON in the basic word appearance map for the longest matching basic word (step S4506).

The computer 1100 then terminates the basic word appearance map creation process (step S4402) and goes to the specific single character appearance map creation process (step S4403). With this basic word appearance map creation process (step S4402), the map can be created with the longest matching basic word defined as a basic word for each object character.

Figure 46:
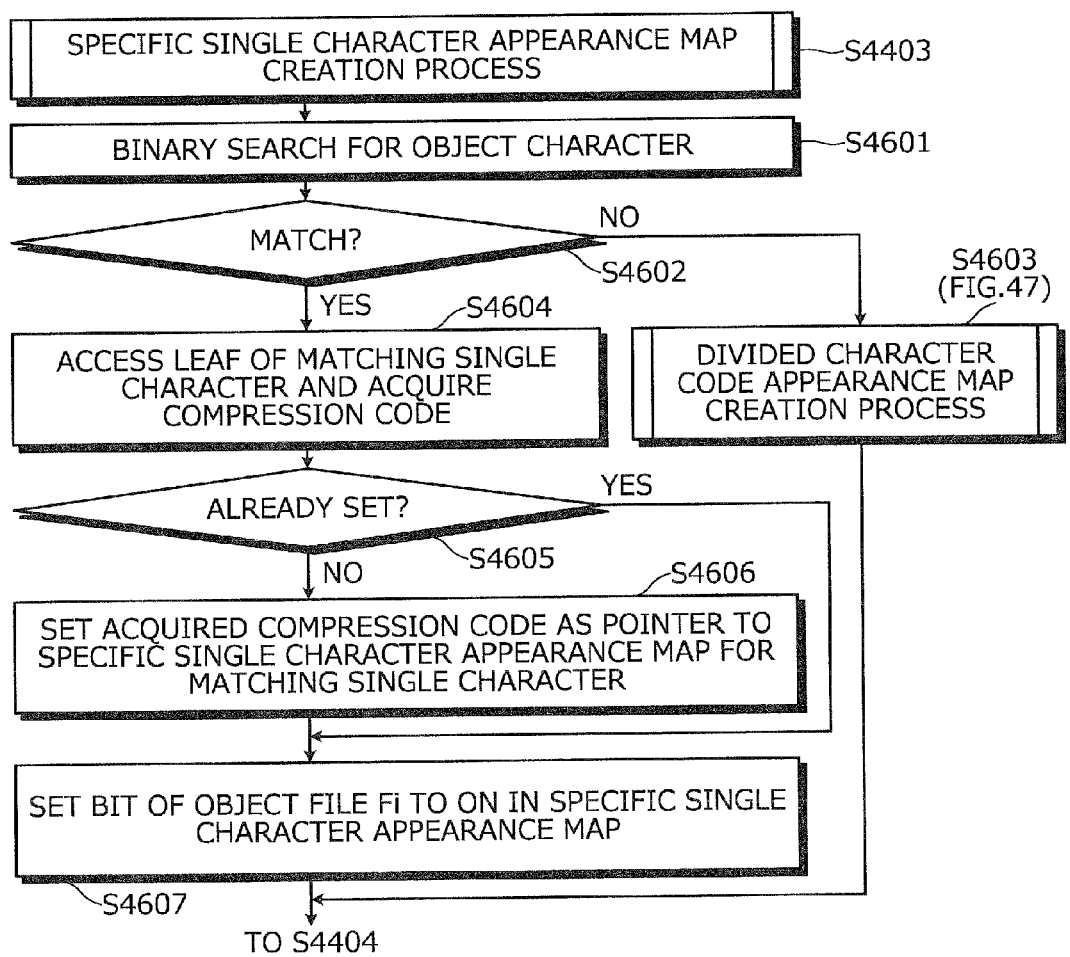
FIG. 46 is a flowchart of a detailed process example of a specific single character appearance map creation process (step S4403) depicted in FIG. 44.

FIG. 46 is a flowchart of a detailed process example of the specific single character appearance map creation process (step S4403) depicted in FIG. 44. First, the computer 1100 performs binary search of the specific single character structure for the object character (step S4601) and determines whether a match is found (S4602). If no matching single character is present (step S4602: NO), the computer 1100 executes a divided character code appearance map creation process (step S4603) and goes to the bi-gram character string appearance map creation process (step S4404). Details of the divided character code appearance map creation process (step S4603) will be described with reference to FIG. 47.

On the other hand, at step S4602, if a single character matching the object character is present as a result of the binary search (step S4602: YES), the computer 1100 accesses the leaf of the binary-searched single character in the $2^N$-branch nodeless Huffman tree H to acquire the compression code thereof (step S4604). The computer 1100 determines whether the specific single character appearance map is already set in terms of the acquired compression code (step S4605). If already set (step S4605: YES), the computer 1100 goes to step S4607.

On the other hand, if not already set (step S4605: NO), the computer 1100 sets the acquired compression code as a pointer to the specific single character appearance map for the binary-searched single character (step S4606) and goes to step S4607. Subsequently, at step S4607, the computer 1100 sets the bit of the object file Fi to ON in the specific single character appearance map for the binary-searched single character (step S4607).

The computer 1100 then terminates the specific single character appearance map creation process (step S4403) and goes to the bi-gram character string appearance map generation process (step S4404). With this specific single character appearance map creation process (step S4403), the map can be created with the binary-searched object character defined as a specific single character.

Figure 47:
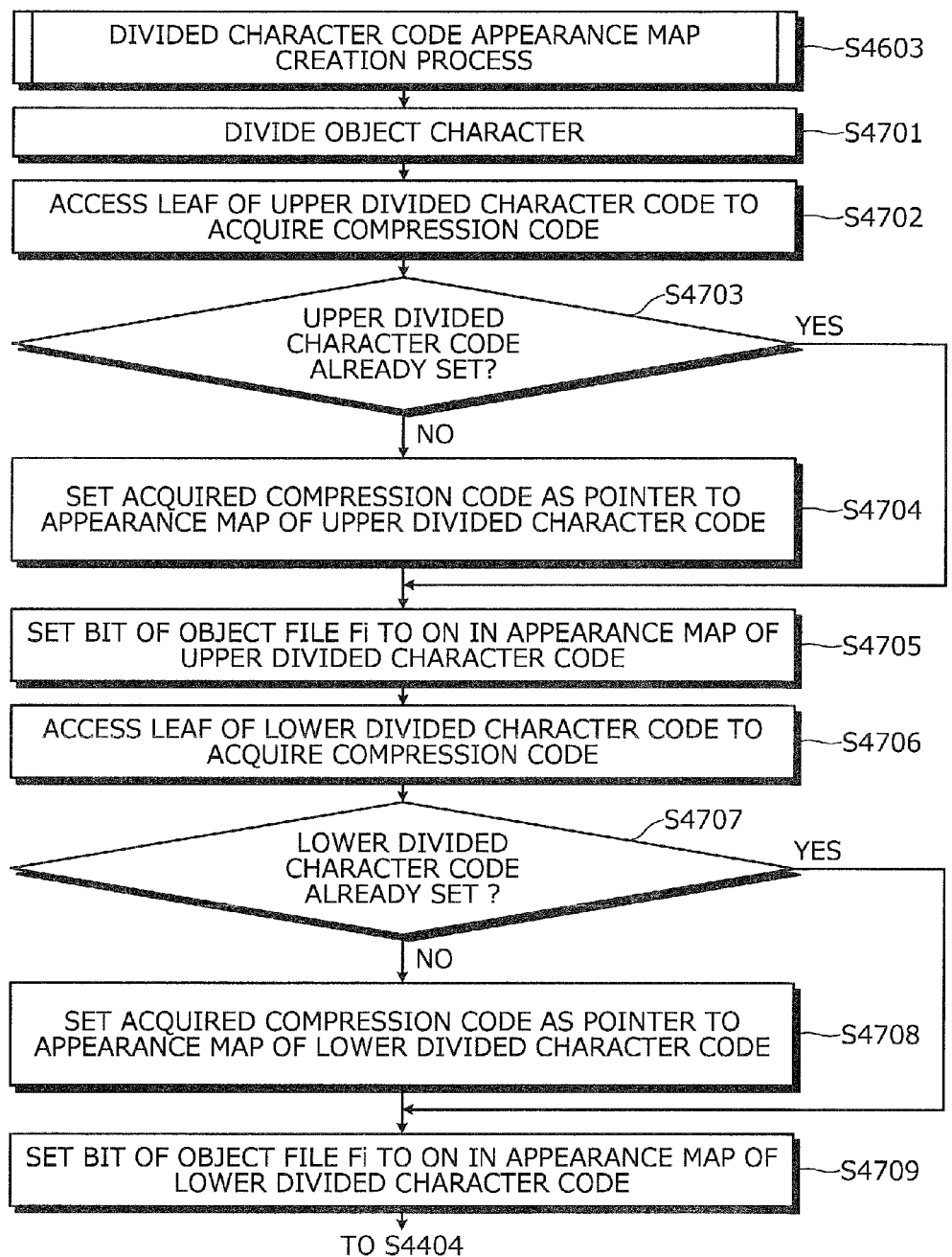
FIG. 47 is a flowchart of a detailed process example of a divided character code appearance map creation process (step S4603) depicted in FIG. 46.

FIG. 47 is a flowchart of a detailed process example of the divided character code appearance map creation process (step S4603) depicted in FIG. 46. First, the computer 1100 divides the object character (step S4701) and accesses the leaf of the upper divided character code in the $2^N$-branch nodeless Huffman tree H to acquire the compression code (step S4702). The computer 1100 determines whether the upper divided character code appearance map is already set in terms of the acquired compression code (step S4703).

If already set (step S4703: YES), the computer 1100 goes to step S4705. On the other hand, if not already set (step S4703: NO), the computer 1100 sets the acquired compression code as a pointer to the appearance map of the upper divided character code (step S4704) and goes to step S4705. At step S4705, the computer 1100 sets the bit of the object file Fi to ON in the appearance map of the upper divided character code divided from the object character (step S4705).

The computer 1100 accesses the leaf of the lower divided character code in the $2^N$-branch nodeless Huffman tree H to acquire the compression code (step S4706). The computer 1100 determines whether the appearance map of the lower divided character code is already set in terms of the acquired compression code (step S4707). If already set (step S4707: YES), the computer 1100 goes to step S4709.

On the other hand, if not already set (step S4707 NO), the computer 1100 sets the acquired compression code as a pointer to the appearance map of the lower divided character code (step S4708) and goes to step S4709. At step S4709, the computer 1100 sets the bit of the object file Fi to ON in the appearance map of the lower divided character code divided from the object character (step S4709).

The computer 1100 then terminates the divided character code appearance map creation process (step S4603) and goes to the bi-gram character string appearance map creation process (step S4404). With this divided character code appearance map creation process (step S4603), single characters ranked lower than the rank corresponding to the target appearance rate Pc cause a large number of OFF bits to appear due to lower appearance frequency.

However, by excluding the single characters ranked lower than the rank corresponding to the target appearance rate Pc from the objects of the generation of the appearance maps of the specific single characters, the map size of the compression code map Ms of the specific single characters can be optimized. By dividing a character, the single characters ranked lower than the rank corresponding to the target appearance rate Pc are set in maps having the fixed map sizes such as the compression code map Ms of the upper divided character codes and the compression code map Ms of the lower divided character codes. Therefore, the map sizes can be prevented from increasing and memory saving can be achieved regardless of an appearance rate set as the target appearance rate Pc.

Figure 48:
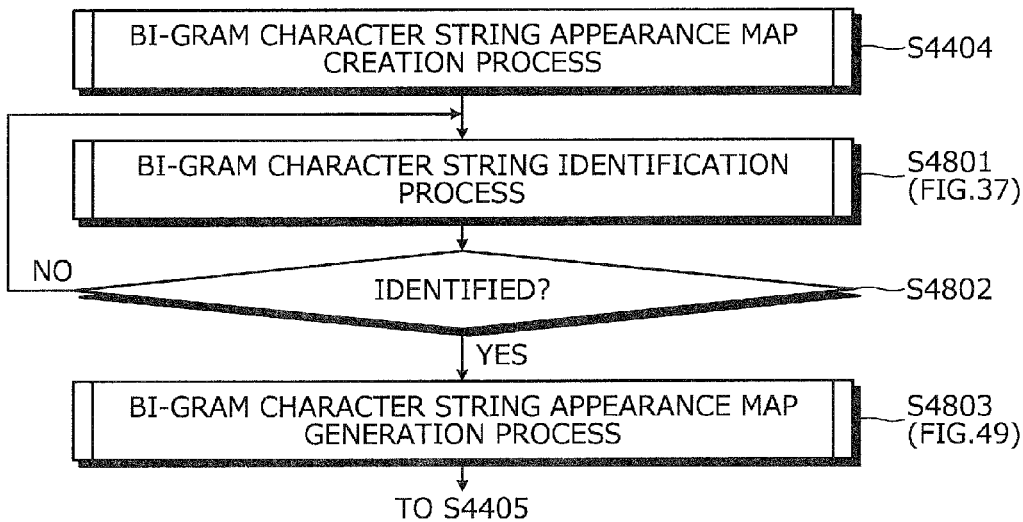
FIG. 48 is a flowchart of a detailed process example of a bi-gram character string map creation process (step S4404) depicted in FIG. 44.

FIG. 48 is a flowchart of a detailed process example of the bi-gram character string map creation process (step S4404) depicted in FIG. 44. In FIG. 48, first, the computer 1100 executes a bi-gram character string identification process (step S4801). A detailed process procedure of the bi-gram character string identification process (step S4801) has the same process contents as the bi-gram character string identification process (step S4806) depicted in FIG. 37 and therefore will not be described.

The computer 1100 determines whether a bi-gram character string is identified in the bi-gram character string identification process (step S4801) (step S4802). If not identified (step S4802: NO), the computer 1100 goes to step S4405 of FIG. 44.

On the other hand, if identified (step S4802: YES), the computer 1100 executes a bi-gram character string appearance map generation process (step S4803) and goes to step S4405.

Figure 49:
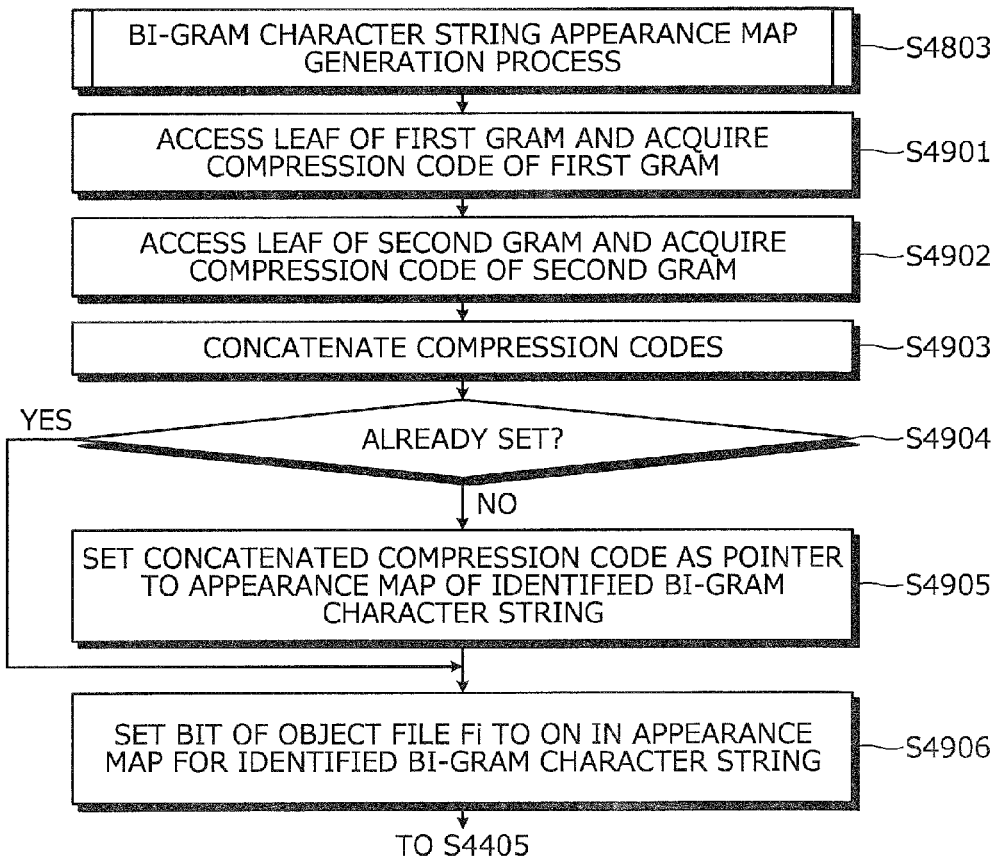
FIG. 49 is a flowchart of a detailed process example of a bi-gram character string appearance map generation process (step S4803)

FIG. 49 is a flowchart of a detailed process example of the bi-gram character string appearance map generation process (step S4803). In FIG. 49, first, the computer 1100 accesses a leaf of the $2^N$-branch nodeless Huffman tree H for a first gram (specific single character or divided character code) of the bi-gram character string identified in the bi-gram character string identification process (step S4801) of FIG. 48 to acquire a compression code (step S4901). The computer 1100 also accesses a leaf of the $2^N$-branch nodeless Huffman tree H for a second gram (specific single character or divided character code) to acquire a compression code (step S4902).

The computer 1100 concatenates the compression code of the first gram and the compression code of the second gram (step S4903). The computer 1100 determines whether an appearance map having the concatenated compression code as a pointer is already set (step S4904). If already set (step S4904: YES), the computer 1100 goes to step S4906.

On the other hand, if not already set (step S4904: NO), the computer 1100 sets the concatenated compression code as the pointer to the appearance map of the identified bi-gram character string (step S4905). Subsequently, at step S4906, the computer 1100 sets the bit of the object file Fi to ON in the appearance map for the identified bi-gram character string (step S4906).

The computer then terminates the bi-gram character string appearance map generation process (step S4803) and goes to step S4405. With the bi-gram character string appearance map generation process (step S4803), the appearance maps of the bi-gram character strings can directly specified by the concatenated compression codes of the bi-gram character strings.

<Specific Example of Compression Process>

A specific example of the compression process for the object file Fi will be described. As described above, if the compression code map Ms is generated, an appearance map within the compression code map Ms can be pointed by a compression code string acquired by compressing a search character string. A specific example of the compression process will hereinafter be described.

Figure 50:
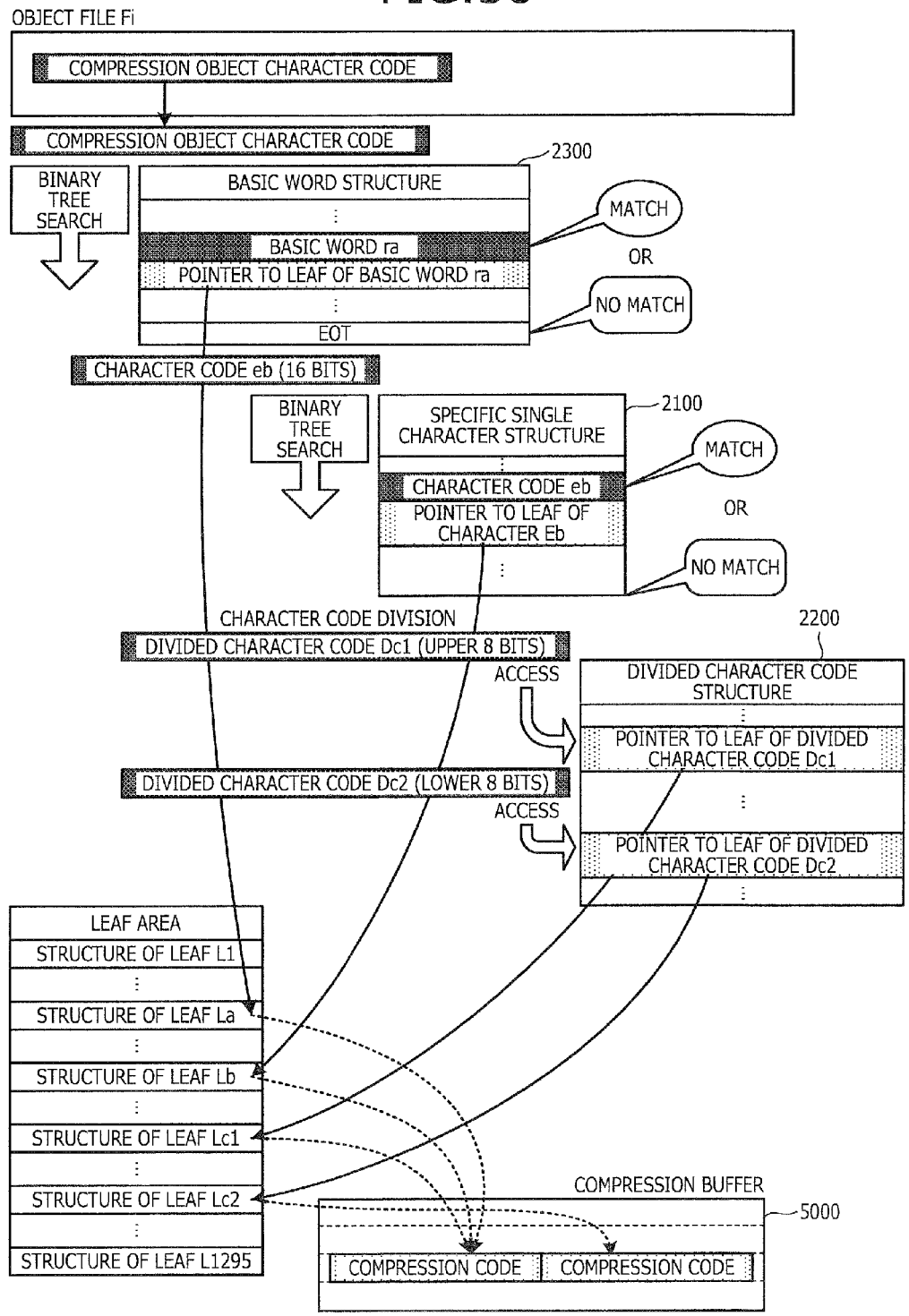
FIG. 50 is an explanatory diagram of a specific example of a compression process using a $2^N$-branch nodeless Huffman tree.

FIG. 50 is an explanatory diagram of a specific example of the compression process using a $2^N$-branch nodeless Huffman tree. First, the computer 1100 acquires a compression object character code of a first character from the object file group Fs and retains a position on the object file Fi. The computer 1100 performs binary tree search of the basic word structure 2300. Since a basic word is a character code string of two or more characters, if the compression object character code of the first character is hit, a character code of a second character is acquired as the compression object character code.

The character code of the second character is searched from the position where the compression object character code of the first character is hit. The binary tree search is repeatedly performed for a third or later character until a non-matching compression object character code appears. If a matched basic word ra ("a" is a leaf number) is found, a pointer to the leaf La correlated in the basic word structure 2300 is used to access a structure of the leaf La. The computer 1100 searches for the compression code of the basic word ra stored in the accessed structure of the leaf La and stores the compression code into a compression buffer 5000.

On the other hand, if a non-matching compression character code appears, the binary tree search of the basic word structure 2300 is terminated (proceeds to End Of Transmission (EOT)). The computer 1100 sets the compression object character code of the first character into a register again and performs the binary tree search of the specific single character structure 2100.

If a matched character code eb ("b" is a leaf number) is found, the computer 1100 uses a pointer to the leaf Lb to access a structure of the leaf Lb. The computer 1100 searches for the compression code of the character code eb stored in the accessed structure of the leaf Lb and stores the compression code into the compression buffer 5000.

On the other hand, if no matched character code appears and the binary tree search is terminated, the compression object character code is not a specific single character code and therefore, the computer 1100 divides the compression object character code into upper eight bits and lower eight bits. For the divided character code of the upper eight bits, the computer 1100 performs binary tree search of the divided character code structure 2200. If a matched divided character code Dc1 ("c1" is a leaf number) is found, the computer 1100 uses a pointer to the leaf Lc1 to access a structure of the leaf Lc1. The computer 1100 searches for the compression code of the divided character code Dc1 stored in the accessed structure of the leaf Lc1 and stores the compression code into the compression buffer 5000.

For the divided character code of the lower eight bits, the compute 1100 continues the binary tree search of the divided character code structure. If a matched divided character code Dc2 ("c2" is a leaf number) is found, the computer 1100 uses a pointer to the leaf Lc2 to access a structure of the leaf Lc2. The computer 1100 searches for the compression code of the divided character code Dc2 stored in the accessed structure of the leaf Lc2 and stores the compression code into the compression buffer 5000. As a result, the object file Fi is compressed.

<Compression Process of Object File Group Fs>

A process procedure of the compression process for the object file group Fs by the first compressing unit 1103 will be described.

Figure 51:
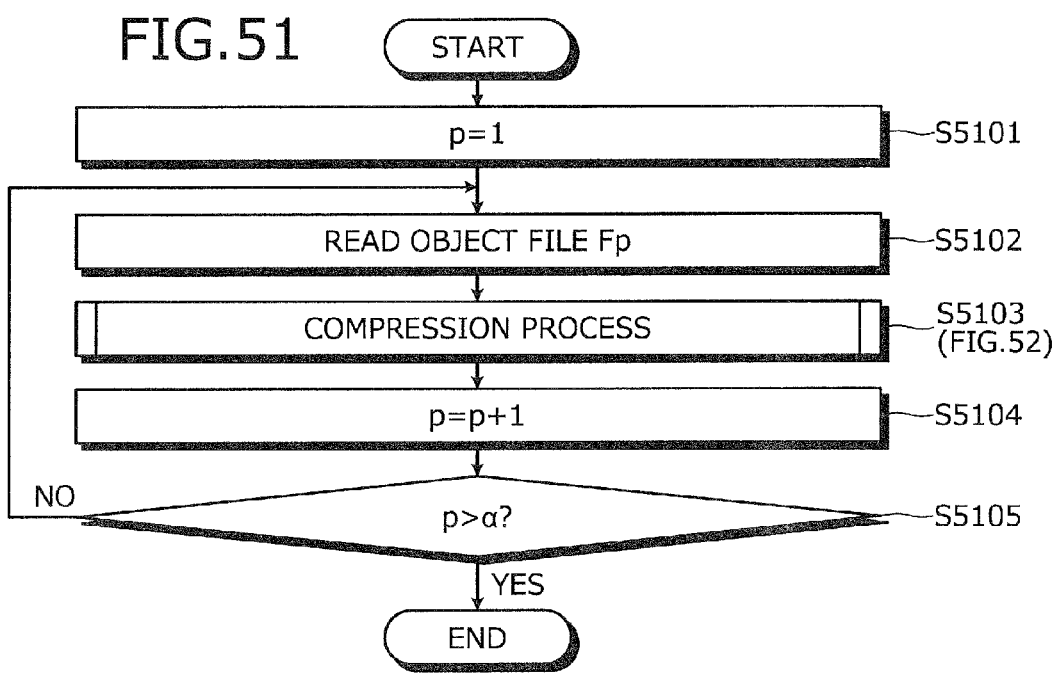
FIG. 51 is a flowchart of a compression process example of an object file group using a $2^N$-branch nodeless Huffman tree H by a first compressing unit 1103.

FIG. 51 is a flowchart of the compression process example of the object file group Fs using the $2^N$-branch nodeless Huffman tree H by the first compressing unit 1103. The computer 1100 sets the file number: p to p=1 (step S5101) and reads an object file Fp (step S5102). The computer 1100 executes the compression process (step S5103) and increments the file number: p (step S5104). Details of the compression process (step S5103) will be described with reference to FIG. 52.

The computer 1100 determines whether p>α is satisfied (step S5105) and α is the total count of files in the object files Fs. If p>α is not satisfied (step S5105: NO), the computer 1100 returns to step S5102. On the other hand, if p>α is satisfied (step S5105: YES), the computer 1100 terminates the compression process for the object file group Fs.

Figure 52:
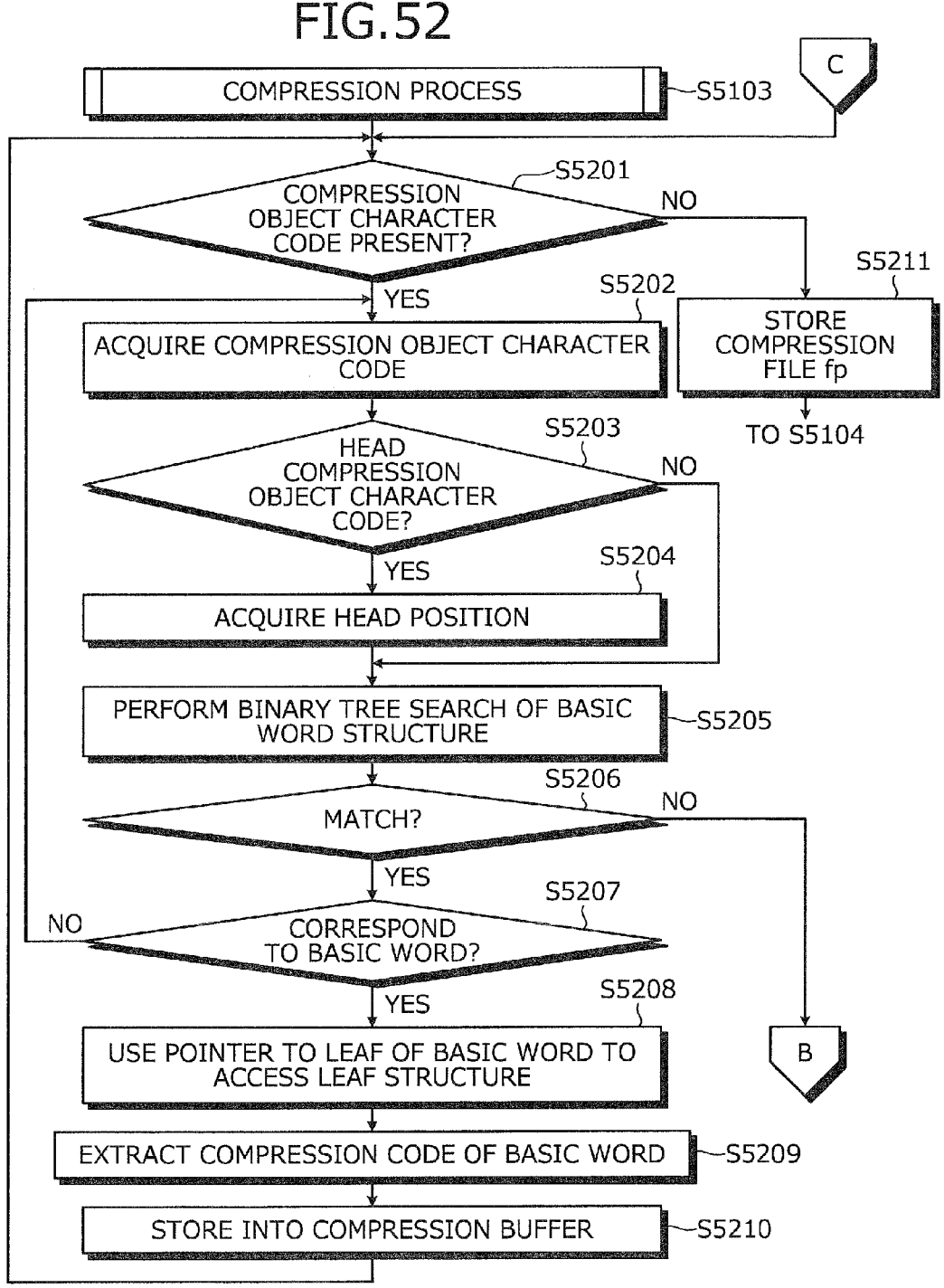
FIG. 52 is a flowchart (part 1) of a detailed process procedure of the compression process (step S5103) depicted in FIG. 51.

FIG. 52 is a flowchart (part 1) of a detailed process procedure of the compression process (step S5103) depicted in FIG. 51. In FIG. 52, first, the computer 1100 determines whether a compression object character code is present in the object file group Fs (step S5201). If present (step S5201: YES), the computer 1100 acquires and sets the compression object character code in a register (step S5202). The computer 1100 determines whether the compression object character code is the head compression object character code (step S5203).

The head compression object character code is a uncompressed character code of a first character. If the code is the head code (step S5203: YES), the computer 1100 acquires a pointer of the position (head position) of the compression object character code on the object file group Fs (step S5204) and goes to step S5205. On the other hand, if the code is not the head code (step S5203: NO), the computer 1100 goes to step S5205 without acquiring the head position.

The computer 1100 performs the binary tree search of the basic word structure 2300 (step S5205). If the compression object character code is matched (step S5206: YES), the computer 1100 determines whether a consecutive matched character code string corresponds to (a character code string of) a basic word (step S5207). If not corresponding (step S5207: NO), the computer 1100 returns to step S5202 and acquires the subsequent character code as the compression object character code. In this case, since the subsequent character code is not the head code, the head position is not acquired.

On the other hand, at step S5207, if corresponding to a basic word (step S5207: YES), the computer 1100 uses a pointer to the leaf L# of the corresponding basic word to access a structure of the leaf L# (step S5208). The computer 1100 extracts the compression code of the basic word stored in the pointed structure of the leaf L# (step S5209).

The computer 1100 then stores the extracted compression code into the compression buffer 5000 (step S5210) and returns to step S5201. This loop makes a flow of the compression process of basic words. If no compression object character code is present at step S5201 (step S5201: NO), the computer 1100 performs file output to store a compression file fp acquired by compressing an object file Fp, from the compression buffer 5000 (step S5211). The computer 1100 goes to step S5104. On the other hand, if not matched at step S5206 (step S5206: NO), the computer 1100 enters a loop of the compression process of 16-bit character codes.

Figure 53:
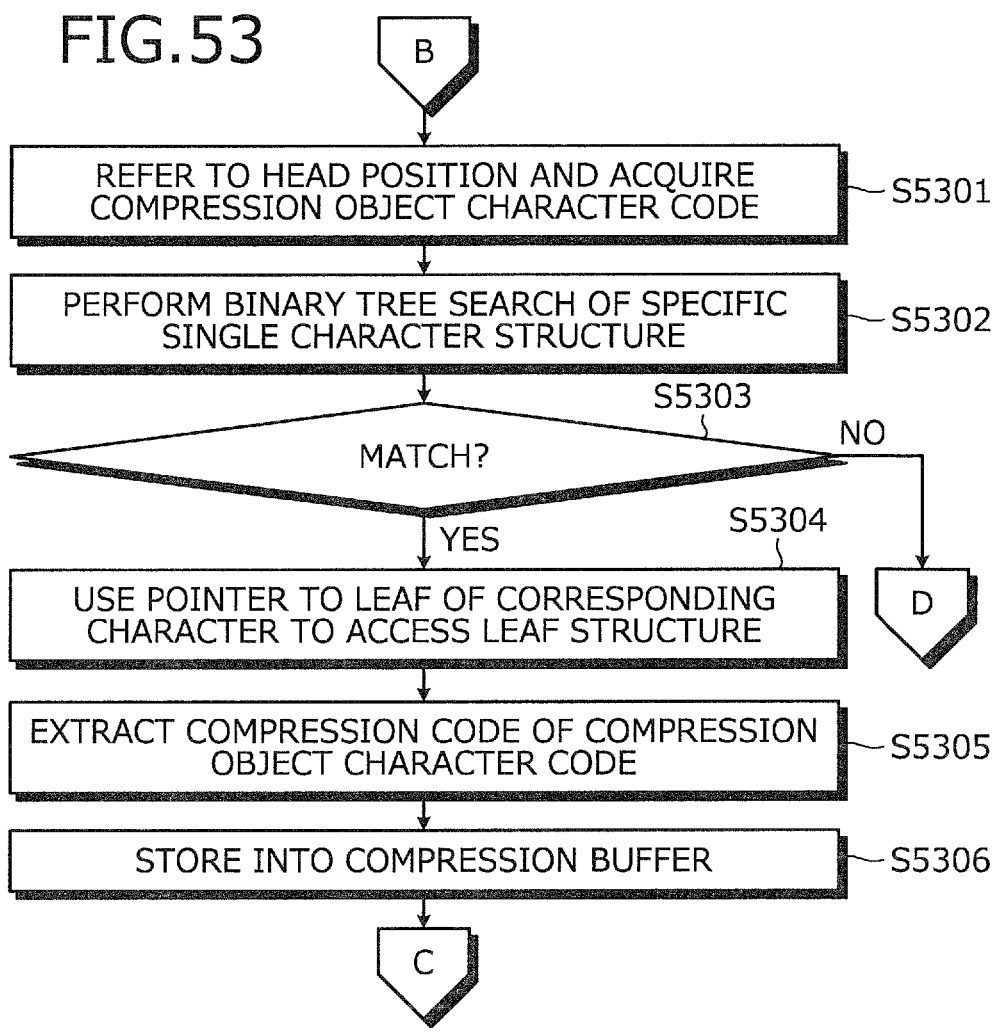
FIG. 53 is a flowchart (part 2) of the detailed process procedure of the compression process (step S5103) depicted in FIG. 51.

FIG. 53 is a flowchart (part 2) of the detailed process procedure of the compression process (step S5103) depicted in FIG. 51. In FIG. 53, the computer 1100 refers to the pointer of the head position acquired at step S5204 to acquire and set the compression object character code from the object file group Fs into the register (step S5301).

The computer 1100 performs the binary tree search of the specific single character code structure 2100 for the compression object character code (step S5302). If matched (step S5303: YES), the computer 1100 uses a pointer to the leaf L# of the corresponding character to access the structure of the leaf L# (step S5304). The computer 1100 extracts the compression code of the compression object character code stored in the pointed structure of the leaf L# (step S5305).

The computer 1100 then stores the found compression code into the compression buffer 5000 (step S5306) and returns to step S5201. This loop makes a flow of the compression process of 16-bit character codes. On the other hand, if no matched character code is present at step S5303 (step S5303: NO), the computer 1100 enters a loop of the compression process of divided character codes.

Figure 54:
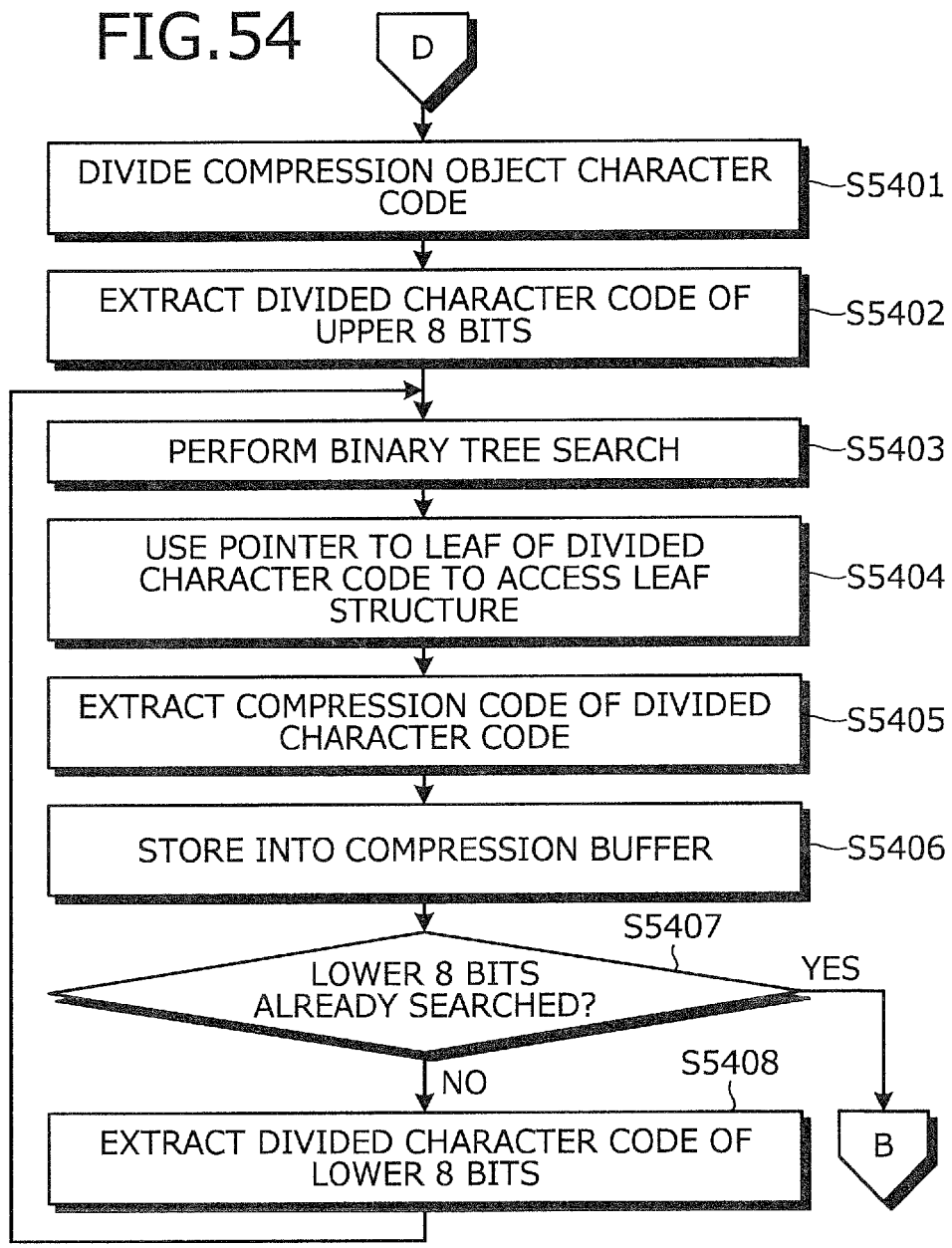
FIG. 54 is a flowchart (part 3) of the detailed process procedure of the compression process (step S5103) depicted in FIG. 51.

FIG. 54 is a flowchart (part 3) of the detailed process procedure of the compression process (step S5103) depicted in FIG. 51. In FIG. 54, first, the computer 1100 divides the compression object character code into upper eight bits and lower eight bits (step S5401) and extracts the divided character code of the upper eight bits (step S5402). The computer 1100 performs the binary tree search of the divided character code structure 2200 (step S5403).

The computer 1100 uses a pointer to the leaf L# of the found divided character code to access the structure of the leaf L# (step S5404). The computer 1100 extracts the compression code of the divided character code stored in the pointed structure of the leaf L# (step S5405). Subsequently, the computer 1100 stores the found compression code into the compression buffer 5000 (step S5406).

The computer 1100 determines whether the lower eight bits are already searched (step S5407) and if not already searched (step S5407: NO), the computer 1100 extracts the divided character code of the lower eight bits (step S5408) and executes steps S5403 to S5406. On the other hand, if the lower eight bits are already searched (step S5407: YES), the computer 1100 returns to step S5301 and enters the loop of the compression process of basic words.

As described above, in the compression process using the $2^N$-branch nodeless Huffman tree, it is not necessary to search toward the root because of the absence of inner nodes, and the character data stored in the pointed structure of the leaf L# may simply be written into the compression buffer 5000. Therefore, the compression process can be accelerated.

The structure of the leaf L# storing the compression object character code can immediately be identified from the basic word structure, the specific single character code structure, and the divided character code structure. Therefore, it is not necessary to search the leaves of the $2^N$-branch nodeless Huffman tree H and the compression process can be accelerated. By dividing a lower-order character code into an upper bit code and a lower bit code, nonspecific single characters can be compressed into compression codes of 256 types of divided character codes. Therefore, the compression rate can be improved.

<Specific Example of Map Compression>

A specific example of map compression of the appearance maps in the compression code map Ms by the second compression unit 1106 will be described. The second compressing unit 1106 compresses an appearance map in a compression area and does not compress an appearance map in a non-compression area. The compression area corresponds to bit strings of appearance maps until the file number of n×(quotient of α/n) when the file numbers 1 to α are assigned. For example, in the case of α=256 bits and the current object file number n=600, the quotient of α/n is two and therefore, the bit strings of the appearance maps of the file numbers 1 to 2n make up the compression area. The bit strings of the file numbers (2n+1) to α make up the non-compression area and are not compressed.

In the bit strings of the appearance maps, "0" successively appears at a larger number of places in the bit strings as the total file number a increases.

Conversely, "1" successively appears at a larger number of places in character data with higher appearance frequency. Therefore, an appearance rate area is set depending on an appearing rate of a character. The appearance rate area is a range of the appearance rate. The Huffman tree h for appearance map compression is assigned depending on the appearance rate area.

Figure 55:
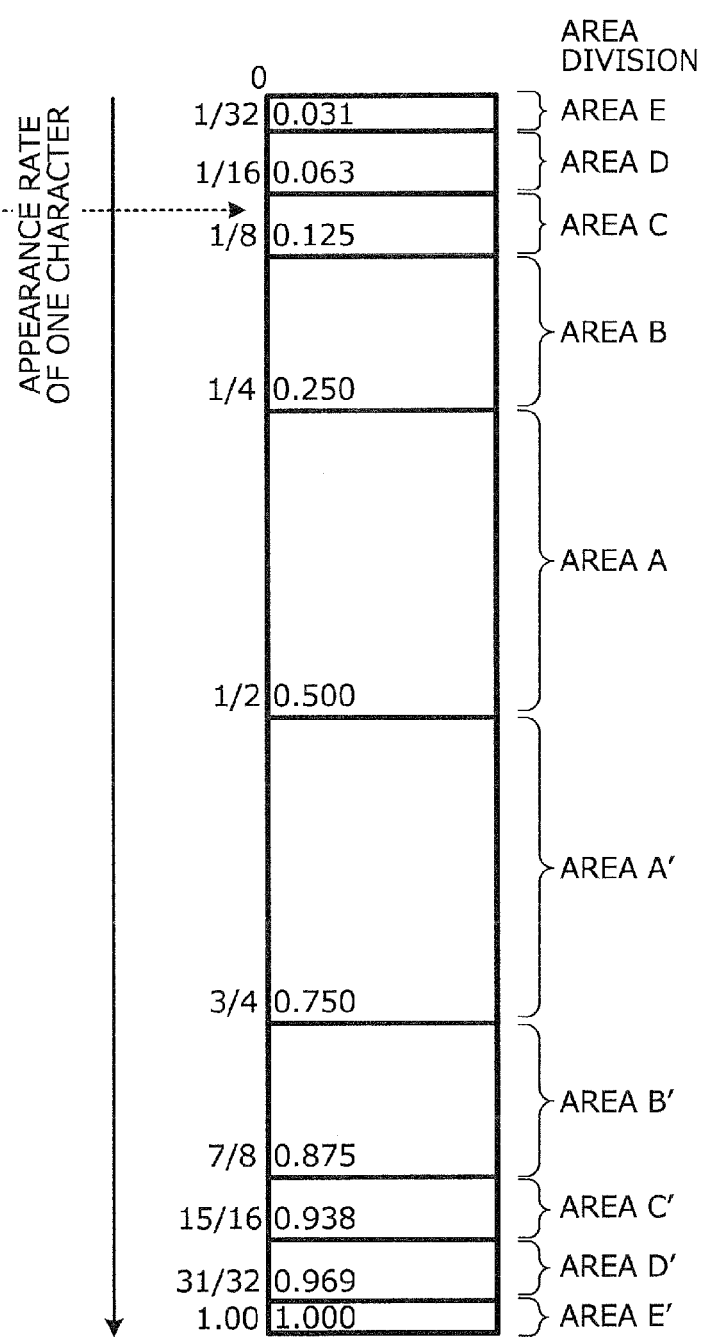
FIG. 55 is an explanatory view of a relationship between appearance rate and appearance rate area.

FIG. 55 is an explanatory view of a relationship between the appearance rate and the appearance rate area. Assuming that the appearance rate ranges from 0 to 100%, as depicted in FIG. 55, an area can be divided into areas A to E and areas A' to E'. Therefore, the Huffman tree h for appearance map compression is assigned as a compression pattern depending on the appearance rate area specified by the areas A to E and the areas A' to E'.

FIG. 56 is an explanatory view of a compression pattern table having compression patterns by appearance rate areas. Since the appearance rate is stored in the fifth area of the structure of the leaf L# as depicted in FIG. 20, when the structure of the leaf L# is specified, a compression pattern is identified by reference to a compression pattern table 5600. The areas A and A' are not compressed and therefore have no Huffman tree used as a compression pattern.

FIG. 57 is an explanatory view of a compression pattern in the case of the areas B and B'. A compression pattern 5700 is the Huffman tree h having 16 types of leaves.

FIG. 58 is an explanatory view of a compression pattern in the case of the areas C and C'. A compression pattern 5800 is the Huffman tree h having 16+1 types of leaves. In the compression pattern 5800, "0" or "1" stochastically successively appears in a larger number of places as compared to the areas B and B'. Therefore, the bit string having a value of "0" continuing for 16 bits is assigned with a code word "00".

FIG. 59 is an explanatory view of a compression pattern in the case of the areas D and D'. A compression pattern 5900 is the Huffman tree having 16+1 types of leaves. In the compression pattern 5900, "0" or "1" stochastically successively appears in a larger number of places as compared to the areas C and C'. Therefore, the bit string having a value of "0" continuing for 32 bits is assigned with a code word "00".

FIG. 60 is an explanatory view of a compression pattern in the case of the areas E and E'. A compression pattern 6000 is the Huffman tree having 16+1 types of leaves. In the compression pattern 6000, "0" or "1" stochastically successively appears in a larger number of places as compared to the areas D and D'. Therefore, the bit string having a value of "0" continuing for 64 bits is assigned with a code word "00". Since the number of successive "0s" indicative of the absence of a character code increases depending on the appearance rate area as described above, the compression efficiency of the compression code map Ms can be improved depending on an appearance rate of a character code.

(Compression Code Map Compression Process Procedure)

A compression code map compression process will be described. The compression code map compression process is a process of compressing a bit string in the compression area. For example, the compression pattern table 5600 depicted in FIG. 56 and the compression patterns 5700 to 6000 (Huffman trees h) depicted in FIGS. 57 to 60 are used for compressing the bit string in the compression area of the compression code map Ms. A compression code map compression process procedure will hereinafter be described.

Figure 61:
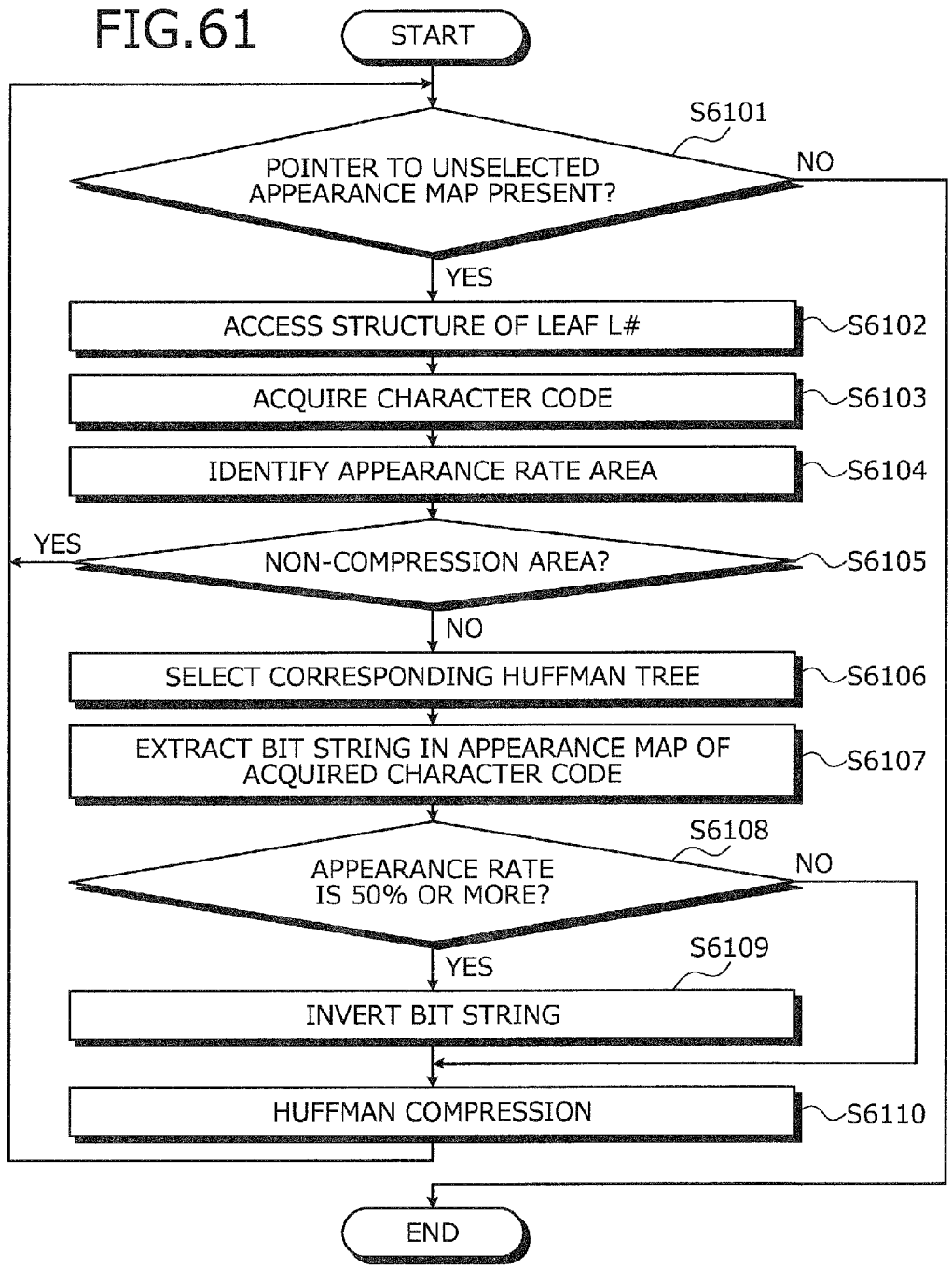
FIG. 61 is a flowchart of a compression code map compression process procedure.

FIG. 61 is a flowchart of a compression code map compression process procedure. In FIG. 61, first, the computer 1100 determines whether a pointer to an unselected appearance map is present in the compression code map Ms (step S6101). If an unselected address is present (step S6101: YES), the computer 1100 selects the unselected address to access the structure of the leaf L# (step S6102) and acquires a character code from the first area of the structure of the leaf L# (step S6103). The computer 1100 acquires an appearance rate area from the fifth area of the accessed structure of the leaf L# to identify the appearance rate area of the acquired character code (step S6104).

The computer 1100 then refers to the compression pattern table 5900 of FIG. 59 to determine whether the identified appearance rate area is the non-compression area (e.g., the appearance rate area A or A') (step S6105). In the case of the non-compression area (step S6105: YES), the computer 1100 returns to step S6101 and selects the next address.

On the other hand, if not the non-compression area (step S6105: NO), the computer 1100 uses the identified appearance area to select the corresponding compression pattern (Huffman tree h) out of the compression patterns 5700 to 6000 (Huffman trees h) depicted in FIGS. 57 to 60 (step S6106). The computer 1100 extracts the bit string of the compression area in the appearance map of the acquired character code to be compressed (step S6107).

The computer 1100 determines whether the appearance rate of the acquired character code is equal to or greater than 50% (step S6108). As described above, the appearance rate is a value acquired by using the total number of files in the object file group Fs as a parent population (denominator) and the number of files having the corresponding character data as a numerator. Since the appearance rate area is determined depending on the appearance rate (see FIG. 55), if the appearance rate area is A to E, it is determined that the appearance rate of the acquired character code is not equal to or greater than 50%. On the other hand, if the appearance rate area is A' to E', the computer 1100 determines that the appearance rate of the acquired character code is equal to or greater than 50%.

If the appearance rate is equal to or greater than 50% (step S6108: YES), the computer 1100 inverts the bit string extracted at step S6107 so as to increase the compression efficiency (step S6109). For example, if the extracted bit string is "1110", the bit string is inverted to "0001" to increase the number of "0s". The computer 1100 compresses the inverted bit string by using the Huffman tree selected at step S6106 and stores the bit string into the storage device (e.g., a flash memory or the magnetic disk 905) (step S6110). This inversion of the bit string eliminates the needs of preparing the Huffman tree h of the appearance rate areas A' to E' and therefore, memory saving can be achieved.

On the other hand, if the appearance rate is not equal to or greater than 50% (step S6108: NO), the computer 1100 compresses the bit string extracted at step S6107 by using the Huffman tree selected at step S6106 (step S6110) without inversion of the bit string (step S6109) and returns to step S6101. If no unselected address is present at step S6101 (step S6101: NO), the computer 1100 terminates the compression code map compression process.

With such a compression code map compression process procedure, the bit string in the compression area is compressed for each of character data depending on the appearance rate as depicted in FIG. 3. Since the number of successive "0s" indicative of the absence of the character data increases depending on the appearance rate area in this way, the compression efficiency of the compression code map Ms can be improved depending on the appearance rate of character data.

If an object file is subsequently added, when the added object file is compressed, a bit string indicative of the presence of the presence/absence of a character must be added to the compression code map Ms. In the compression code map Ms before the compression, the bit strings of the appearance maps of the file numbers 1 to α are compressed with the compression patterns 5700 to 6000, resulting in a code length different for each record. In other words, the bit strings are defined as the compression area because of the variable length.

Thus, as depicted in FIG. 3, the beginnings of the compression code strings (on the file number k side) are aligned while the ends (on the file number 1 side) are not aligned. If a sequence of a bit string is assigned in the order of the file number: 1 to a from the side of the pointer to the compression code map M (compression code of character data), the bit string of the additional file is inserted on the ending side of the compression code string, making the compression code string and the bit string of the additional file discontinuous. Therefore, the bit strings of the compression area of the compression code map Ms are arranged in descending order of the file number p of the object file group Fs from the head position to the ending position in advance. In the compression code map Ms, the non-compression area is set between the pointer to the appearance map (compression code of character data) and the compression area.

Taking FIG. 3 as an example, the bits of the file number: 2n+1 are assigned on the side of the file number: 1 to 2n+1 on which the compression code strings are aligned. As a result, when the bit strings of the file number: 1 to 2n are compressed, the bit strings can be made continuous in the order of file number even if the bit strings of the non-compression file number: 2n+1 to 3n are inserted. As a result, even when the bit strings of the file number: 1 to 2n are compressed, the file number of the additional file is not deviated from the bits thereof and the object file can accurately be narrowed down.

<Second Functional Configuration Example>

Figure 62:
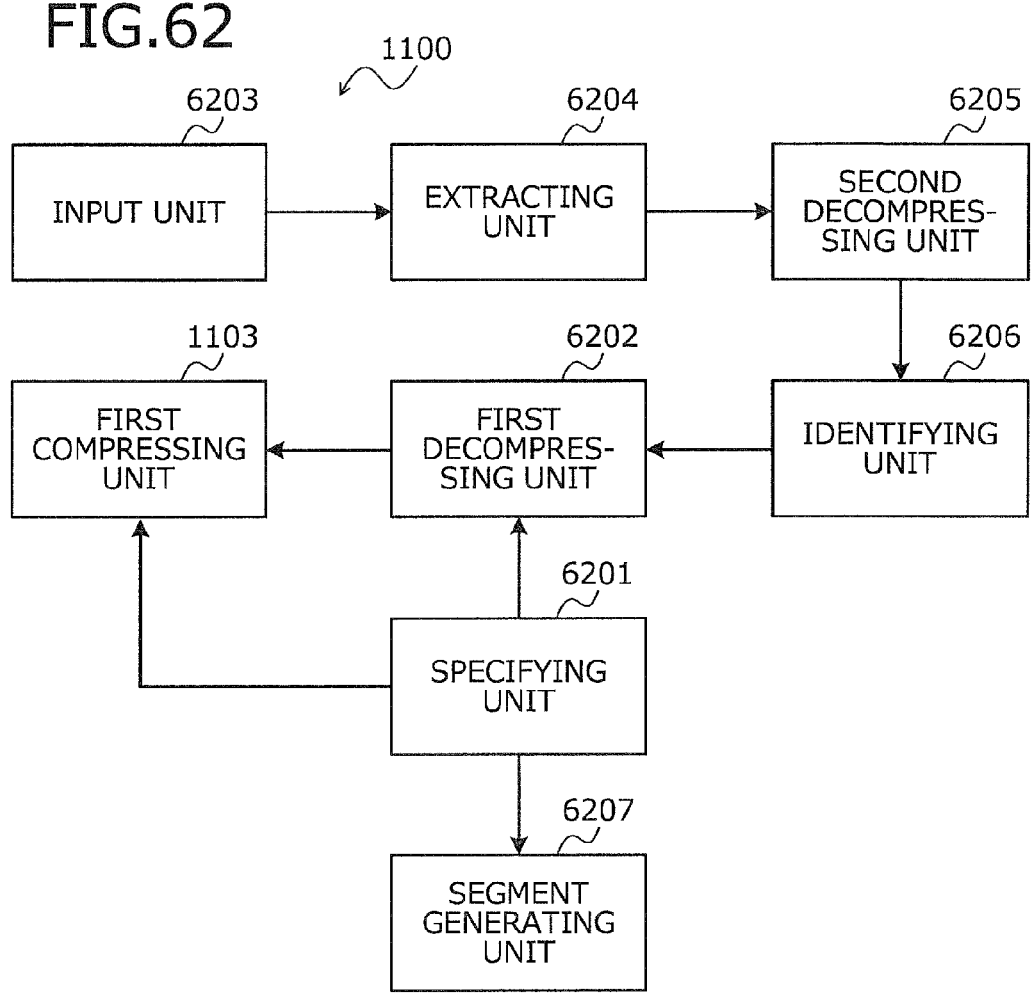
FIG. 62 is a block diagram of a second functional configuration example of a computer or a computer system according to the embodiment.

FIG. 62 is a block diagram of a second functional configuration example of a computer or a computer system according to the embodiment. In FIG. 62, the computer 1100 includes a specifying unit 6201, a first decompressing unit 6202, the first compressing unit 1103, an input unit 6203, an extracting unit 6204, a second decompressing unit 6205, an identifying unit 6206, and a segment generating unit 6207. For example, the functions of the specifying unit 6201 to the segment generating unit 6207 are implemented by causing the CPU 901 to execute programs stored in a storage device such as the ROM 902, the RAM 903, and the magnetic disk 905 depicted in FIG. 9. Each of the specifying unit 6201 to the segment generating unit 6207 writes an execution result into the storage device and reads an execution result of another unit to perform calculations. The specifying unit 6201 to the segment generating unit 6207 will hereinafter briefly be described.

The specifying unit 6201 accepts open specification of any object file in the object file group Fs. For example, an operation of the keyboard, the mouse, or the touch panel by a user causes the specifying unit 6201 to accept the open specification of the object file Fi. If the open specification is accepted, a pointer to a compression file fi correlated with the file number i of the open-specified object file Fi is specified in the compression code map Ms. As a result, the compression file fi of the open-specified object file Fi stored at the pointed address is read.

If the specification by the specifying unit 6201 is performed by a master server, a segment is identified that has a segment number identical to a quotient acquired by dividing the file number i of the specified object file Fi by the segment number K of the zero-th layer. As a result, the compression file fi can be specified from the identified segment.

The specifying unit 6201 accepts addition specification of an object file Fi. For example, an operation of the keyboard, the mouse, or the touch panel by a user causes the specifying unit 6201 to accept the addition specification of the object file Fi. If the addition specification is accepted, the addition-specified object file Fi is compressed by the first compressing unit 1103 with the $2^N$-branch nodeless Huffman tree H and saved as the compression file fi in the last segment of the zero-th layer.

The specifying unit 6201 accepts integration specification of a segment. For example, an operation of the keyboard, the mouse, or the touch panel by a user causes the specifying unit 6201 to accept the integration specification of a segment. The integration specification of a segment may be accepted at a predetermined time or on a predetermined time basis by using a timer.

The first decompressing unit 6202 decompresses the compression file fi of the object file Fi with the $2^N$-branch nodeless Huffman tree H. For example, the first decompressing unit 6202 decompresses the compression file fi of the object file Fi open-specified by the specifying unit 6201 with the $2^N$-branch nodeless Huffman tree H. The first decompressing unit 6202 also decompresses the object file Fi identified by the identifying unit 6206 described later with the $2^N$-branch nodeless Huffman tree H. A specific example of decompression will be described later.

The input unit 6203 accepts input of a search character string. For example, an operation of the keyboard, the mouse, or the touch panel by a user causes the input unit 6203 to accept the input of a search character string. The input unit 6203 also accepts the input of a search character string when receiving the search character string from a client apparatus via a network.

The extracting unit 6204 extracts a compression code of character data in the search character string input by the input unit 6203 from the $2^N$-branch nodeless Huffman tree H. For example, the extracting unit 6204 extracts corresponding character data out of specific single characters, upper divided character codes, lower divided character codes, bi-gram character strings, and basic words from the search character string.

For example, if the search character string is "人影", specific single characters "人" and "影" and a bi-gram character string "人影" are extracted. The extracting unit 6204 can identify the compression codes of the extracted character data with the $2^N$-branch nodeless Huffman tree H and point corresponding appearance maps of the compression code map Ms. For example, the compressed appearance map of the specific single character "人", the compressed appearance map of "影", and the compressed appearance map of the bi-gram character string "人影" are can be pointed to.

In the computer system depicted in FIG. 7, the master server MS extracts character data with the extracting unit 6204 and acquires the compression codes of the extracted character data with the $2^N$-branch nodeless Huffman tree H. The acquired compression codes are pointers to appearance maps and therefore are transmitted to the slave servers S1, S2, . . . .

The second decompressing unit 6205 decompresses the compressed appearance maps extracted by the extracting unit 6204. For example, since the appearance rate area can be identified from the appearance rate of the character data, the second decompressing unit 6205 decompresses the compression area of the compressed appearance map with the Huffman tree for a map corresponding to the identified appearance rate area. In the above example, the compressed appearance map of the specific single character "人", the compressed appearance map of "影", and the compressed appearance map of the bi-gram character string "人影" are decompressed in all the archive files (see FIG. 7).

In the computer system depicted in FIG. 7, the decompression process by the second decompressing unit 6205 is executed in the master server MS and each of the slave servers S1, S2, . . . .

The identifying unit 6206 performs the AND operation of the appearance map group and the deletion map D after the decompression by the second decompressing unit 6205 to identify a compression file of the object file including the character data in the search character string out of the compression file group. In the above example, the identifying unit 6206 performs the AND operation of the compressed appearance map of the specific single character "入", the compressed appearance map of "形", the compressed appearance map of the bi-gram character string "入形", and the deletion map D.

This AND operation is performed from the segment on the highest-level layer as depicted in FIG. 8 to finally narrow down the segments on the zero-th layer and an AND operation is performed for the narrowed-down segments on the zero-th layer. The compressed appearance map of the bi-gram character string " 入形 " is not depicted for simplicity in FIG. 8.

In the computer system depicted in FIG. 7, the master server MS narrows down the segments on the first layer from the highest-level layer with the identifying unit 6206 and transmits the file numbers of the object files including the search character string to the slave servers managing the file numbers. The slave servers receiving the file numbers perform the AND operation of the appearance maps and the deletion map through the identifying process by the identifying unit 6206 to narrow down the compression files.

As a result, (the compression files f3 and f19 of) the file numbers 3 and 19 are identified as depicted in FIG. 8. The first decompressing unit 6202 decompresses the compression files identified by the identifying unit 6206 (the compression files f3 and f19 in the example) with the $2^N$-branch nodeless Huffman tree H.

The compression files narrowed down by the slave servers are subsequently transmitted to the master server MS. The master server MS decompresses the compression files from the slave servers by the first decompressing unit 6202 with the $2^N$-branch nodeless Huffman tree H. The decompressed files (F3 and F19 in the example) are displayed on a displaying apparatus such as a display. If the search character string is accepted from a client apparatus, the master server MS transmits the decompressed object files (F3 and F19 in the example) as a search result to the client apparatus. If no compression file is identified by the identifying unit 6206, a search result is returned to indicate that no compression file is identified.

When addition specification of an object file is accepted, the segment generating unit 6207 determines whether the current total file number α is a multiple of the file number n per segment. If α is a multiple of n, the last segment has no free space for saving a compression file of the addition-specified object file and therefore, the segment generating unit 6207 newly generates a segment on the zero-th layer. When the segment is newly generated, correlation is achieved between the management areas as depicted in FIGS. 1 and 6. Compression files added to the new segment is then sequentially stored.

If the computer implementing the segment generating unit 6207 is the master server MS, the master server MS transmits an instruction for generating a new segment on the zero-th layer to the slave server having the last segment. If the slave server retaining the last segment has no free space for retaining a new segment, the master server MS transmits an instruction for generating a new segment on the zero-th layer to another slave server. If the new segment is generated, the master server MS sequentially transmits the added compression files. As a result, the added compression files are sequentially stored in the new segment.

The segment generating unit 6207 merges the appearance maps and the deletion maps. For example, as depicted in FIG. 4, the segment generating unit 6207 integrates each appearance map into a higher-level layer. As depicted in FIG. 4, the segment generating unit 6207 correlates the management area of the segment (e.g., the segment sg1(1)) on the higher-level layer that is the integration destination with the management areas of the segments (e.g., the segments sg0(1) to sg0(m)) on the lower-level layer that is the integration source. This integration process is also executed for the deletion maps in the same way.

<File Decompression Example>

Figure 63:
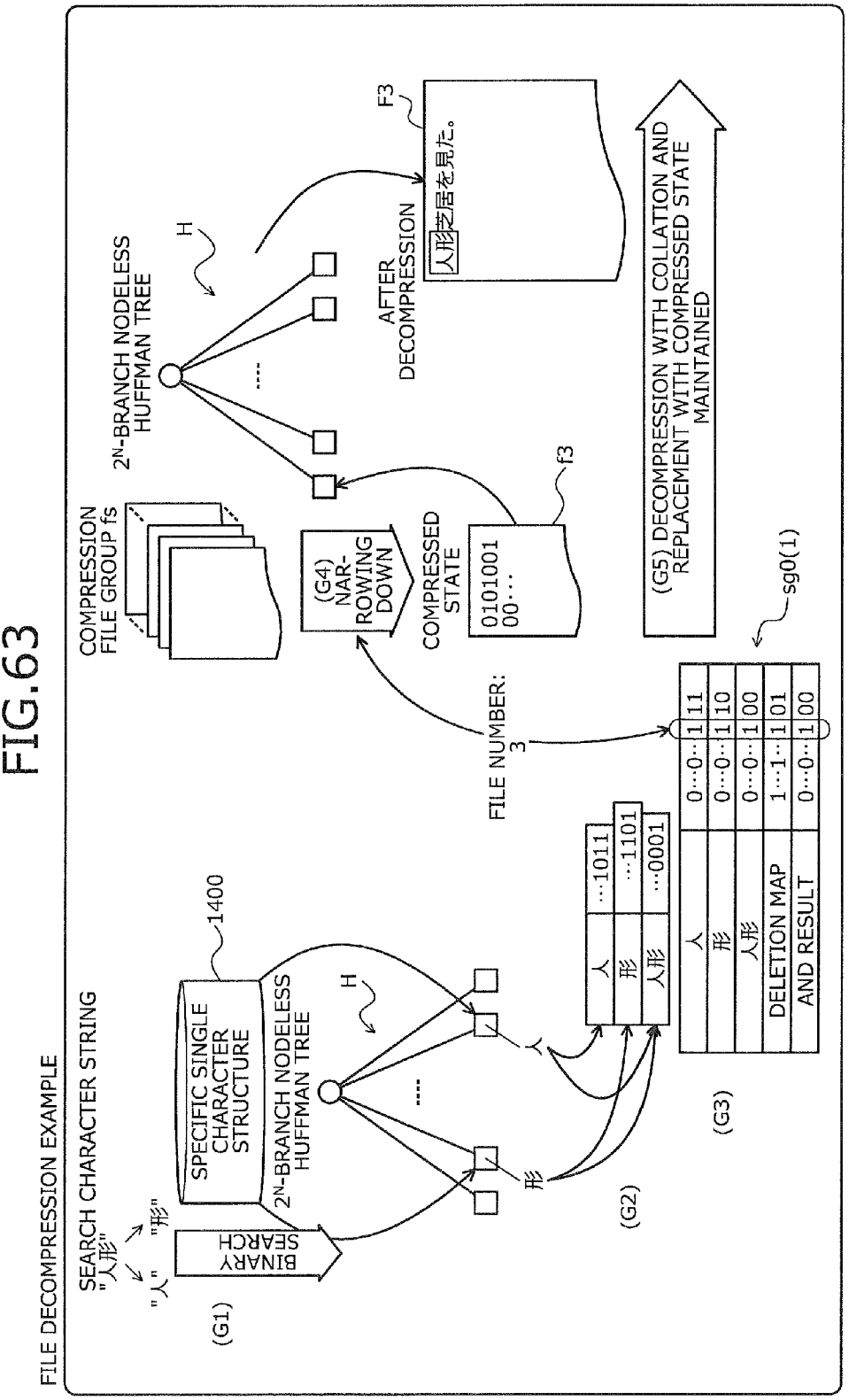
FIG. 63 is an explanatory view of a file decompression example.

FIG. 63 is an explanatory view of a file decompression example. A process described in the file decompression example is executed by the input unit 6203, the extracting unit 6204, the second decompressing unit 6205, the identifying unit 6206, and the first decompressing unit 6202.

(G1) First, if the input unit 6203 inputs a search character string "入形", binary search of the specific single character structure 2100 is performed for the characters "入" and "形" making up the search character string "入形" to find the specific single characters "入" and "形". The specific single character structure 2100 is correlated with the pointers to the leaves (specific single characters) of the $2^N$-branch nodeless Huffman tree H. Therefore, if a hit is made in the specific single character structure, a leaf of the $2^N$-branch nodeless Huffman tree H can directly be specified.

(G2) When a leaf of the $2^N$-branch nodeless Huffman tree H is directly specified, the collation flag in the structure of the corresponding leaf is set to ON and a compression code is extracted. The compression code acts as a pointer to an appearance map of a specific single character and therefore enables direct specification. In this example, the compression codes of the specific single characters "入" and "形" are extracted and therefore, the appearance map of "入" and the appearance map of "形" are extracted. The concatenated compression code acquired by concatenating the compression code of "入" and the compression code of "形" acts as a pointer to the appearance map of the bi-gram character string and therefore enables direct specification. Thus, the appearance map of the bi-gram character string "入形" is extracted.

(G3) The three extracted appearance maps are decompressed with a Huffman tree for a map. As depicted in FIG. 8, the identifying unit 6206 then performs the narrowing-down from the segment on the highest-level layer, and the AND operation is performed in the segment sg0(1) with the decompressed appearance maps and the deletion map to acquire an AND result.

(G4) Since the file number 3 is set to ON in the AND result of the segment sg0(1), it is found that the search character string "入形" is present in the object file F3. Therefore, the compression file f3 is extracted from the compression file group fs. As a result, the compression file to be decompressed is narrowed down and unnecessary decompression processes can be reduced.

(G5) Lastly, the extracted compression file f3 is collated and decompressed while the compressed state is maintained, thereby opening the decompressed object file F3. Since the collation flag is set to ON in the structures of leaves of the "入" and "形", when "入" and "形" are decompressed, the decompression is performed with a character string replaced for highlighting. For example, "入" and "形" having the collation flag set to ON are decompressed and interposed between <B> and </B> tags so as to be displayed in bold. A character having the collation flag set to OFF is not interposed between the <B> and </B> tags and is directly decompressed.

<Specific Example of Decompression Process>

A specific example of the decompression process of FIG. 63 will be described. In the example of this description, the compression code string of the search character string "人形" is used to decompress the compression file fi while performing the collation. By way of example, the compression code of the specific single character "人" is "1100010011" (10 bits) and the compression code of the specific single character "形" is "0100010010" (10 bits).

In the decompression process, the compression code string is set in a register and a compression code is extracted through a mask pattern. The extracted compression code is searched from the root of the $2^N$-branch nodeless Huffman tree H by one pass (access through one branch). A character code stored in the accessed structure of the leaf L# is read and stored in the decompression buffer.

To extract the compression code, the mask position of the mask pattern is offset. The initial value of the mask pattern is set to "0xFFF00000". This mask pattern is a bit string having the head 12 bits of "1" and the subsequent 20 bits of "0".

Figure 64:
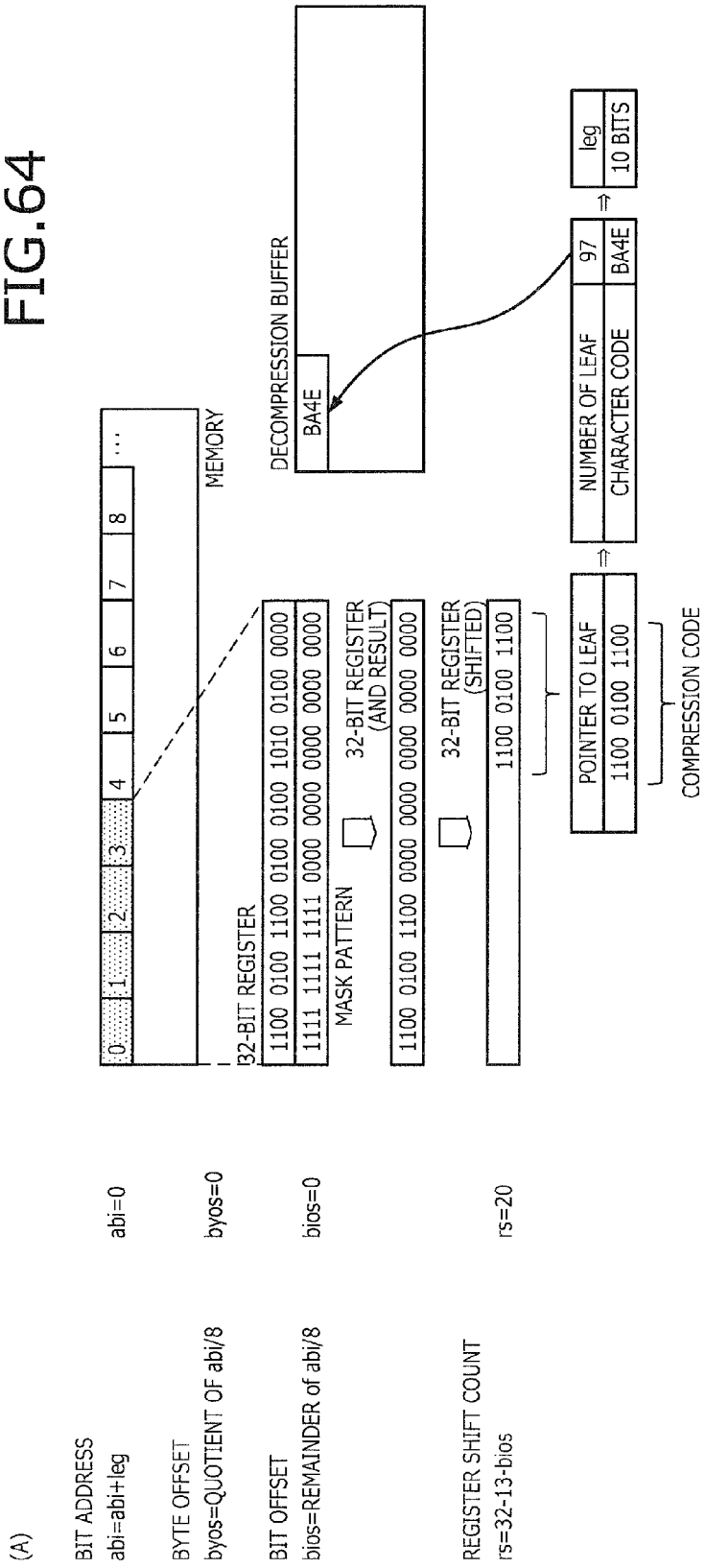
FIG. 64 is an explanatory view of a specific example of a decompression process depicted in FIG. 63.
Figure 65:
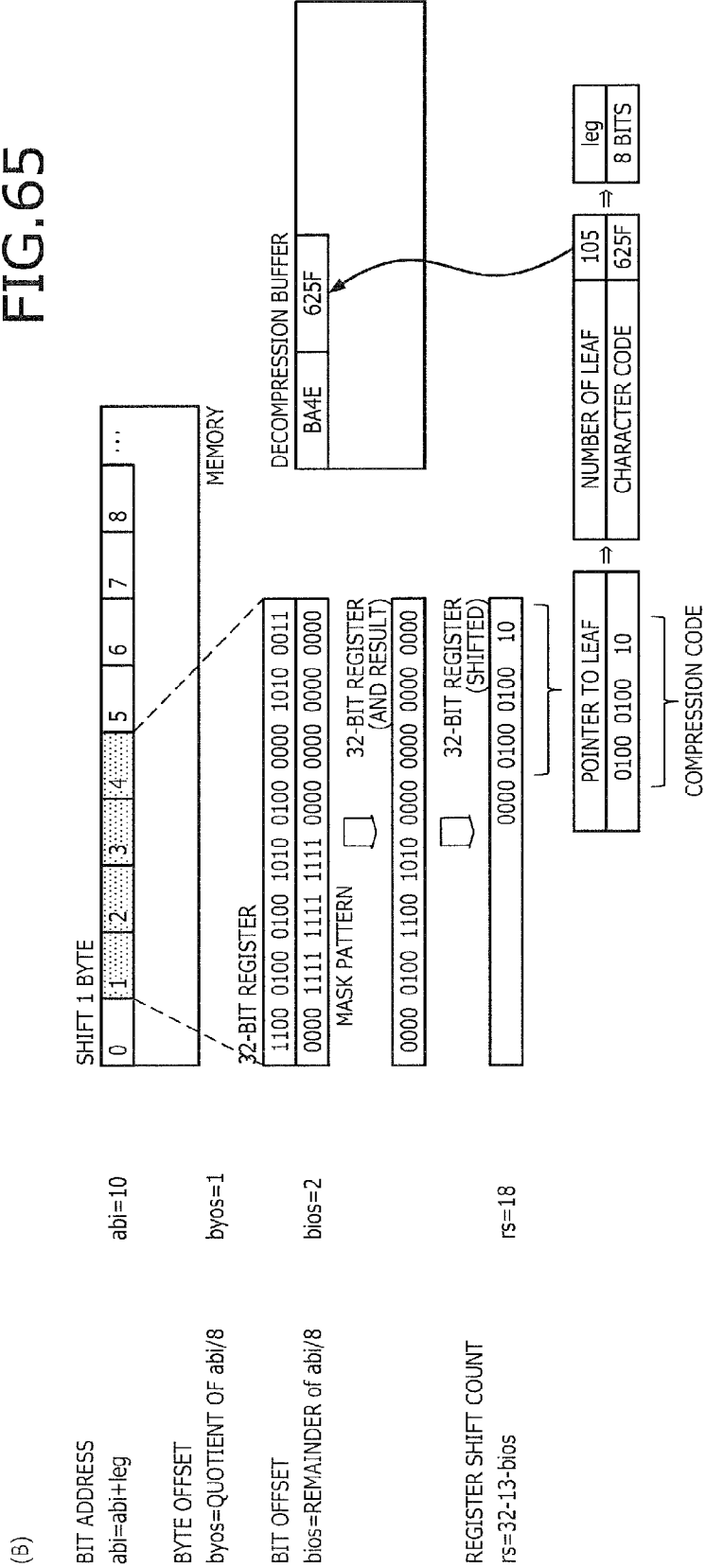
FIG. 65 is an explanatory view of a specific example of the decompression process depicted in FIG. 63.

FIGS. 64 and 65 are explanatory views of specific examples of the decompression process of FIG. 63. FIG. 64 depicts a decompression example (A) for the specific single character "人". In FIG. 64, the CPU calculates a bit address abi, a byte offset byos, and a bit offset bios. The bit address abi is a value indicative of a bit position of the extracted compression code and the current bit address abi is a value obtained by adding a compression code length leg of the previously extracted compression code to the pervious bit address abi. In the initial state, the bit address abi is set to abi=0.

The byte offset byos is a value indicative of a byte boundary of the compression code string retained in a memory and is obtained as a quotient of the bit address abi/8. For example, in the case of the byte offset byos=0, the compression code string from the start stored in the memory is set in the register and, in the case of the byte offset byos=1, the compression code string from the first byte stored in the memory is set in the register.

The bit offset bios is a value of offsetting the mask position ("FFF") of the mask pattern and is a remainder of the bit address abi/8. For example, in the case of the bit offset bios=0, the mask position is not shifted, resulting in the mask pattern of "0xFFF00000". On the other hand, in the case of the bit offset bios=4, the mask position is shifted by 4 bits toward the end, resulting in the mask pattern of "0x0FFF0000".

A register shift count rs is the number of bits by which the compression code string in the register is shifted toward the end after the AND operation with the mask pattern, and is obtained from rs=32−12−bios. As a result of this shift, a bit string of the ending m bits in the register after the shift is extracted as an object bit string. After the object bit string is extracted, the register is cleared.

A block in the memory indicates a one-byte bit string and a numerical character inside indicates a byte position that is a byte boundary. In FIG. 64, the bit address abi=0 leads to the byte offset byos=0 and the bit offset bios=0. Because of the byte offset byos=0, a compression code string of four bytes (shaded in FIG. 64) from the start of the compression code string retained in the memory is set in the register.

Because of the bit offset bios=0, the mask pattern is "0xFFF00000". Therefore, an AND result is acquired from the logical product (AND) operation of the compression code string set in the register and the mask pattern "0xFFF00000".

Because of the bit offset bios=0, the register shift count rs is rs=32−m−bios=32−12−0=20. Therefore, the AND result in the register is shifted by 20 bits toward the end. Due to this shift, "110001001100" is left in the register and therefore, the ending 12 bits are extracted as the object bit string. In this case, "110001001100" is extracted as the object bit string. After the extraction, the register is cleared.

Since the root structure of the $2^N$-branch nodeless Huffman tree H includes the extracted object bit string "110001001100", the pointer (branch number) to the leaf L# coincident with this object bit string is searched. In this case, since one of the pointers to a leaf L97 is coincident, the corresponding pointer to the leaf L97 is read to access the structure of the leaf L97.

Since the structure of the leaf L97 stores a character code "0xBA4E", this character code "0xBA4E" is extracted and stored in the decompression buffer. Since the collation flag is set to ON in the case, the character code "0xBA4E" is interposed and stored between the <B> and </B> tags.

Since the structure of the leaf L97 also stores the compression code length leg (=10 bits) of the character code "0xBA4E", the compression code length leg of the character code "0xBA4E" is extracted. The bit address abi is updated with this extracted compression code length leg. In this case, the updated bit address abi is abi=0+10=10.

FIG. 65 depicts an example (B) of decompressing the specific single character "形". For example, if the register is shifted by the byte offset bios from the state (A) of FIG. 64, since the bit address abi of (A) at the previous time is abi=0 and the compression code length leg is 10 bits, the bit address abi of (B) is abi=10 bits.

This bit address abi=10 leads to the byte offset byos=1 and the bit offset bios=2. Because of the byte offset byos=1, a compression code string of four bytes (shaded in FIG. 65) from the first byte of the compression code string retained in the memory is set in the register.

Because of the bit offset bios=2, the mask pattern is "0x3FFC0000". Therefore, an AND result is acquired from the logical product (AND) operation of the compression code string set in the register and the mask pattern "0x3FFC0000".

Because of the bit offset bios=2, the register shift count rs is rs=32−m−bios=32−12−2=18. Therefore, the AND result in the register is shifted by 18 bits toward the end. Due to this shift, "00000100010010" is left in the register and therefore, the ending 10 bits are extracted as the object bit string. In this case, "0100010010" is extracted as the object bit string. After the extraction, the register is cleared.

Since the root structure of the $2^N$-branch nodeless Huffman tree H includes the extracted object bit string "0100010010", the pointer (branch number) to the leaf L# coincident with this object bit string is searched. In this case, since one of the pointers to a leaf L105 is coincident, the corresponding pointer to the leaf L105 is read to access the structure of the leaf L24.

Since the structure of the leaf L105 stores a character code "0x625F", this character code "0x625F" is extracted and stored in the decompression buffer. In the case of the file decompression example (G1), the character code is directly stored in the decompression buffer and, in the case of the file decompression example (G2), the character code "0x625F" is interposed and stored between the <B> and </B> tags because of the collation flag set to ON. Since the structure of the leaf L105 also stores the compression code length leg (=8 bits) of the character code "0x625F", the compression code length leg of the character code "0x625F" is extracted. The bit address abi is updated with this extracted compression code length leg. In this case, the updated bit address abi is abi=10+8=18. By performing the decompression in this way, the object file is opened.

<Specific Example of File Addition Example>

A specific example of a file addition process will be described. In this case, the segment generating unit 6207 adds an addition object, which is an object file F(n+1), and updates the compression code map Ms without decompressing the compressed compression code map Ms.

Figure 66:
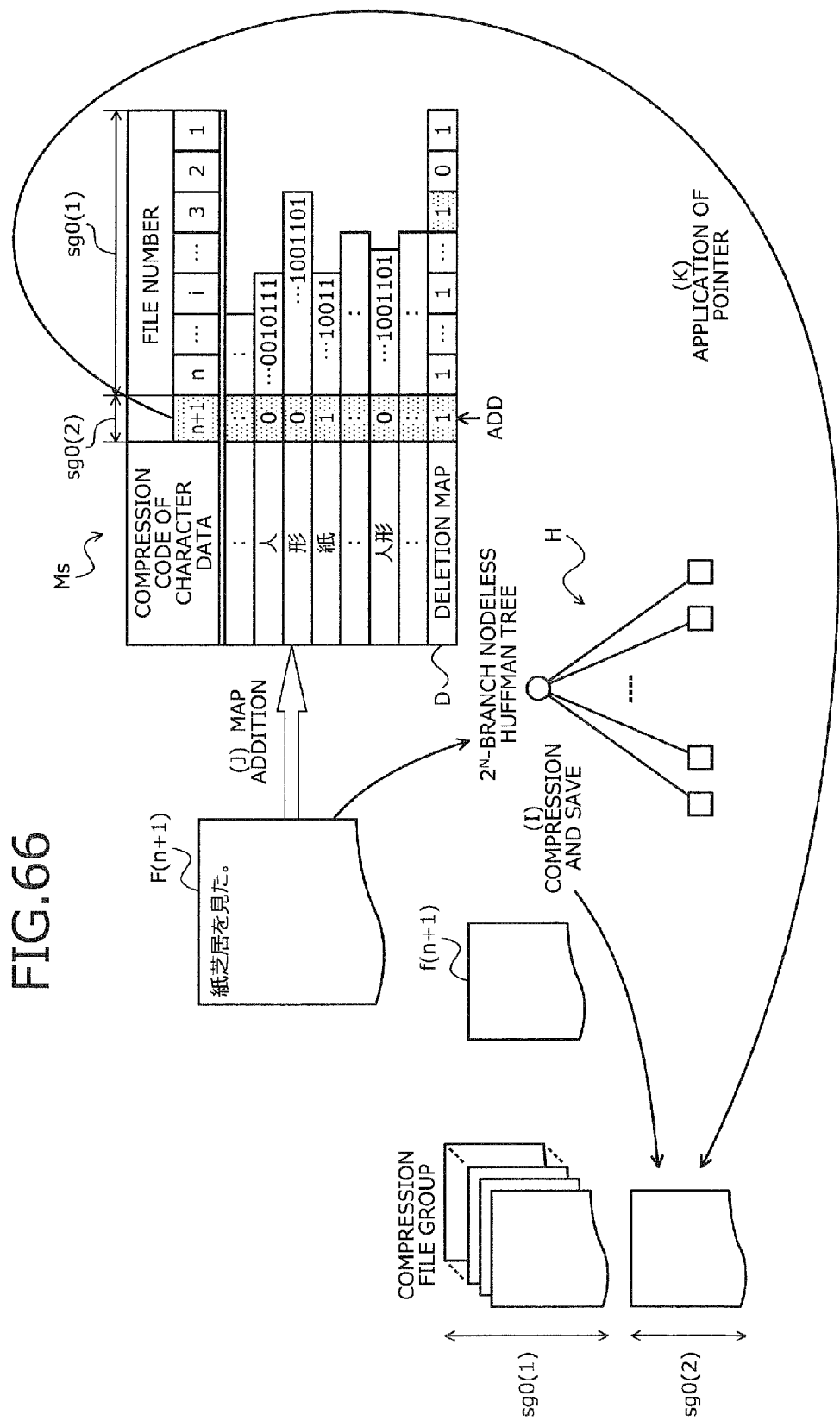
FIG. 66 is an explanatory view of a specific example of a file addition process.

FIG. 66 is an explanatory view of a specific example of the file addition process. In FIG. 66, the case of adding the object file F(n+1) will be described as an example. First, it is assumed that the compression file f3 is decompressed from the compression file group fs in the file decompression example of FIG. 63 and that the decompressed object file F3 is written on a main memory (e.g., the RAM 903). It is also assumed that a new save instruction is given after the file is changed to the object file F(n+1). In this case, a newly obtained file number n+1 is assigned to the object file F(n+1) on the main memory. In other words, since the segment sg0(1) has no free space, the segment sg0(2) is set and correlated with the segment sg0(1).

(I) The object file F(n+1) is compressed with the $2^N$-branch nodeless Huffman tree H into a compression file f(n+1), which is saved in the segment sg0(2. (J) The character data of the object file F(n+1) on the main memory is tabulated by the tabulating unit 1101 to enable detection of the presence/absence of the character data. Therefore, a bit of the newly obtained file number n+1 is added to an appearance map of each of character data (and set to OFF by default) and the bit is set to ON when the character data appears. A bit of the file number n+1 is also added to the deletion map D (and set to ON by default).

(K) A pointer is correlated with the compression file f(n+1) in the management area of the segment sg0(2). As a result, when the file number (n+1) is subsequently specified in the segment sg0(2), the compression file f(n+1) can be decompressed to open the object file F(n+1).

Assuming that the total file number is a in the computer system depicted in FIG. 7, in the case of α=file number m×n, the archive file A0(1) is stored only in the slave server S1. If an object file F(m×n+1) is newly added, the master server MS transmits a compression file f(m×n+1) of the object file F(m×n+1) to the slave server S2 that is the assignment destination. It is assumed that which slave server is defined as the assignment destination is determined in advance. The slave server S2 generates a segment sg0(m+1) as a subsequent segment to the segment sg0(m) of the slave server S1 to save the compression file f(m×n+1) from the master server MS.

Figure 67:
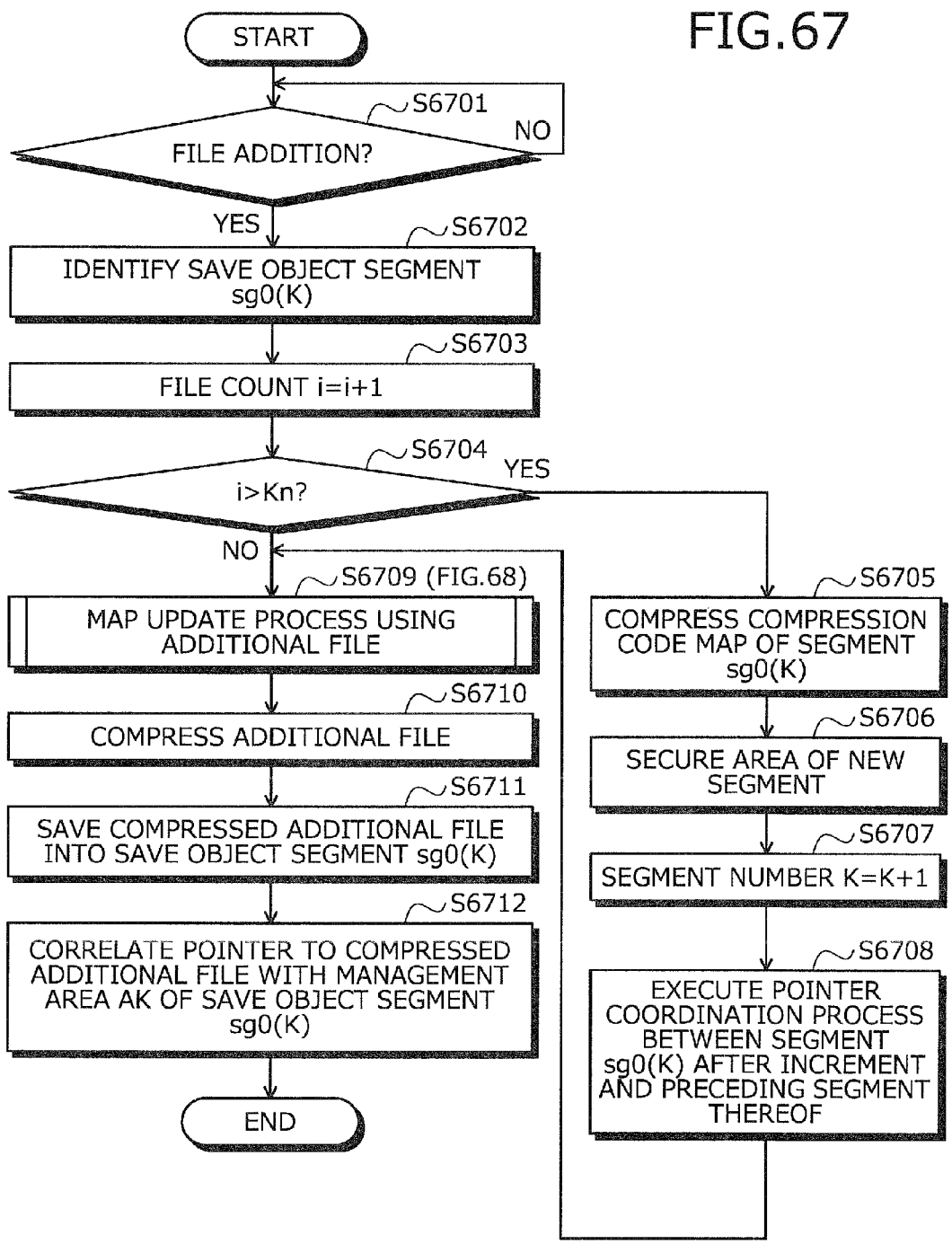
FIG. 67 is a flowchart of a detailed process procedure of a segment addition process.

FIG. 67 is a flowchart of a detailed process procedure of the segment addition process. The computer 1100 waits until the specifying unit 6201 specifies file addition (step S6701: NO). If file addition is specified (step S6701: YES), the computer 1100 identifies a save object segment sg0(K) (step S6702). For example, the save object segment sg0(K) is defined as a segment having the same number as the quotient acquired by dividing the file number i by the file number n per segment.

The computer 1100 increments the file count i (step S6703) and determines whether i>K is satisfied (step S6704). If i>K is not satisfied (step S6704: NO), the current segment sg0(K) can save more compression files and therefore, the computer 110 executes a map update process with the additional file (step S6709). Details of the map update process with the additional file (step S6709) will be described later.

The computer 1100 then compresses the additional file with the $2^N$-branch nodeless Huffman tree H (step S6710) and saves the compressed additional file into the save object segment sg0(K) (step S6711). The computer 1100 correlates the pointer to the compressed additional file with a management area AK of the save object segment sg0(K) (step S6712). The termination of the segment addition process is then terminated.

If i>K is satisfied at step S6704 (step S6704: YES), the current segment sg0(K) cannot save the compressed additional file and therefore, the computer 1100 compresses the compression code map of the current segment sg0(K) with the Huffman tree for a map (step S6705). The computer 1100 secures an area of a new segment (step S6706) and increments the segment number K (step S6707). The computer 1100 then executes a pointer coordination process between the segment sg0(K) after the increment and the preceding segment thereof (step S6708). As a result, as depicted in FIG. 1, the correlation with the preceding segment is achieved. The computer 1100 goes to step S6709.

Figure 68:
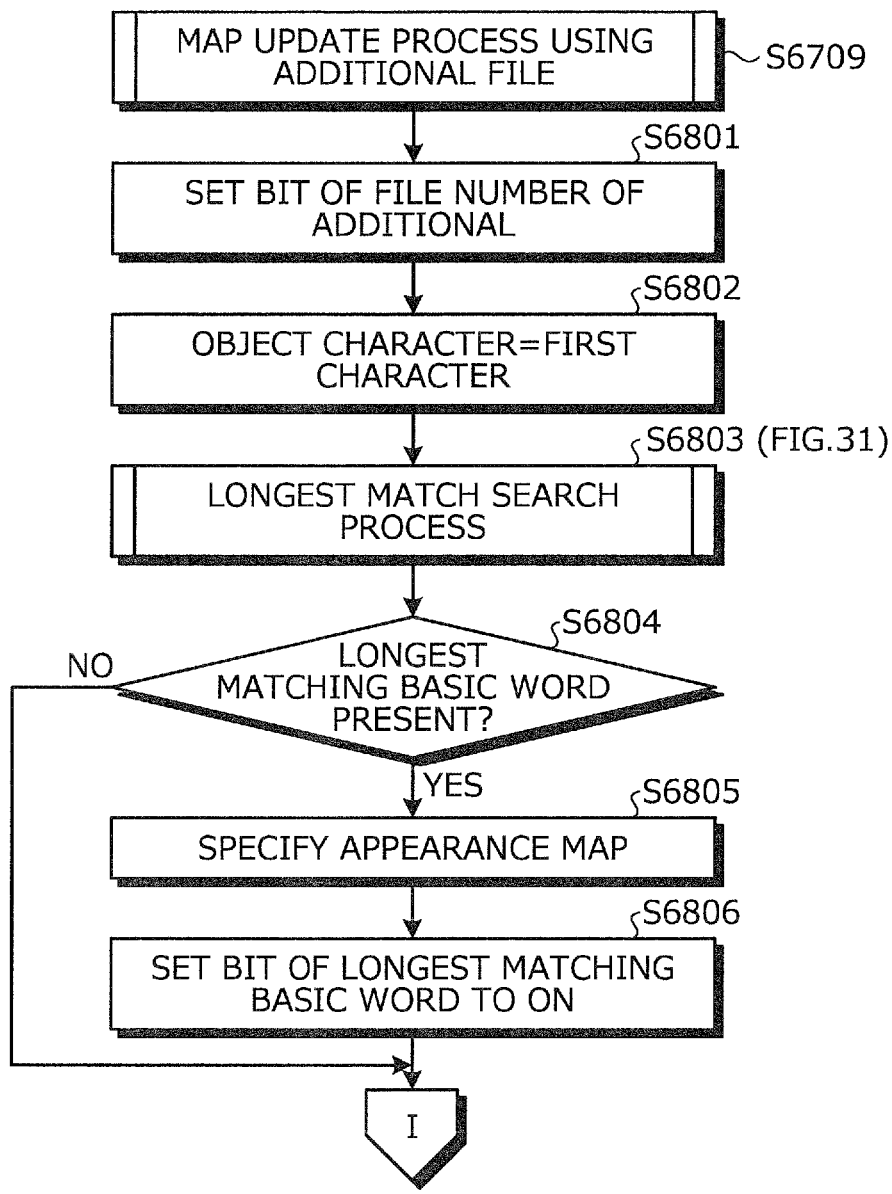
FIG. 68 is a flowchart (first half) of a detailed process procedure of a map update process using an additional file (step S6709) depicted in FIG. 67.

FIG. 68 is a flowchart (first half) of a detailed process procedure of the map update process using an additional file (step S6709) depicted in FIG. 67. First, the computer 1100 sets a bit of the file number of the additional file in the compression code map Ms and the deletion map Ds (step S6801). For example, a bit of OFF is set in the appearance maps for the file number of the additional file and a bit of ON is set in the deletion map D for the file number of the additional file.

The computer 1100 defines the first character in the additional file as the object character (step S6802) and executes a longest match search process for the object character (step S6803). The longest match search process (step S6803) is the same process as the process depicted in FIG. 31 and therefore will not be described.

The computer 1100 determines whether a longest matching basic word is present in the basic word structure 2300 (step S6804). If no longest matching basic word is present (step S6804: NO), the computer 1100 goes to step S6901 of FIG. 69. On the other hand, if a longest matching basic word is present (step S6804: YES), the computer 1100 identifies the compression code of the longest matching basic word from the $2^N$-branch nodeless Huffman tree H and specifies the appearance map of the longest matching basic word with the compression code (step S6805). The computer 1100 sets the bit corresponding to the file number of the additional file to ON in the specified appearance map (step S6806). The computer 1100 then goes to step S6901 of FIG. 69.

Figure 69:
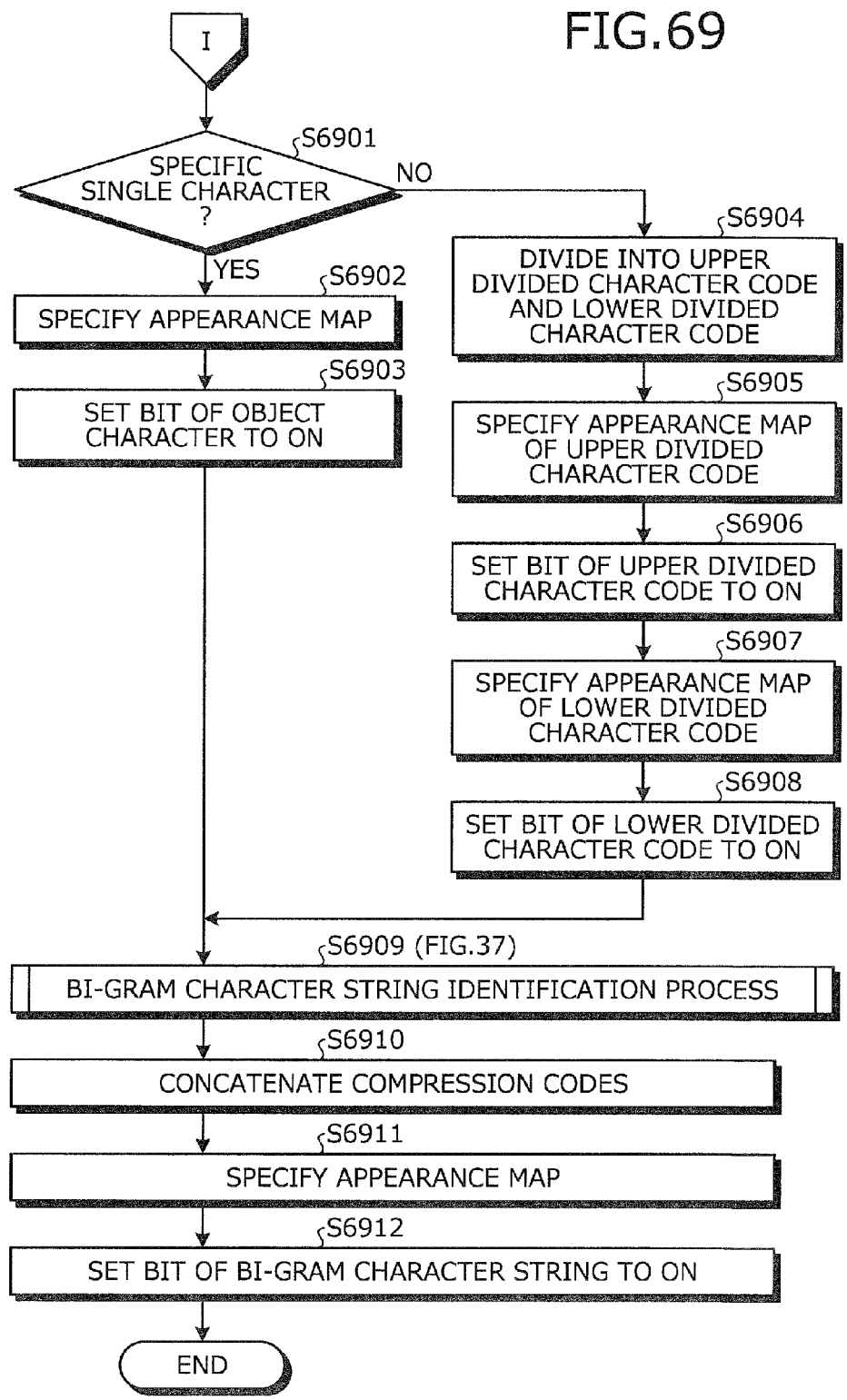
FIG. 69 is a flowchart (second half) of the detailed process procedure of the map update process using an additional file (step S6709) depicted in FIG. 67.

FIG. 69 is a flowchart (second half) of a detailed process procedure of the map update process using an additional file (step S6709) depicted in FIG. 67. First, the computer 1100 determines whether the object character is a specific single character (step S6901). For example, the computer 1100 determines whether the object character is hit in the specific single character structure.

If the object character is a specific single character (step S6901: YES), the computer 1100 identifies the compression code of the hit specific single character from the $2^N$-branch nodeless Huffman tree H and specifies the appearance map of the hit specific single character with the compression code (step S6902). The computer 1100 sets the bit corresponding to the file number of the additional file to ON in the specified appearance map (step S6903). The computer 1100 then goes to step S6909.

On the other hand, if the object character is not a specific single character (step S6901: NO), the computer 1100 divides the object character into an upper divided character code and a lower divided character code (step S6904). The computer 1100 identifies the compression code of the upper divided character code hit in the divided character code structure from the $2^N$-branch nodeless Huffman tree H and specifies the appearance map of the hit upper divided character code with the compression code (step S6905). The computer 1100 sets the bit corresponding to the file number of the additional file to ON in the specified appearance map (step S6906).

Similarly, the computer 1100 identifies the compression code of the lower divided character code hit in the divided character code structure from the $2^N$-branch nodeless Huffman tree H and specifies the appearance map of the hit lower divided character code with the compression code (step S6907). The computer 1100 sets the bit corresponding to the file number of the additional file to ON in the specified appearance map (step S6908). The computer 1100 then goes to step S6909.

At step S6909, the computer 1100 executes a bi-gram character string identification process (step S6909). The bi-gram character string identification process (step S6909) is the same process contents as the process depicted in FIG. 37 and therefore will not be described.

The computer 1100 then concatenates the compression code of the head gram character (e.g., " 入 ") and the compression code of the ending gram character (e.g., " 秘 ") of the bi-gram character string (e.g., " 入秘 ") (step S6910). The computer 1100 uses the concatenated compression code to specify the appearance map of the bi-gram character string (step S6911). The computer 1100 sets the bit corresponding to the file number of the additional file to ON in the specified appearance map (step S6912) and terminates a sequence of process.

<Segment Hierarchy Process>

A segment hierarchy process will be described. The segment hierarchy process is a process of integrating index information of segments on a lower-level layer into index information on a higher-level layer. The segment hierarchy process is executed by the segment generating unit 6207.

Figure 70:
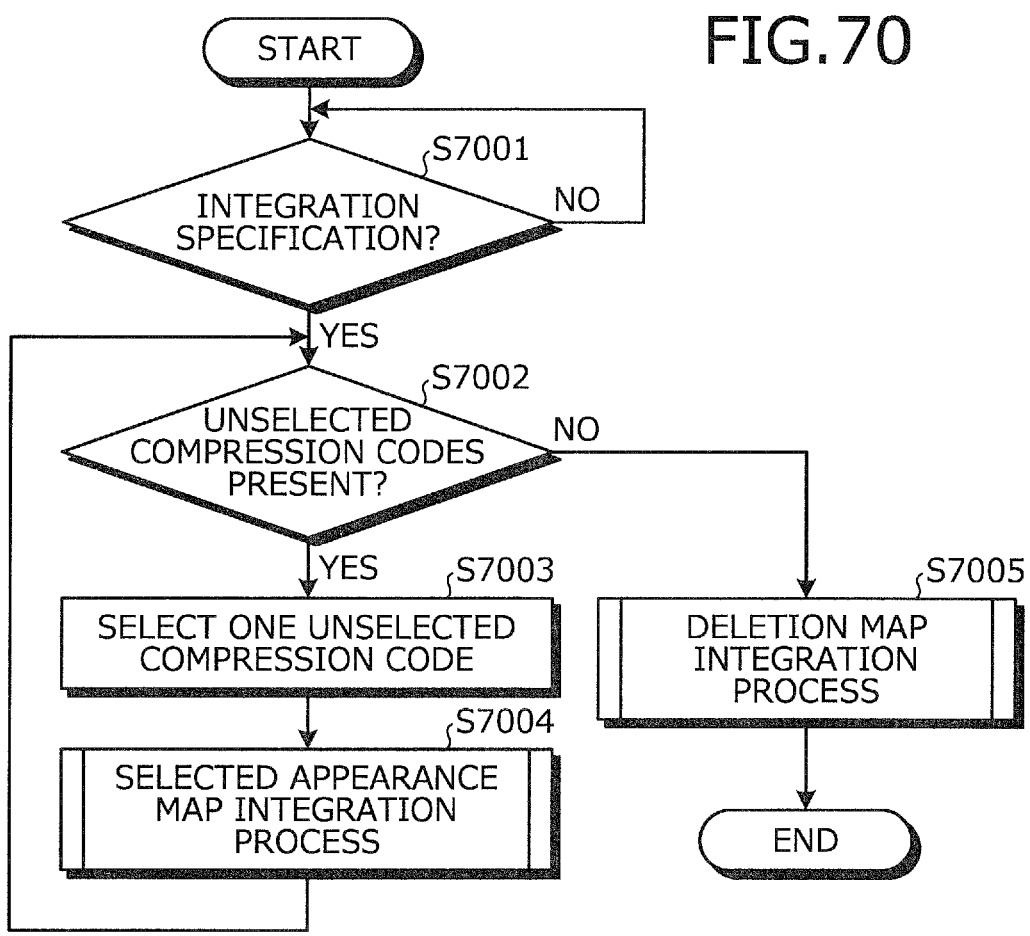
FIG. 70 is a flowchart of a detailed process procedure of a segment hierarchy process.

FIG. 70 is a flowchart of a detailed process procedure of the segment hierarchy process. In FIG. 70, the computer 1100 uses the specifying unit to wait for integration specification for a segment (step S7001: NO). If integration specification is accepted (step S7001: YES), the computer 1100 sequentially selects compression codes that are pointers specifying appearance maps (step S7002). For example, if an unselected compression code is present (step S7002: YES), the computer 1100 selects one unselected compression code (step S7003) and executes a selected appearance map integration process (step S7004). Details of the selected appearance map integration process (step S7004) will be described later.

After the selected appearance map integration process (step S7004), the computer 1100 returns to step S7002. In no unselected compression code is present (step S7002: NO), the computer 1100 executes a deletion map integration process (step S7005). Details of the deletion map integration process (step S7005) will be described later. The segment hierarchy process is then terminated.

Figure 71:
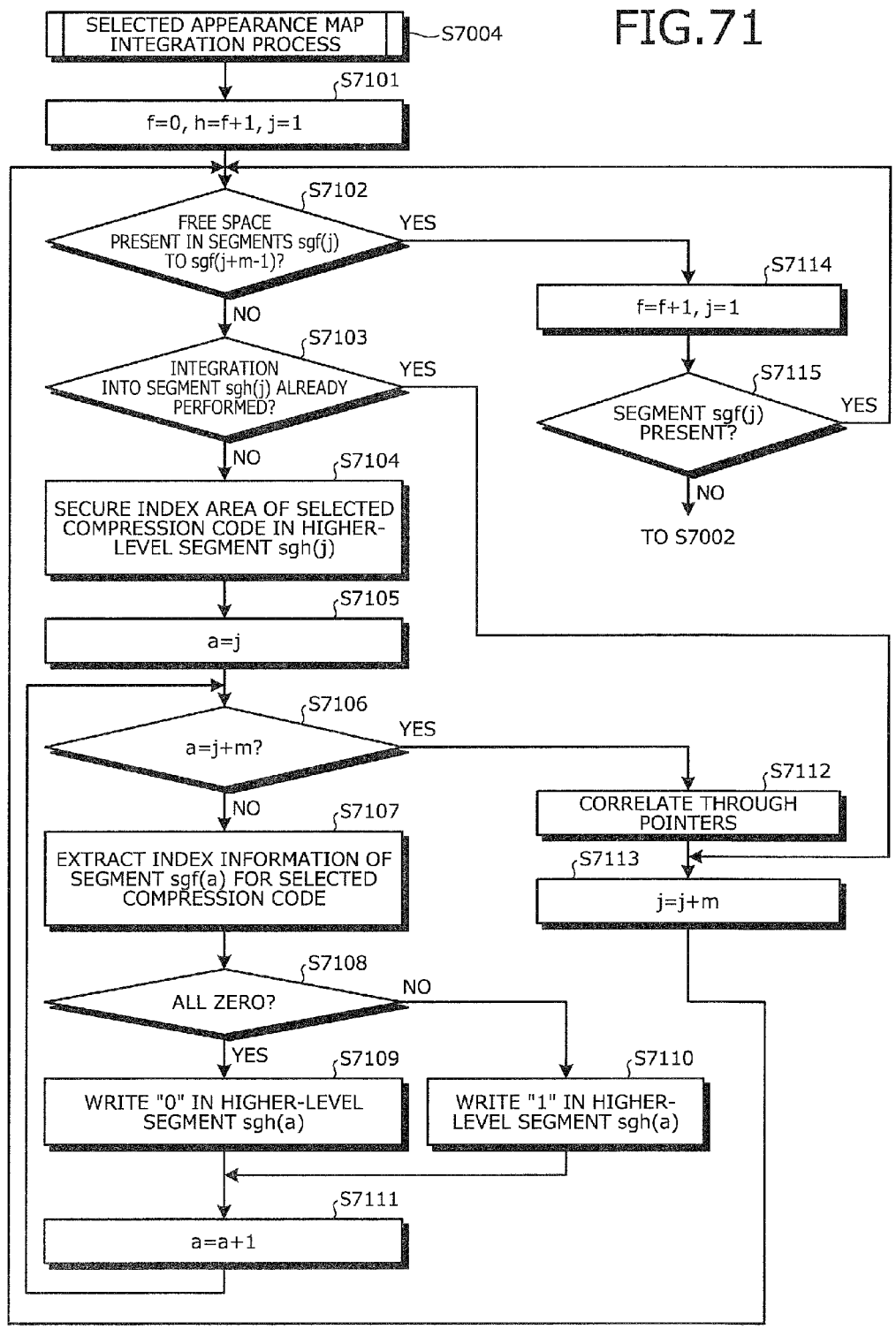
FIG. 71 is a flowchart of a detailed process procedure of a selected appearance map integration process (step S7004) depicted in FIG. 70.

FIG. 71 is a flowchart of a detailed process procedure of the selected appearance map integration process (step S7004) depicted in FIG. 70. First, the computer 1100 sets f=0, h=f+1, and j=1 (step S7101). In this case, f is an object layer number; h is a layer number of a higher-level layer of the object layer; and j is a segment number. The computer 1100 determines whether a free space for a compression file is present in segments sgf(j) to sgf(j+m−1) on a f-th layer that is the object layer (step S7102). In this case, m is the number of segments that can be integrated.

If no free space is present (step S7102: NO), the compression files are stored to the maximum in each of the segments sgf(j) to sgf(j+m−1) on the f-th layer and therefore, the computer 1100 determines whether integration is already performed into a segment sgh(j) on a h-th layer that is the higher-level layer (step S7103). For example, the computer 1100 determines whether the segment sgh(j) on the h-th layer is present.

If integration is not already performed (step S7103: NO), the computer 1100 sets the higher-level segment sgh(j) and secures an index area of a selected compression code in the higher-level segment sgh(j) (step S7104). The computer sets a=j (step S7105). In this case, a is a variable identifying the object segment sgh(j).

The computer 1100 determines whether a=j+m is satisfied (step S7106). If a=j+m is not satisfied (step S7106: NO), the integration process is not completed for all the segments sgf(j) to sgf(j+m−1) on the f-th layer. Therefore, the computer 1100 extracts index information of a segment sgf(a) for the selected compression code (step S7107).

The computer 1100 determines whether the bit string of the extracted index information of the segment sgf(a) is all zero, i.e., the character data for the selected compression code is not present in any of compression files of the segment sgf(a) (step S7108).

If the bit string is all zero (step S7108: YES), the computer 1100 writes "0" as an integration result in the higher-level segment sgh(a) (step S7109) and goes to step S7111. On the other hand, if the bit string is not all zero (step S7108: NO), the computer 1100 writes "1" as an integration result in the higher-level segment sgh(a) (step S7110) and goes to step S7111. At step S7111, the computer 1100 increments "a" (step S7111) and returns to step S7106.

If a=j+m is satisfied at step S7106 (step S7106: YES), the integration process is completed for all the segments sgf(j) to sgf(j+m−1) on the f-th layer. Therefore, the computer 1100 correlates the higher-level segment sgh(j) with the segments sgf(j) to sgf(j+m−1) on the f-th layer through pointers (step S7112). The computer 1100 then sets j=j+m to shift j by m segments (step S7113) and returns to step S7102.

If a free space is present at step S7102 (step S7102: YES), the integration process of the segments sgf(j) to sgf(j+m−1) on the f-th layer cannot be executed and therefore, the computer 1100 sets f=f+1 and j=1 (step S7114). The computer 100 determines whether the segment sgf(j) is present (step S7115). If the segment sgf(j) is present (step S7115: YES), the computer 1100 returns to step S7102. As a result, layers can be increased in a stepwise manner for integration. On the other hand, if the segment sgf(j) is not present (step S7115: NO), the computer 1100 returns to step S7002.

Figure 72:
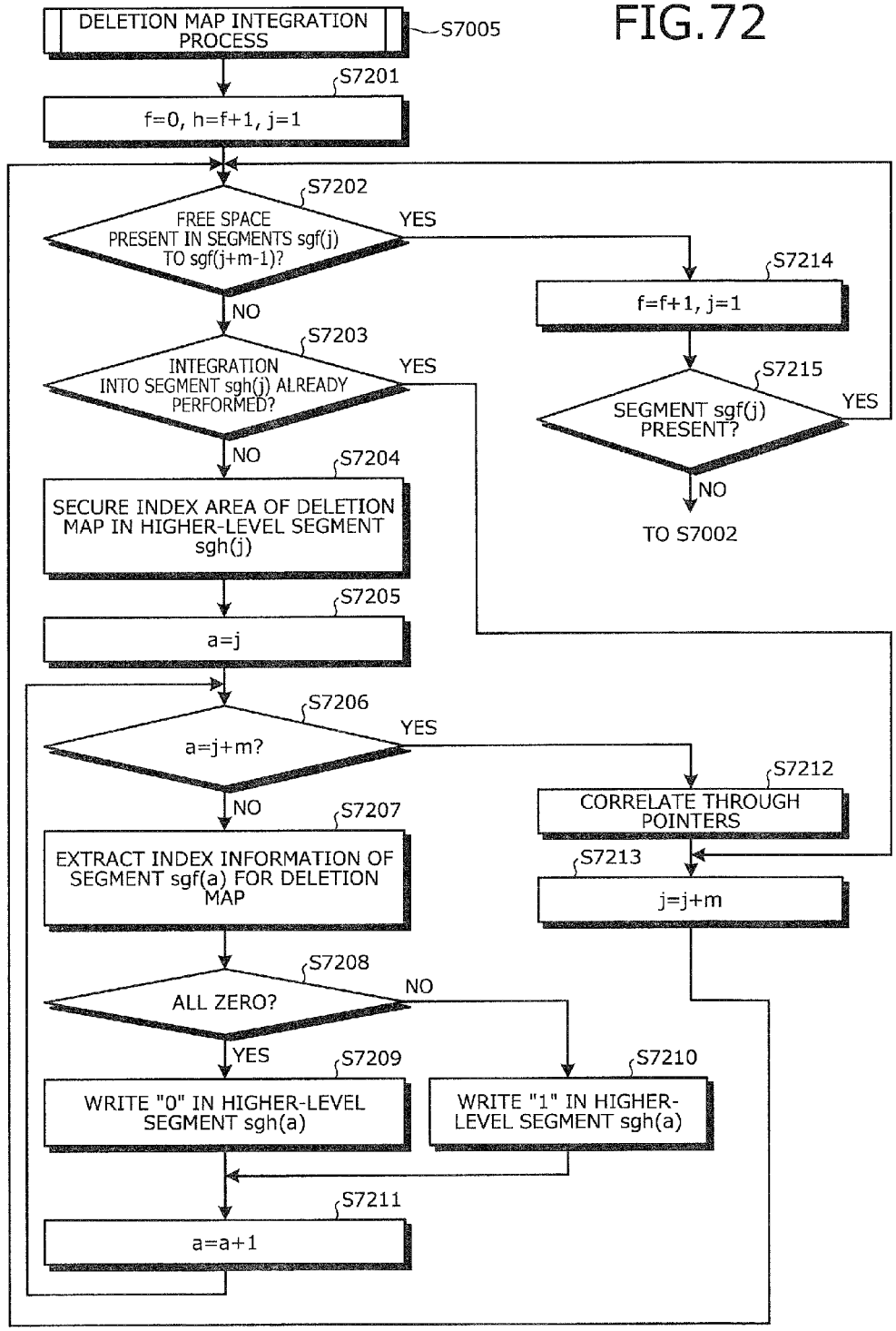
FIG. 72 is a flowchart of a detailed process procedure of a deletion map integration process (step S7005) depicted in FIG. 70.

FIG. 72 is a flowchart of a detailed process procedure of the deletion map integration process (step S7005) depicted in FIG. 70. First, the computer 1100 sets f=0, h=f+1, and j=1 (step S7201). In this case, f is an object layer number; h is a layer number of a higher-level layer of the object layer; and j is a segment number. The computer 1100 determines whether a free space for a compression file is present in the segments sgf(j) to sgf(j+m−1) on the f-th layer that is the object layer (step S7202). In this case, m is the number of segments that can be integrated.

If no free space is present (step S7202: NO), the compression files are stored to the maximum in each of the segments sgf(j) to sgf(j+m−1) on the f-th layer and therefore, the computer 1100 determines whether integration is already performed into the segment sgh(j) on the h-th layer that is the higher-level layer (step S7203). For example, the computer 1100 determines whether the segment sgh(j) on the h-th layer is present.

If integration is not already performed (step S7203: NO), the computer 1100 secures an index area of a deletion map in the higher-level segment sgh(j) (step S7204). The computer sets a=j (step S7205). In this case, a is a variable identifying the object segment sgh(j).

The computer 1100 determines whether a=j+m is satisfied (step S7206). If a=j+m is not satisfied (step S7206: NO), the integration process is not completed for all the segments sgf(j) to sgf(j+m−1) on the f-th layer. Therefore, the computer 1100 extracts index information of the segment sgf(a) for the deletion map (step S7207).

The computer 1100 determines whether the bit string of the extracted index information of the segment sgf(a) is all zero, i.e., the compression files in the segment sgf(a) are deleted (step S7208).

If the bit string is all zero (step S7208: YES), the computer 1100 writes "0" as an integration result in the higher-level segment sgh(a) (step S7209) and goes to step S7211. On the other hand, if the bit string is not all zero (step S7208: NO), the computer 1100 writes "1" as an integration result in the higher-level segment sgh(a) (step S7210) and goes to step S7211. At step S7211, the computer 1100 increments "a" (step S7211) and returns to step S7206.

If a=j+m is satisfied at step S7206 (step S7206: YES), the integration process is completed for all the segments sgf(j) to sgf(j+m−1) on the f-th layer. Therefore, the computer 1100 correlates the higher-level segment sgh(j) with the segments sgf(j) to sgf(j+m−1) on the f-th layer through pointers (step S7212). The computer 1100 then sets j=j+m to shift j by m segments (step S7213) and returns to step S7202.

If a free space is present at step S7202 (step S7202: YES), the integration process of the segments sgf(j) to sgf(j+m−1) on the f-th layer cannot be executed and therefore, the computer 1100 sets f=f+1 and j=1 (step S7214). The computer 1100 determines whether the segment sgf(j) is present (step S7215). If the segment sgf(j) is present (step S7215: YES), the computer 1100 returns to step S7202. As a result, layers can be increased in a stepwise manner for integration. On the other hand, if the segment sgf(j) is not present (step S7215: NO), the computer 1100 returns to step S7002.

As described above, by executing the segment hierarchy process, a hierarchy of the segments is implemented as depicted in FIGS. 4 and 5. Therefore, the hierarchal structure of the archive files as depicted in FIG. 7 can be constructed.

<Search Process Procedure>

A search process procedure according to the embodiment will be described. For example, this process procedure corresponds to the file decompression example depicted in FIG. 63.

Figure 73:
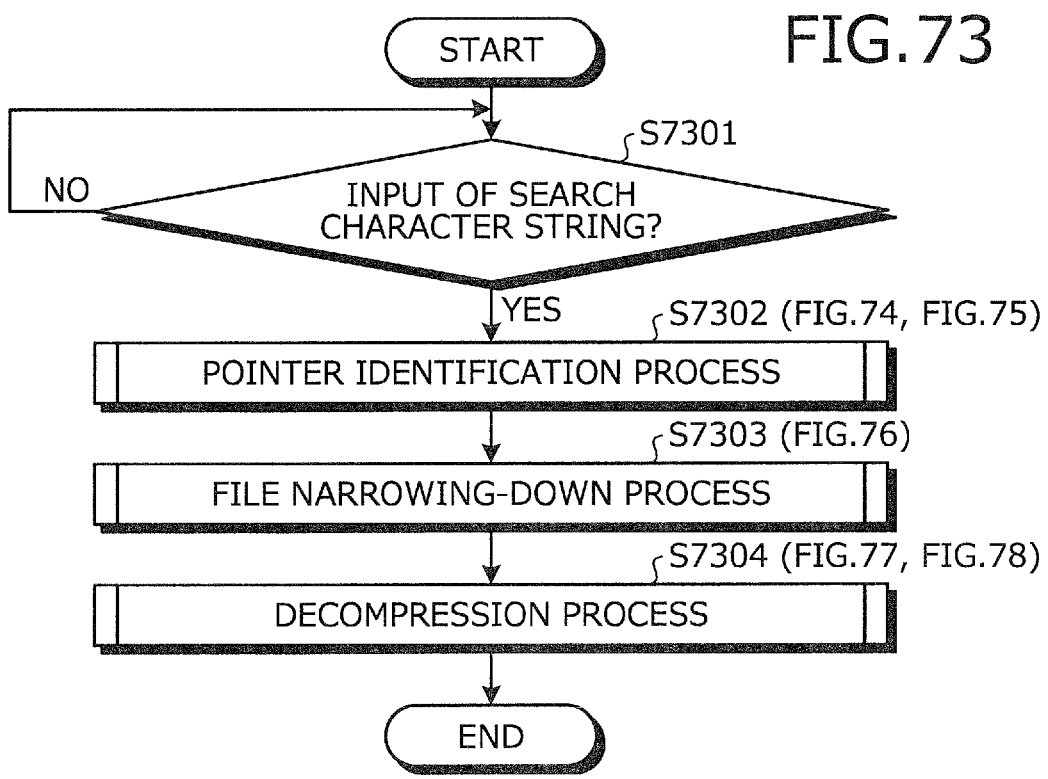
FIG. 73 is a flowchart of a search process procedure according to the embodiment.

FIG. 73 is a flowchart of a search process procedure according to the embodiment. First, the computer 1100 waits for input of a search character string (step S7301: NO) and, if the search character string is input (step S7301: YES), the computer 1100 executes a pointer identification process (step S7302), a file narrowing-down process (step S7303), and a decompression process (step S7304). In the pointer identification process (step S7302), a compression code used as a pointer specifying an appearance map is identified from the search character string. Details of the pointer identification process (step S7302) will be described with reference to FIGS. 74 and 75.

In the file narrowing-down process (step S7303), the compression files fi of the object files Fi having the character data making up the search character string are narrowed down from a hierarchal structure segment group as depicted in FIG. 8. Details of the file narrowing-down process (step S7303) will be described with reference to FIG. 76.

In the decompression process (step S7304), the compression code string to be decompressed is collated with the compression character string of the search character string in the course of decompressing the compression files fi narrowed down by the file narrowing-down process (step S7303). Details of the decompression process (step S7304) will be described with reference to FIGS. 77 and 78.

Figure 74:
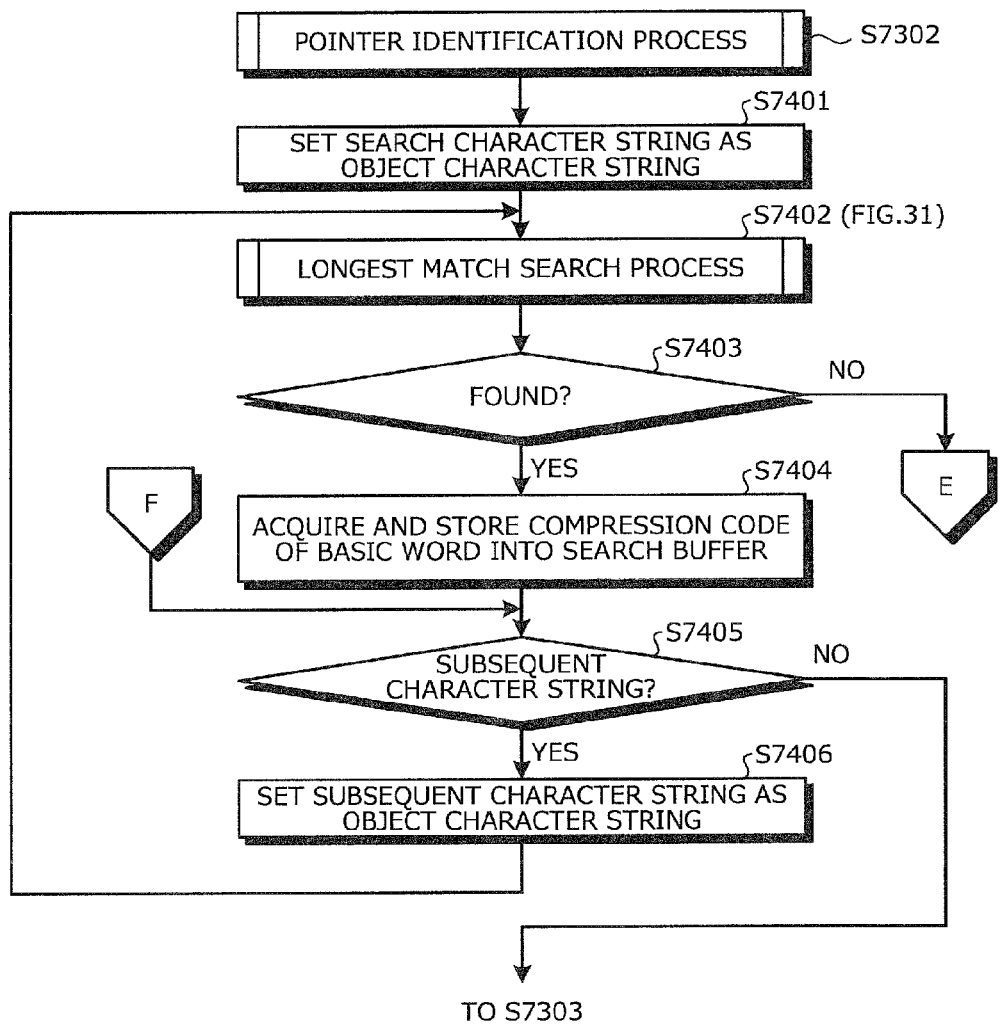
FIG. 74 is a flowchart (part 1) of a detailed process procedure of a pointer identification process (step S7302) depicted in FIG. 73.

FIG. 74 is a flowchart (part 1) of a detailed process procedure of the pointer identification process (step S7302) depicted in FIG. 73. First, the computer 1100 sets the search character string as the object character string (step S7401) and executes a longest match search process (step S7402). The longest match search process (step S7402) is the same process as the longest match search process (step S2901) depicted in FIG. 31 and therefore will not be described.

The computer 1100 performs binary search of the basic word structure for the longest match search result acquired by the longest match search process (step S7402) (step S7403). If the longest match search result is searched from the basic word structure (step S7403: YES), the computer 1100 acquires and stores the compression code of the found basic word from the $2^N$-branch nodeless Huffman tree H into a search buffer (step S7404).

The computer 1100 determines whether the object character string has a subsequent character string (step S7405). If a subsequent character string is present (step S7405: YES), the computer 1100 sets the subsequent character string as the object character string (step S7406) and returns to the longest match search process (step S7402). On the other hand, if no subsequent character string is present (step S7405: NO), the computer 1100 terminates the pointer identification process (step S7302) and goes to the file narrowing-down process (step S7303).

At step S7403, if the longest match search result is not found from the basic word structure (step S7403: NO), the computer 1100 goes to step S7501 of FIG. 75. For example, if the longest match search result is not registered in the basic word structure or if no longest match candidate is present as a result of the longest match search (step S7403: NO), the computer 1100 goes to step S7501 of FIG. 75.

Figure 75:
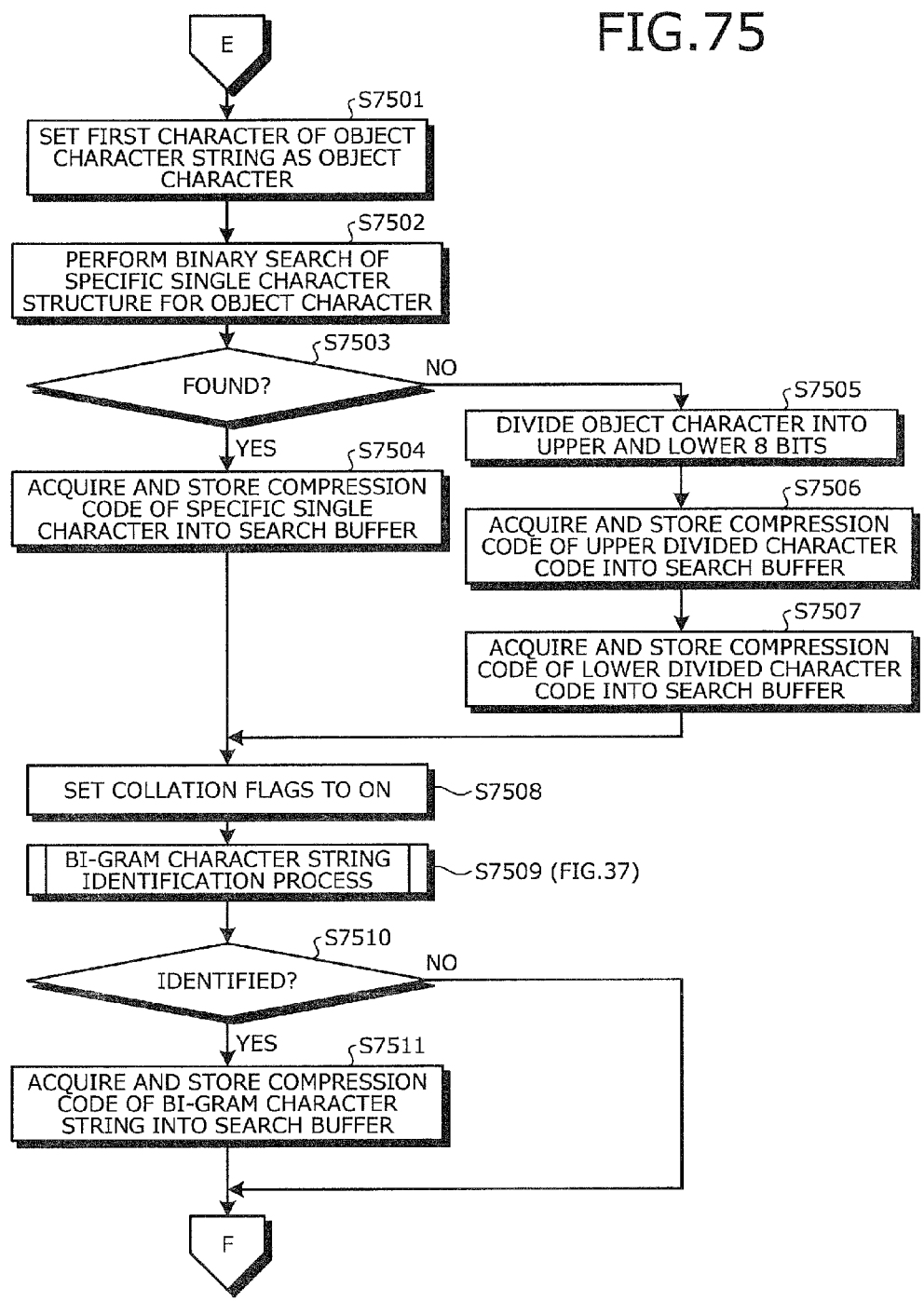
FIG. 75 is a flowchart (part 2) of the detailed process procedure of the pointer identification process (step S7302) depicted in FIG. 73.

FIG. 75 is a flowchart (part 2) of the detailed process procedure of the pointer identification process (step S7302) depicted in FIG. 73. The computer 1100 sets the first character of the object character string as the object character (step S7501). The computer 1100 performs the binary search of the specific single character structure for the object character (step S7502). If the object character is found (step S7503: YES), the computer 1100 acquires and stores the compression code of the specific single character from the $2^N$-branch nodeless Huffman tree H into the search buffer (step S7504).

On the other hand, if not found at step S7503 (step S7503: NO), the computer 1100 divides the object character into upper 8 bits and lower 8 bits (step S7505). The computer 1100 acquires and stores the compression code of the upper divided character code from the $2^N$-branch nodeless Huffman tree H into the search buffer (step S7506).

The computer 1100 also acquires and stores the compression code of the lower divided character code from the $2^N$-branch nodeless Huffman tree H into the search buffer (step S7507). For the object character and the divided character codes divided at step S7505, the computer 1100 accesses the leaves of the $2^N$-branch nodeless Huffman tree H to set the collation flags to ON (step S7508). Subsequently, the computer 1100 executes a bi-gram character string identification process (step S7509). The bi-gram character string identification process (step S7509) is the same process as the bi-gram character string identification process (step S3406) depicted in FIG. 37 and therefore will not be described.

If no bi-gram character string is identified in the bi-gram character string identification process (step S7509) (step S7510: NO), the computer 1100 returns to step S7405 of FIG. 74. On the other hand, if a bi-gram character string is identified (step S7510: YES), the computer 1100 acquires and stores the compression code of the bi-gram character string from the $2^N$-branch nodeless Huffman tree H into the search buffer (step S7511). For example, the computer 1100 accesses the $2^N$-branch nodeless Huffman tree H to acquire to acquire and concatenate the compression code of the first gram and the compression code of the second gram, and acquires the appearance map specified by the concatenated compression code from the compression code map M of the bi-gram character string. The computer 1100 returns to step S7405 of FIG. 74.

Figure 76:
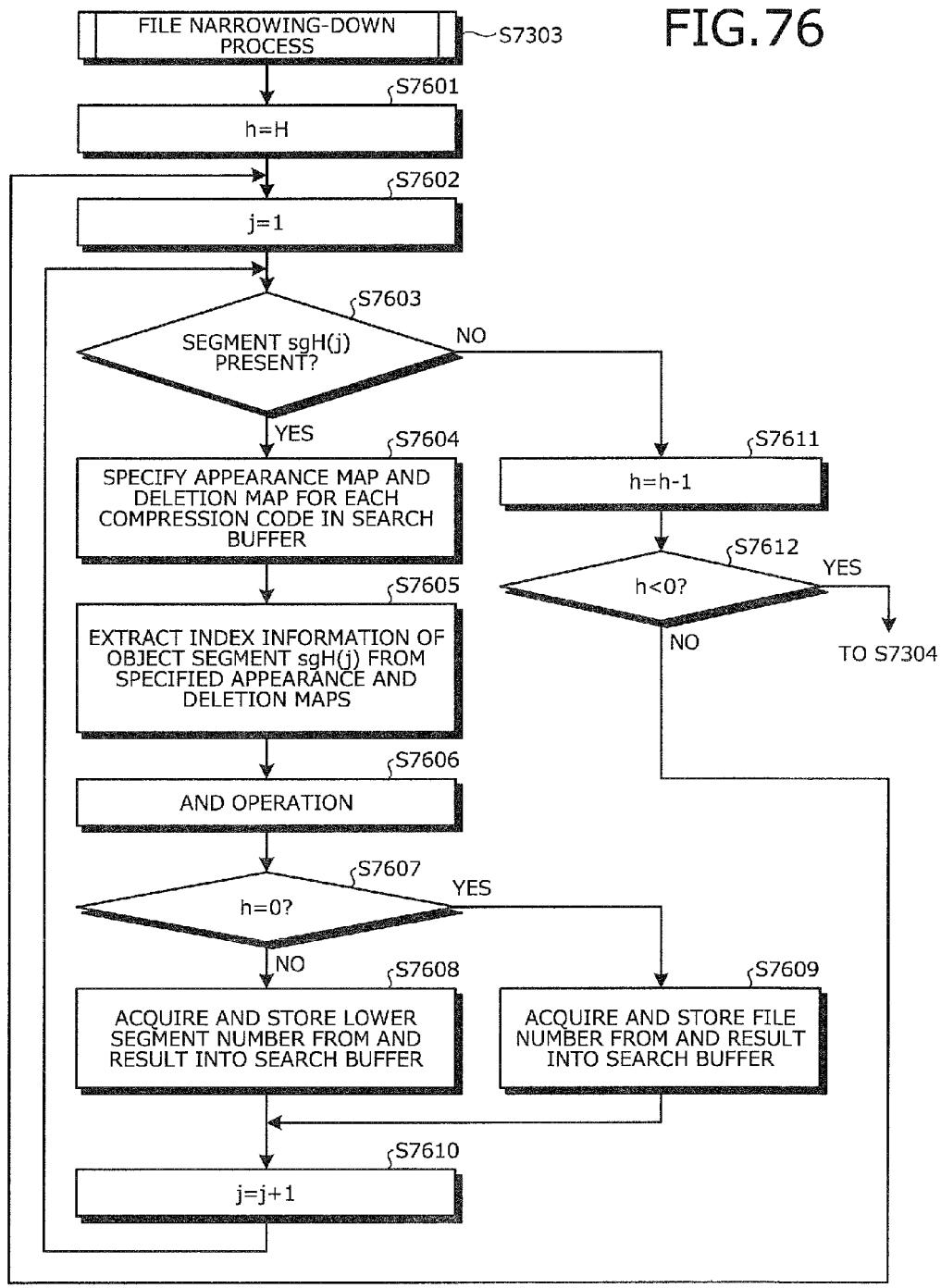
FIG. 76 is a flowchart of a detailed process procedure of a file narrowing-down process (step S7303) depicted in FIG. 73.

FIG. 76 is a flowchart of a detailed process procedure of the file narrowing-down process (step S7303) depicted in FIG. 73. First, the computer 1100 sets the layer number h to the layer number H of the currently highest-level layer (step S7601) and sets the segment number j to j=1 (step S7602).

The computer 1100 determines whether a segment sgH(j) is present (step S7603). If the segment sgH(j) is present (step S7603: YES), the computer 1100 specifies an appearance map and a deletion map for each compression code in the search buffer (step S7604). The computer 1100 extracts index information of the object segment sgH(j) from the specified appearance and deletion maps (step S7605).

The computer 1100 performs the AND operation of the extracted index information group (step S7606). The computer 1100 determines whether the current layer number h is h=0 (step S7607). In the case of h≠0 (step S7606: NO), the position of "1" acquired as the AND result is the number of the lower-level segment and therefore, the computer 1100 stores the number into the search buffer and goes to step S7610 (step S7608).

In the case of h=0 (step S7607: YES), the position of "1" acquired as the AND result is the file number and therefore, the computer 1100 stores the compression file of the number into the search buffer and goes to step S7610 (step S7609).

At step S7610, the computer 1100 increments the segment number j (step S7610) and returns to step S7603. Because of the correlation with the subsequent segment through a pointer, the increment of the segment number enables identification of the subsequent segment.

If the segment sgH(j) is not present at step S7603 (step S7603: NO), the computer 1100 decrements the layer number h (step S7611) and determines whether h<0 is satisfied (step S7612). If h<0 is not satisfied (step S7612: NO), the computer 1100 returns to step S7602. On the other hand, if h<0 is satisfied (step S7612: YES), the computer 1100 goes to the decompression process (step S7304) because the compression file to be decompressed has been identified at step S7609.

Figure 77:
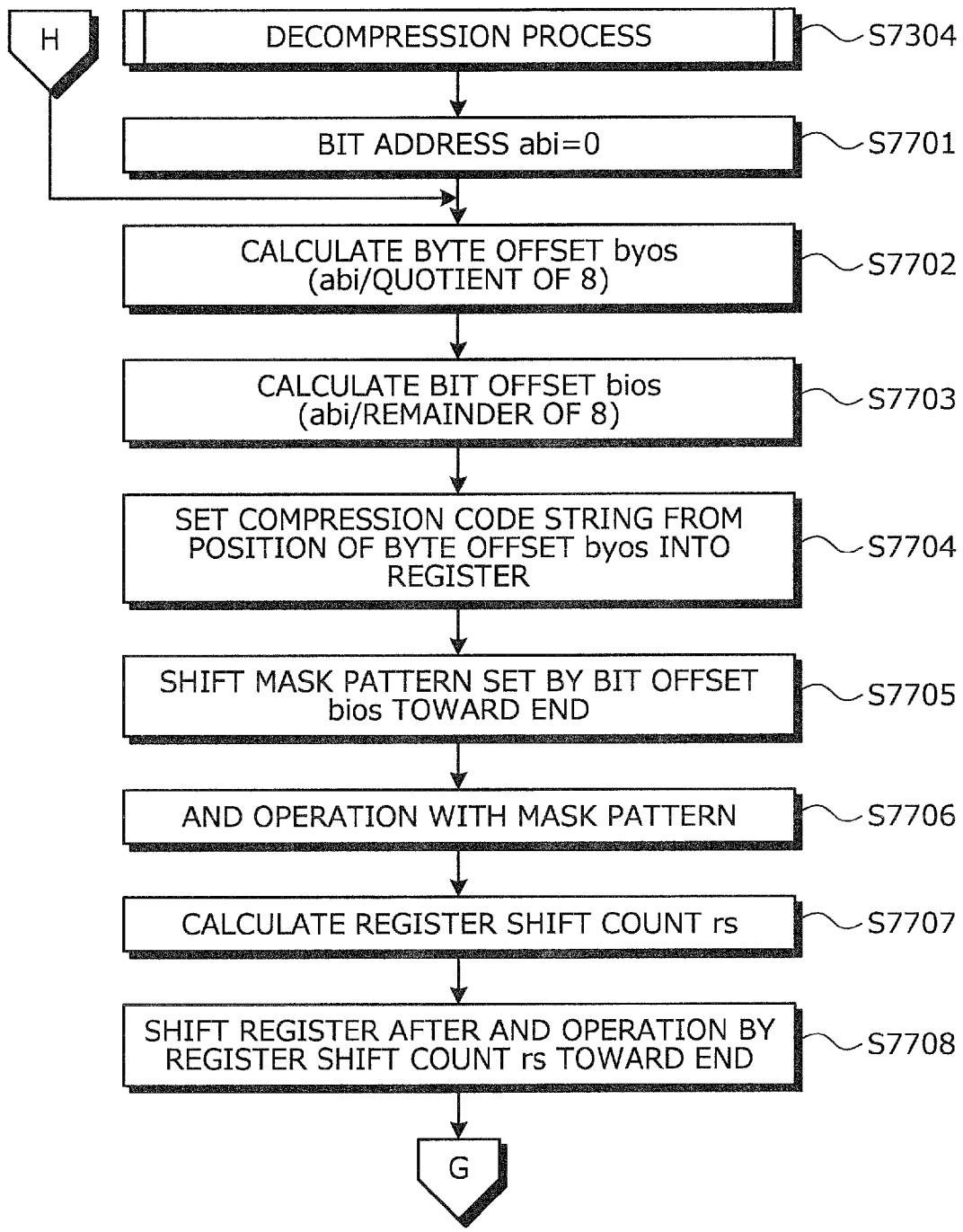
FIG. 77 is a flowchart (part 1) of a detailed process example of a decompression process (step S7304) using a $2^N$-branch nodeless Huffman tree depicted in FIG. 73.

FIG. 77 is a flowchart (part 1) of a detailed process example of the decompression process (step S7304) using the $2^N$-branch nodeless Huffman tree depicted in FIG. 73. In FIG. 77, first, the computer 1100 sets the bit address abi to abi=0 (step S7701), calculates the byte offset byos (step S7702), and calculates the bit offset bios (step S7703). The computer 1100 sets a compression code string from the position of the byte offset byos into a register r1 (step S7704).

The computer 1100 shifts a mask pattern set in a register r2 by the bit offset bios toward the end (step S7705) and performs an AND operation with the compression code string set in the register r1 (step S7706). The computer 1100 then calculates the register shift count rs (step S7707) and shifts the register r2 after the AND operation by the register shift count rs toward the end (step S7708).

Figure 78:
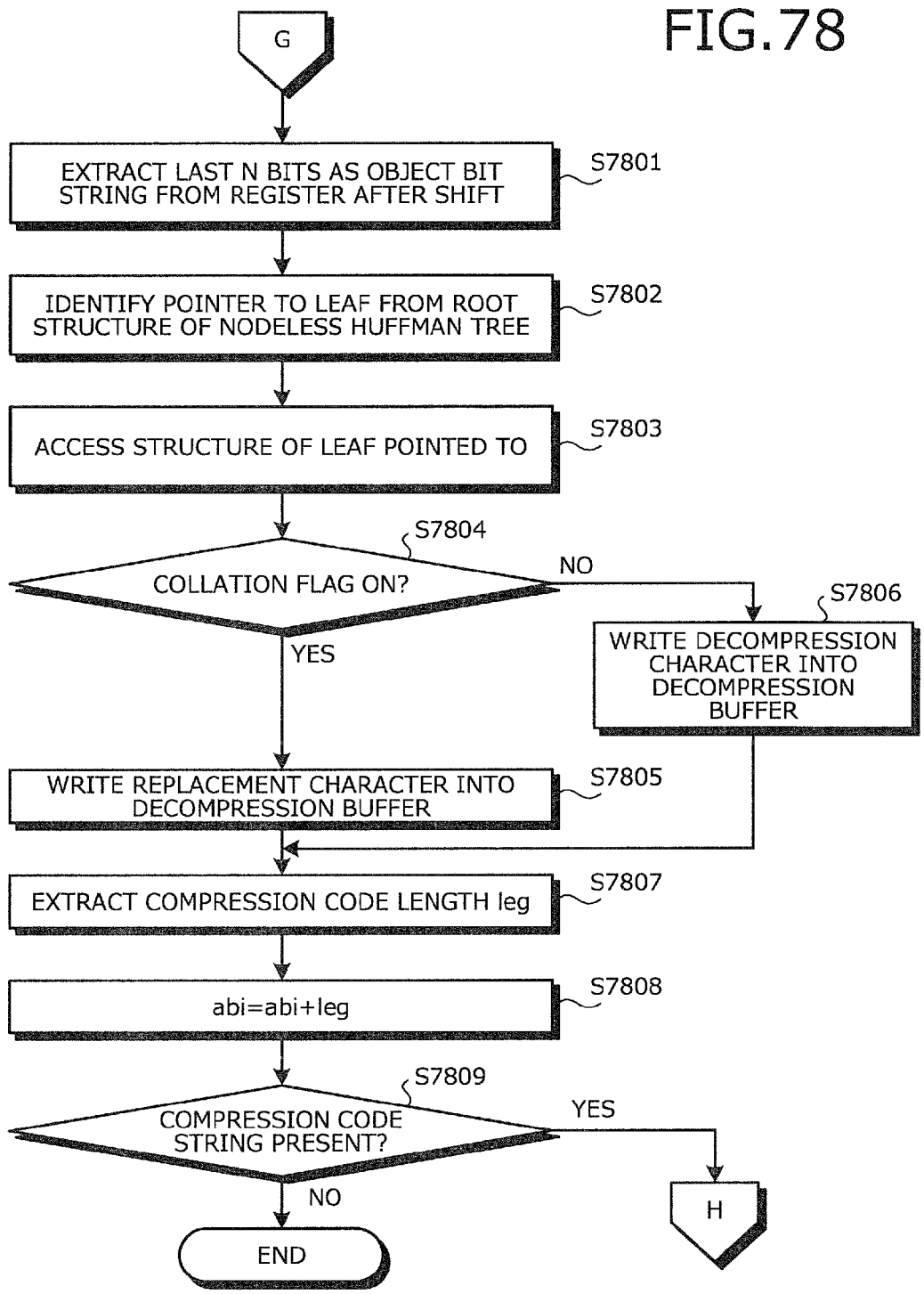
FIG. 78 is a flowchart (part 2) of the detailed process example of the decompression process (step S7304) using the $2^N$-branch nodeless Huffman tree H depicted in FIG. 73.

FIG. 78 is a flowchart (part 2) of the detailed process example of the decompression process (step S7304) using the $2^N$-branch nodeless Huffman tree H depicted in FIG. 73. After step S7708, in FIG. 78, the computer 1100 extracts the last N bits as an object bit string from the register r2 after the shift (step S7801). The computer 1100 identifies the pointer to the leaf L# from the root structure of the $2^N$-branch nodeless Huffman tree H (step S7802) and accesses the structure of the leaf L# to be pointed by one pass (S7803). The computer 1100 then determines whether the collation flag of the accessed structure of the leaf L# is set to ON (step S7804).

If the collation flag is set to ON (step S7804: YES), the computer 1100 writes a replacement character for the character data in the accessed structure of the leaf L# into the decompression buffer (step S7805) and goes to step S7807. On the other hand, if the collation flag is set to OFF (step S7804: NO), the computer 1100 writes the character data (decompression character) in the accessed structure of the leaf L# into the decompression buffer (step S7806) and goes to step S7807.

At step S7807, the computer 1100 extracts the compression code length leg from the accessed structure of the leaf L# (step S7807) and updates the bit address abi (step S7808). The computer 1100 then determines whether a compression code string is present in the memory, for example, whether a compression code string not subjected to the mask process using the mask pattern is present (step S7809). For example, this is determined based on whether a byte position corresponding to the byte offset byos is present. If the compression code string is present (step S7809: YES), the computer 1100 returns to step S7702 of FIG. 77. On the other hand, if the compression code string is not present (step S7809: NO), the decompression process (step S7304) is terminated.

With this decompression process (step S7304), the collation/decompression can be performed while the compressed state is maintained, and the decompression rate can be accelerated.

As described above, according to the embodiment, since the search object file group is divided and stored in multiple segments, the search can be performed with index information on the basis of a segment. Therefore, even if the size of the index information increases as the file number of the search object files increases, the search process time can be restrained from increasing.

The segments on the same layer are integrated to generate a segment on the higher-level layer so as to construct the hierarchal structure segment group SG. Therefore, by sequentially performing the narrowing-down from the index information of the segment on the highest-level layer of the hierarchal structure segment group SG, a segment without the search character string and compression files present on the lower level of the segment can be excluded from the objects to be narrowed down. Since the wasteful narrowing-down becomes unnecessary as described above, the search speed can be improved.

In the embodiment described above, the master server performs the narrowing-down to the first layer and transmits a narrowed-down file number to a slave server having the file number. Therefore, a slave server without a file number transmitted does not have to execute the narrowing-down process and, thus, wasteful searches can be restrained to achieve improvement in search efficiency.

Although the master server MS decompresses the compression file fi in the example described in the embodiment, the master server MS may transmit the $2^N$-branch nodeless Huffman tree H to the slave servers in advance so that the decompression process of the compression file fi is executed in the slave servers. In this case, the slave server receiving the file number i from the master server MS decompresses the compression file Fi of the file number and returns the decompressed object file Fi to the master server MS. By allowing the slave servers to execute the decompression process in this way, load concentration to the master server MS can be suppressed to achieve load distribution.

Although the compression files fi are narrowed down in the example described in the embodiment, the uncompressed object files Fi may be narrowed down. In this case, the compression and decompression processes described above are unnecessary. A pointer to an appearance map may be a pointer identifying character data rather than a compression code.

The bit strings of the compression area of the compression code map Ms are arranged in descending order of the file number p of the object file group Fs from the head position to the ending position. As a result, even if the bit strings of the file number: 1 to n are compressed, no gap is made between a file number of an additional file and the bits so that the object files Fi can accurately be narrowed down.

When the compression area of the compression code map Ms is set to the largest multiple of a predetermined number (e.g., largest multiple of a predetermined file number n=256), the compression code map Ms may not be compressed each time an object file is added. As a result, a computing load of the computer can be reduced. If the total file number after addition reaches the largest multiple of the initial file number, all the bits corresponding to the file number of the compression code map Ms is defined as the compression area and therefore, the compression code map Ms is compressed by the Huffman tree h. As a result, memory saving can be achieved. Since the compression is performed on the basis of the predetermined file number n (e.g., 256), the reduction in computing load and the memory saving can be achieved at the same time.

The information processing method described in the embodiment can be implemented by executing a preliminarily prepared program by the computer 1100 such as a personal computer and a workstation. This information processing program is recorded in a non-transitory, recording medium such as a hard disk, a flexible disk, a CD-ROM, an MO, and a DVD readable with the computer 1100 and is read from the recording medium by the computer 1100 for execution. This information processing program may be distributed via a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An extraction method comprising:
storing first information and second information into a storage unit, the first information including a plurality of presence information for each of a plurality of files, respectively, each of the plurality of presence information indicating presence information for a specific plurality of character data, respectively, for each of the plurality of files, the second information indicating, for each of the plurality of character data, respectively, whether at least any one of the plurality of files includes the specific plurality of character data;
updating the first information and the second information with addition of an additional file to the plurality of files, the first information being updated by merging additional presence information that indicates whether the additional file includes the specific plurality of character data, the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data; and
extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data.

2. The extraction method according to claim 1, further comprising
determining that the plurality of files do not include the specific character data among the specific plurality of character data, when the search request is accepted and the second information is detected to not include the specific character data among the specific plurality of character data.

3. The extraction method according to claim 1, wherein
the first information is a bit string that indicates for each of the plurality of files, whether the file includes each of the specific plurality of character data, and
the second information is bits obtained by calculating each bit included in the bit string.

4. The extraction method according to claim 1, further comprising:
storing third information into the storage unit, the third information indicating for each of the plurality of files, whether the file is a search object; and
updating among the third information, information indicating a file to be a search object, the information being updated to not indicate the file as the search object, when all of the plurality of files are excluded from being a search object, wherein the extracting includes extracting a file that is the search object and includes the specific character data among the specific plurality of character data, based on the first information and the third information when the search request is accepted and the second information is detected to include the specific character data among the specific plurality of character data.

5. The extraction method according to claim 1, further comprising:
storing fourth information into the storage unit, the fourth information indicating whether at least any one of the plurality of files is the search object; and
updating the fourth information when each of the plurality of files is excluded from being the search object, the fourth information being updated to not indicate any of the plurality of files to be the search object, wherein
the extracting includes extracting a file that includes the specific character data among the specific plurality of character data based on the first information, when the search request is accepted and the second information is detected to include the specific character data among the specific plurality of character data and the fourth information is detected to indicate at least any one of the plurality of files to be the search object.

6. An extraction method comprising:
storing first information, second information, and third information into a storage unit, the first information including a plurality of presence information for each of a plurality of files, respectively, each of the plurality of presence information indicating presence information for a specific plurality of character data, respectively, for each of the plurality of files, the second information indicating, for each of the plurality of character data, respectively, whether at least any one of the plurality of files includes the specific plurality of character data, and the third information indicating for each of the plurality of files, whether the file is a search object;
updating the first information and the second information with addition of an additional file to the plurality of files, the first information being updated by merging additional presence information that indicates whether the additional file includes the specific plurality of character data, the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;
updating among the third information, information indicating a file to be the search object, the information being updated to not indicate the file to be the search object, when all of the plurality of files are excluded from being the search object;
extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data; and extracting a file that is the search object and includes the specific character data among the specific plurality of character data, based on the first information and the third information when a search request is accepted for the specific character data among the specific plurality of character data and the second information is detected to include the specific character data among the specific plurality of character data.

7. An extraction method comprising:
storing first information and second information into a storage unit, the first information including a plurality of presence information for each of a plurality of files, respectively, each of the plurality of presence information indicating presence information for a plurality of files respectively includes a specific plurality of character data, respectively, for each of the plurality of files, and the second information indicating, for each of the plurality of character data, respectively, whether at least any one of a portion of the plurality of files includes the specific plurality of character data;
updating the first information and the second information with addition of an additional file to the plurality of files, the first information being updated by merging additional presence information that indicates whether the additional file includes the specific plurality of character data, and the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;
extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data; and
extracting, from among files not included among the portion of the plurality of files, a file that includes the specific character data among the specific plurality of character data based on the first information, when the search request is accepted for the specific character data among the specific plurality of character data and the second information is detected to not include the specific character data among the specific plurality of character data.

8. A non-transitory, computer-readable recording medium storing an extraction program that causes a computer to execute:
storing first information and second information into a storage unit, the first information including a plurality of presence information for each of a plurality of files, respectively, each of the plurality of presence information indicating presence information for a specific plurality of character data, respectively, for each of the plurality of files, and the second information indicating, for each of the plurality of character data, respectively, whether at least any one of the plurality of files includes the specific plurality of character data;

updating the first information and the second information with addition of an additional file to the plurality of files, the first information being updated by merging additional presence information that indicates whether the additional file includes the specific plurality of character data, the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data; and extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data.

9. A non-transitory, computer-readable recording medium storing an extraction program that causes a computer to execute:

storing first information and second information into a storage unit, the first information including a plurality of presence information for each of a plurality of files, respectively, each of the plurality of presence information indicating presence information for a plurality of files respectively includes a specific plurality of character data, respectively, for each of the plurality of files, and the second information indicating, for each of the plurality of character data, respectively, whether at least any one of a portion of the plurality of files includes the specific plurality of character data;

updating the first information and the second information with addition of an additional file to the plurality of files, the first information being updated by merging additional presence information that indicates whether the additional file includes the specific plurality of character data, and the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;

extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data; and extracting, from among files not included among the portion of the plurality of files, a file that includes the specific character data among the specific plurality of character data based on the first information, when the search request is accepted for the specific character data among the specific plurality of character data and the second information is detected to not include the specific character data among the specific plurality of character data.

10. A non-transitory, computer-readable recording medium storing an extraction program that causes a computer to execute:

storing first information, second information, and third information into a storage unit, the first information including a plurality of presence information for each of a plurality of files, respectively, each of the plurality of presence information indicating presence information for a specific plurality of character data, respectively, for each of the plurality of files, the second information indicating, for each of the plurality of character data, respectively, whether at least any one of the plurality of files includes the specific plurality of character data, and the third information indicating for each of the plurality of files, whether the file is a search object;

updating the first information and the second information with addition of an additional file to the plurality of files, the first information being updated by merging additional presence information that indicates whether the additional file includes the specific plurality of character data, the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;

updating among the third information, information indicating a file to be the search object, the information being updated to not indicate the file to be the search object, when all of the plurality of files are excluded from being the search object;

extracting, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data; and extracting a file that is the search object and includes the specific character data among the specific plurality of character data, based on the first and the third information when a search request is accepted for the specific character data among the specific plurality of character data and the second information is detected to include the specific character data among the specific plurality of character data.

11. An extracting apparatus comprising:

a storage unit that stores first information and second information, the first information including a plurality of presence information for each of a plurality of files, respectively, each of the plurality of presence information indicating presence information for a specific plurality of character data, respectively, for each of the plurality of files, and the second information indicating, for each of the plurality of character data, respectively, whether at least any one of the plurality of files includes the specific plurality of character data; and a processor configured to:

update the first information and the second information with addition of an additional file to the plurality of files, the first information being updated by merging additional presence information that indicates whether the additional file includes the specific plurality of character data, and the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data; and extract, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data.

12. An extracting apparatus comprising:

a storage unit that stores first information and second information, the first information including a plurality of presence information for each of a plurality of files, respectively, each of the plurality of presence information indicating presence information for a plurality of files respectively includes a specific plurality of character data, respectively, for each of the plurality of files, and the second information indicating, for each of the plurality of character data, respectively, whether at least any one of a portion of the plurality of files includes the specific plurality of character data; and a processor configured to:

update the first information and the second information with addition of an additional file to the plurality of files, the first information being updated by merging additional presence information that indicates whether the additional file includes the specific plurality of character data, and the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;

extract, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data, and extract, from among files not included among the portion of the plurality of files, a file that includes the specific character data among the specific plurality of character data based on the first information, when the search request is accepted for the specific character data among the specific plurality of character data and the second information is detected to not include the specific character data among the specific plurality of character data.

13. An extracting apparatus comprising:

a storage unit that stores first information, second information, and third information, the first information including a plurality of presence information for each of a plurality of files, respectively, each of the plurality of presence information indicating presence information for a specific plurality of character data, respectively, for each of the plurality of files, the second information indicating, for each of the plurality of character data, respectively, whether at least any one of the plurality of files includes the specific plurality of character data, and third information indicating for each of the plurality of files, whether the file is a search object; and a processor configured to:

update the first information and the second information with addition of an additional file to the plurality of files, the first information being updated by merging additional presence information that indicates whether the additional file includes the specific plurality of character data, the second information (a) being updated to indicate a portion of the plurality of files to which the additional file is added includes the specific plurality of character data in a case in which the additional presence information indicates that the additional file includes the specific plurality of character data, while otherwise the second information (b) being updated to indicate the portion of the plurality of files to which the additional file is added does not include the specific plurality of character data;

update among the third information, information indicating a file to be the search object, the information being updated to not indicate the file to be the search object, when all of the plurality of files are excluded from being the search object;

extract, from the portion of the plurality of files corresponding to the second information, one or more files that include a specific character data among the specific plurality of character data based on the first information, when a search request is accepted for the specific character data among the specific plurality of character data and the second information is detected to include the specific character data among the specific plurality of character data; and extract a file that is the search object and includes the specific character data among the specific plurality of character data, based on the first information and the third information when a search request is accepted for the specific character data among the specific plurality of character data and the second information is detected to include the specific character data among the specific plurality of character data.

* * * * *